(12) United States Patent
Xiong et al.

(10) Patent No.: US 12,705,455 B2
(45) Date of Patent: Aug. 11, 2026

(54) MIXTURE-OF-EXPERTS LAYER WITH SWITCHABLE PARALLEL MODES

(71) Applicant: Microsoft Technology Licensing, LLC, Redmond, WA (US)

(72) Inventors: Yifan Xiong, Beijing (CN); Changho Hwang, Cheongju-si (KR); Wei Cui, Beijing (CN); Ziyue Yang, Beijing (CN); Ze Liu, Beijing (CN); Han Hu, Beijing (CN); Zilong Wang, Beijing (CN); Rafael Omar Salas, Tega Cay, SC (US); Jithin Jose, Austin, TX (US); Prabhat Ram, Los Altos, CA (US); Ho-Yuen Chau, Redmond, WA (US); Peng Cheng, Beijing (CN); Fan Yang, Beijing (CN); Mao Yang, Beijing (CN); Yongqiang Xiong, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 793 days.

(21) Appl. No.: 18/054,446

(22) Filed: Nov. 10, 2022

(65) Prior Publication Data

US 2024/0160894 A1 May 16, 2024

(51) Int. Cl.
*G06N 3/042* (2023.01)

(52) U.S. Cl.
CPC .................................... *G06N 3/042* (2023.01)

(58) Field of Classification Search
CPC ...... G06N 3/042; G06N 3/048; G06N 3/0499; G06N 3/08; G06N 3/045
See application file for complete search history.

(56) References Cited

U.S. PATENT DOCUMENTS 9,852,177 B1 12/2017 Cheung et al.
2019/0304596 A1 10/2019 Padala
2022/0237435 A1 7/2022 Huang et al.
2022/0253716 A1 8/2022 Choudhury
2022/0301097 A1 9/2022 Rhodes
2024/0007414 A1 1/2024 Jain
2024/0160906 A1 5/2024 Xiong et al.
2024/0169463 A1 5/2024 Xiong et al.
2025/0036920 A1* 1/2025 Shen ...................... G06N 3/045

OTHER PUBLICATIONS

Zhang S, Diao L, Wu C, Wang S, Lin W. Accelerating large-scale distributed neural network training with SPMD parallelism. InProceedings of the 13th Symposium on Cloud Computing Nov. 7, 2022 (pp. 403-418). (Year: 2022).*

(Continued)

*Primary Examiner* — Henry Nguyen
(74) *Attorney, Agent, or Firm* — Alleman Hall LLP

(57) ABSTRACT

A computing system is provided, including a plurality of processing devices configured to execute a Mixture-of-Experts (MoE) layer included in an MoE model. The MoE layer includes a plurality of expert sub-models that each have a respective plurality of parameter values. The MoE layer is configured to be switchable between a data parallel mode and an expert-data-model parallel mode without conveying the respective parameter values of the expert sub-models among the plurality of processing devices.

16 Claims, 34 Drawing Sheets

(56) References Cited

OTHER PUBLICATIONS

Ma Z, He J, Qiu J, Cao H, Wang Y, Sun Z, Zheng L, Wang H, Tang S, Zheng T, Lin J. BaGuaLu: targeting brain scale pretrained models with over 37 million cores. InProceedings of the 27th ACM SIGPLAN Symposium on Principles and Practice of Parallel Programming Apr. 2, 2022 (pp. 192-204). (Year: 2022).*
Leung, Wai Cheuk Chadwick. "Overhead-communication Exploration in Large-Scale Machine Learning Frameworks." May 15, 2022. (Year: 2022).*
Rajbhandari S, Li C, Yao Z, Zhang M, Aminabadi RY, Awan AA, Rasley J, He Y. Deepspeed-moe: Advancing mixture-of-experts inference and training to power next-generation ai scale. InInternational conference on machine learning Jun. 2, 20228 (pp. 18332-18346). PMLR. (Year: 2022).*
Fedus W, Zoph B, Shazeer N. Switch transformers: Scaling to trillion parameter models with simple and efficient sparsity. Journal of Machine Learning Research. Apr. 22, 2022;23(120):1-39. (Year: 2022).*
"DeepSpeed", Retrieved From: https://www.deepspeed.ai/, Retrieved On: Jul. 11, 2022, 9 Pages.
"Introducing AMD CDNA 2 Architecture", Retrieved From: https://www.amd.com/system/files/documents/amd-cdna2-white-paper.pdf, Retrieved On: Jul. 11, 2022, 14 Pages.
"Nvidia A100 Tensor Core GPU Architecture—Unprecedented Acceleration at Every Scale", Retrieved From: https://images.nvidia.com/aem-dam/en-zz/Solutions/data-center/nvidia-ampere-architecture-whitepaper.pdf, Retrieved On: Jul. 11, 2022, 82 Pages.
"NVLink and NVSwitch", Retrieved From: https://www.nvidia.com/en-us/data-center/nvlink/, Retrieved On: Jul. 11, 2022, 8 Pages.
"Point-to-Point Communication", Retrieved From: https://docs.nvidia.com/deeplearning/nccl/archives/nccl_2103/user-guide/docs/usage/p2p.html, Retrieved On: Jul. 11, 2022, 2 Pages.
Addison, et al., "NCCL Tests", Retrieved From: https://github.com/NVIDIA/nccl-tests, Sep. 23, 2022, 4 Pages.
Bruck, et al., "Efficient Algorithms for All-to-All Communications in Multiport Message-Passing Systems", In Proceedings of IEEE Transactions on Parallel and Distributed Systems, vol. 8, No. 11, Nov. 1997, pp. 1143-1156.
Bureddy, et al., "Nccl-Rdma-Sharp-Plugins", Retrieved From: https://github.com/Mellanox/nccl-rdma-sharp-plugins, Sep. 7, 2022, 2 Pages.
Chi, et al., "On the Representation Collapse of Sparse Mixture of Experts", In Repository of arXiv:2204.09179v3, Oct. 12, 2022, 15 Pages.
Clark, et al., "Unified Scaling Laws for Routed Language Models", In Repository of arXiv:2202.01169v2, Feb. 9, 2022, 31 Pages.
Cowan, et al., "MSCCL: Microsoft Collective Communication Library", In Repository of arXiv:2201.11840v1, Jan. 27, 2022, 14 Pages.
Du, et al., "GLaM: Efficient Scaling of Language Models with Mixture-of-Experts", In Repository of arXiv:2112.06905v2, Aug. 1, 2022, 23 Pages.
Du, et al., "RCCL (ROCm Communication Collectives Library)", Retrieved From: https://github.com/ROCmSoftwarePlatform/rccl/tree/2.10.3, Dec. 9, 2021, 5 Pages.
Fedus, et al., "Switch Transformers: Scaling to Trillion Parameter Models with Simple and Efficient Sparsity", In Repository of arXiv:2101.03961v1, Jan. 11, 2021, 31 Pages.
Frostig, et al., "Compiling Machine Learning Programs Via High-Level Tracing", In Journal of Systems for Machine Learning, vol. 4, No. 9, Dec. 2018, 3 Pages.
He, et al., "FasterMoE: Modeling and Optimizing Training of Large-Scale Dynamic Pre-Trained Models", In Proceedings of the 27th ACM SIGPLAN Symposium on Principles and Practice of Parallel Programming, Apr. 2, 2022, pp. 120-134.
Hiu, et al., "Swin Transformer", Retrieved From: https://github.com/microsoft/Swin-Transformer, Oct. 5, 2022, 13 Pages.
Huang, et al., "GPipe: Efficient Training of Giant Neural Networks using Pipeline Parallelism", In Proceedings of Advances in Neural Information Processing Systems, vol. 32, Dec. 8, 2019, 10 Pages.
Hwang, et al., "Tutel: Adaptive Mixture-of-Experts at Scale", In Repository of arXiv:2206.03382v1, Jun. 7, 2022, 19 Pages.
Jacobs, et al., "Adaptive Mixtures of Local Experts", In Journal of Neural Computation, vol. 3, Issue 1, Mar. 1991, pp. 79-87.
Jeaugey, et al., "How does NCCL Decide which Algorithm to Use?", Retrieved From: https://github.com/NVIDIA/nccl/issues/457, Jan. 26, 2021, 2 Pages.
Jeaugey, et al., "NCCL (NVIDIA Collective Communications Library)", Retrieved From: https://github.com/NVIDIA/nccl/tree/v2.10.3-1, Jul. 9, 2021, 3 Pages.
Kaplan, et al., "Scaling Laws for Neural Language Models", In Repository of arXiv:2001.08361v1, Jan. 23, 2020, 30 Pages.
Kim, et al., "Scalable and Efficient MoE Training for Multitask Multilingual Models", In Repository of arXiv:2109.10465v1, Sep. 22, 2021, 16 Pages.
Kim, et al., "Technology-Driven, Highly-Scalable Dragonfly Topology", In Proceedings of International Symposium on Computer Architecture, Jun. 21, 2008, pp. 77-88.
Lepikhin, et al., "Gshard: Scaling giant models with conditional computation and automatic sharding", In Repository of arXiv:2006.16668v1, Jun. 30, 2020, 35 Pages.
Lewis, et al., "BASE Layers: Simplifying Training of Large, Sparse Models", In Proceedings of the 38th International Conference on Machine Learning, Jul. 18, 2021, 10 Pages.
Lin, et al., "M6-10T: A Sharing-Delinking Paradigm for Efficient Multi-Trillion Parameter Pretraining", In Repository of arXiv:2110.03888v3, Oct. 25, 2021, 14 Pages.
Lin, et al., "Microsoft COCO: Common Objects in Context", In the Proceedings of 13th European Conference on Computer Vision, vol. 5, Sep. 6, 2014, pp. 740-755.
Liu, et al., "Swin Transformer V2: Scaling Up Capacity and Resolution", In Proceedings of the IEEE/CVF Conference on Computer Vision and Pattern Recognition (CVPR), Jun. 18, 2022, pp. 12009-12019.
Liu, et al., "Swin transformer: Hierarchical vision transformer using shifted windows", In Proceedings of 2021 IEEE/CVF International Conference on Computer Vision, Oct. 10, 2021, pp. 10012-10022.
Mandakolathur, et al., "Doubling all2all Performance with NVIDIA Collective Communication Library 2.12", Retrieved From: https://developer.nvidia.com/blog/doubling-all2all-performance-with-nvidia-collective-communication-library-2-12/, Feb. 28, 2022, 5 Pages.
Mckittrick, et al., "NDm A100 v4-series", Retrieved From: https://learn.microsoft.com/en-us/azure/virtual-machines/ndm-a100-v4-series, Jul. 7, 2022, 3 Pages.
Ott, et al., "fairseq: A Fast, Extensible Toolkit for Sequence Modeling", In Proceedings of NAACL-HLT (Demonstrations), Jun. 2, 2019, pp. 48-53.
Paszke, et al., "PyTorch: An Imperative Style, High-Performance Deep Learning Library", In Proceedings of the 33rd Conference on Neural Information Processing Systems, Dec. 8, 2019, 12 Pages.
Pjesivac-Grbovic, Jelena, "Towards Automatic and Adaptive Optimizations of MPI Collective Operations", In Dissertation of University of Tennessee, Dec. 2007, 154 Pages.
Riquelme, et al., "Scaling Vision with Sparse Mixture of Experts", In Repository of arXiv:2106.05974v1, Jun. 10, 2021, 43 Pages.
Roller, et al., "Hash Layers For Large Sparse Models", In Repository of arXiv:2106.04426v3, Jul. 20, 2021, 16 Pages.
Sergeev, et al., "Horovod: Fast and Easy Distributed Deep Learning in TensorFlow", In Repository of arXiv:1802.05799v3, Feb. 21, 2018, 10 Pages.
Sharir, et al., "The Cost of Training NLP Models: A Concise Overview", In Repository of arXiv:2004.08900v1, Apr. 19, 2020, 6 Pages.
Shazeer, et al., "Outrageously Large Neural Networks: The Sparsely-Gated Mixture-of-Experts Layer", In Proceeding of 5th International Conference on Learning Representations, Apr. 24, 2017, 19 Pages.
Snir, et al., "MPI: The Complete Reference", In Publication of The MIT Press, 1996, 350 Pages.

(56) References Cited

OTHER PUBLICATIONS

Thakur, et al., "All-to-all Communication on Meshes with Wormhole Routing", In Proceedings of 8th International Parallel Processing Symposium, Apr. 26, 1994, pp. 561-565.
Wang, et al., "Tutel", Retrieved From: https://github.com/microsoft/tutel, Aug. 18, 2022, 7 Pages.
Yang, et al., "Exploring Sparse Expert Models and Beyond", In Repository of arXiv:2105.15082v3, Jun. 14, 2021, 16 Pages.
Yuksel, et al., "Twenty Years of Mixture of Experts", In Journal of IEEE Transactions on Neural Networks and Learning Systems, vol. 23, Issue 8, Aug. 2012, pp. 1177-1193.
Zhang, et al., "What is LL128 Protocol?", Retrieved From: https://github.com/NVIDIA/nccl/issues/281, Jan. 8, 2020, 4 Pages.
Shoeybi, et al., "Megatron-LM: Training Multi-Billion Parameter Language Models Using Model Parallelism", In Repository of arXiv:1909.08053v4, Mar. 13, 2020, 15 Pages.
Non-Final Office Action mailed on Jul. 24, 2025, in U.S. Appl. No. 18/054,451, 20 pages.
Non-Final Office Action mailed on Nov. 10, 2025, in U.S. Appl. No. 18/054,452, 38 pages.
Final office Action mailed on Apr. 27, 2026, in U.S. Appl. No. 18/054,452, 46 pages.
Final Office Action mailed on Mar. 11, 2026, in U.S. Appl. No. 18/054,451, 32 Pages.

* cited by examiner

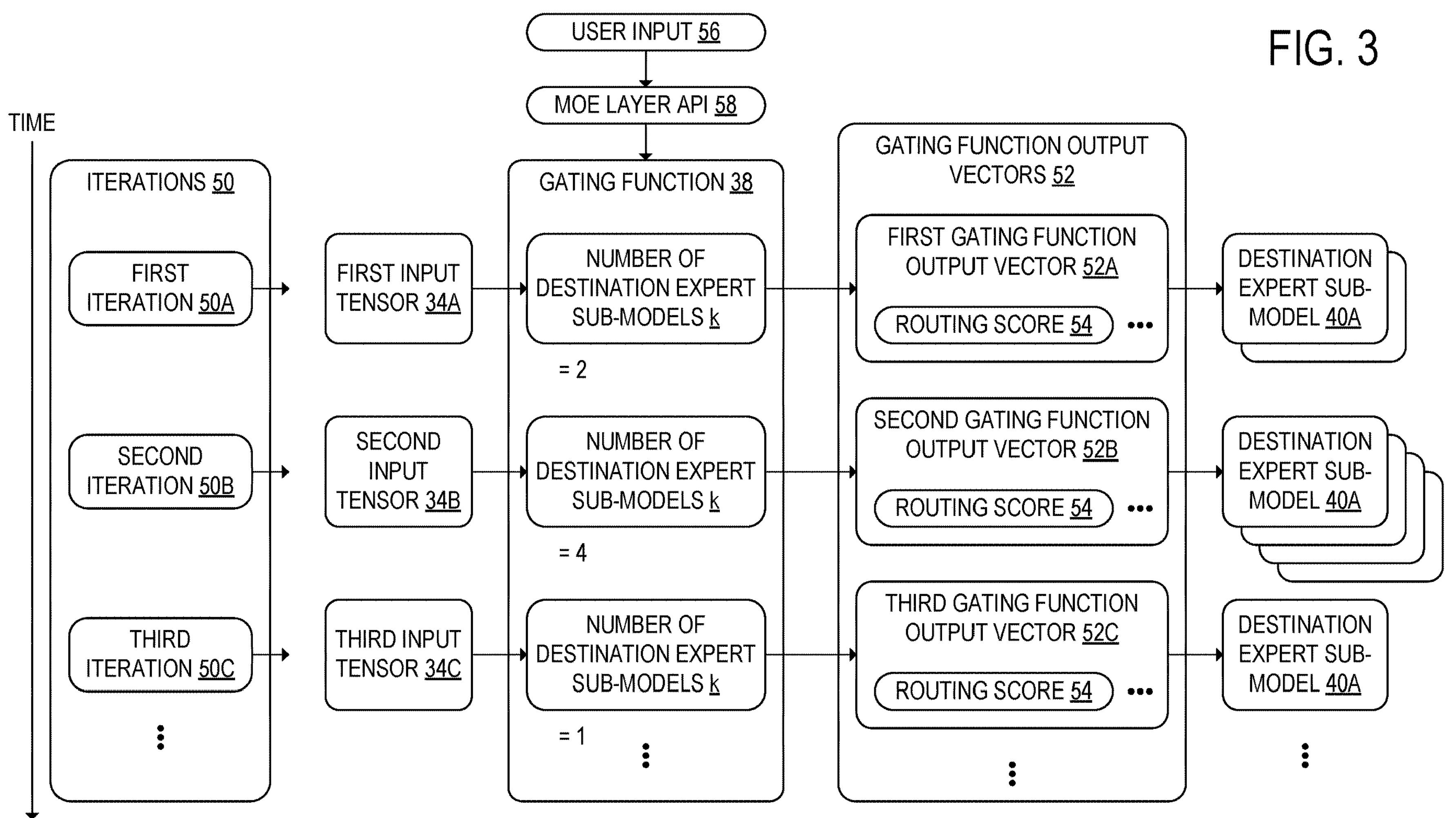
FIG. 3
USER INPUT 56
MOE LAYER API 58
TIME
ITERATIONS 50
FIRST ITERATION 50A
SECOND ITERATION 50B
THIRD ITERATION 50C
FIRST INPUT TENSOR 34A
SECOND INPUT TENSOR 34B
THIRD INPUT TENSOR 34C
GATING FUNCTION 38
NUMBER OF DESTINATION EXPERT SUB-MODELS k
= 2
NUMBER OF DESTINATION EXPERT SUB-MODELS k
= 4
NUMBER OF DESTINATION EXPERT SUB-MODELS k
= 1
GATING FUNCTION OUTPUT VECTORS 52
FIRST GATING FUNCTION OUTPUT VECTOR 52A
ROUTING SCORE 54
SECOND GATING FUNCTION OUTPUT VECTOR 52B
ROUTING SCORE 54
THIRD GATING FUNCTION OUTPUT VECTOR 52C
ROUTING SCORE 54
DESTINATION EXPERT SUB-MODEL 40A
DESTINATION EXPERT SUB-MODEL 40A
DESTINATION EXPERT SUB-MODEL 40A

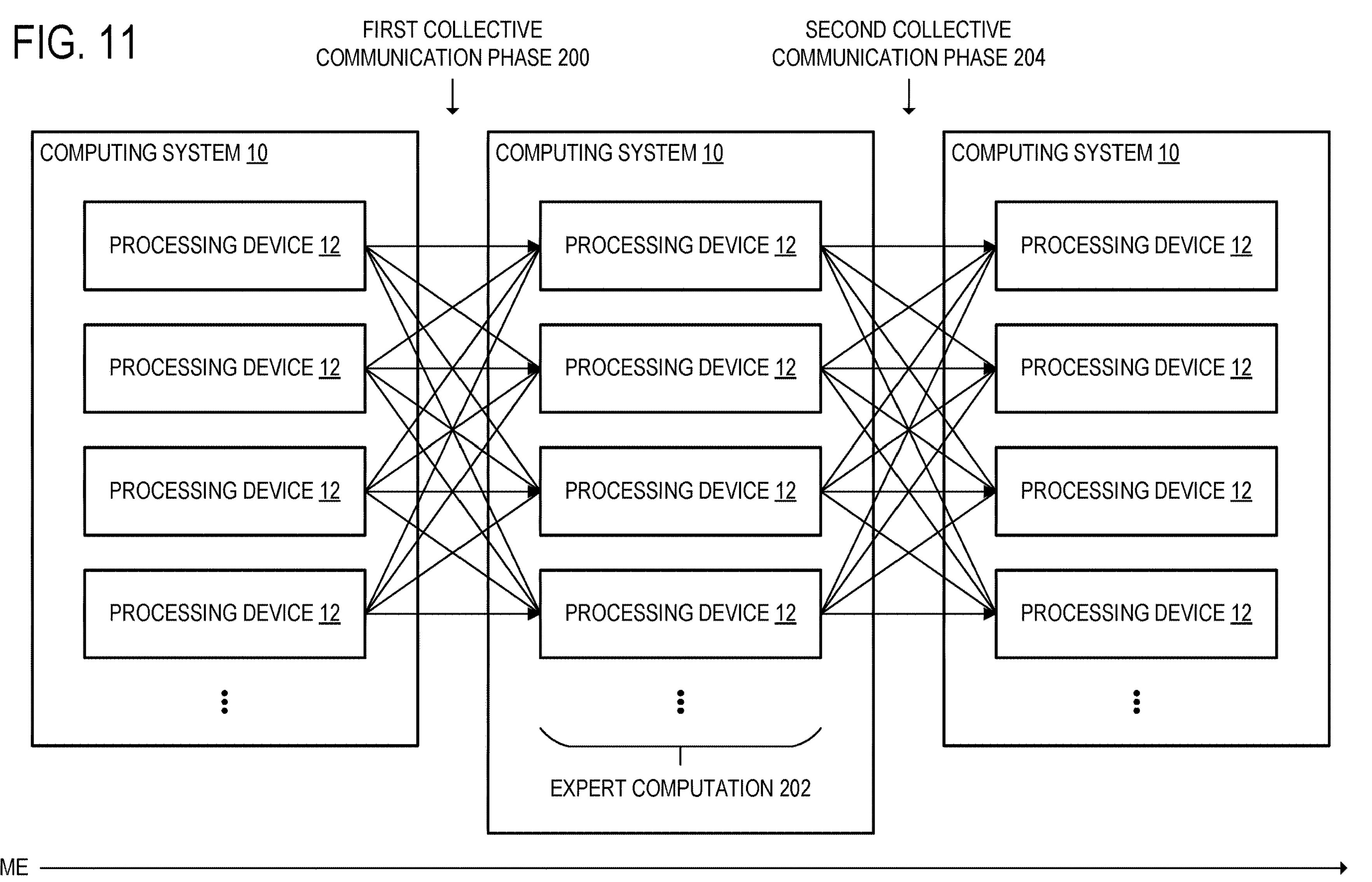
FIG. 11
FIRST COLLECTIVE COMMUNICATION PHASE 200
SECOND COLLECTIVE COMMUNICATION PHASE 204
COMPUTING SYSTEM 10
PROCESSING DEVICE 12
PROCESSING DEVICE 12
PROCESSING DEVICE 12
PROCESSING DEVICE 12
COMPUTING SYSTEM 10
PROCESSING DEVICE 12
PROCESSING DEVICE 12
PROCESSING DEVICE 12
PROCESSING DEVICE 12
EXPERT COMPUTATION 202
COMPUTING SYSTEM 10
PROCESSING DEVICE 12
PROCESSING DEVICE 12
PROCESSING DEVICE 12
PROCESSING DEVICE 12
TIME

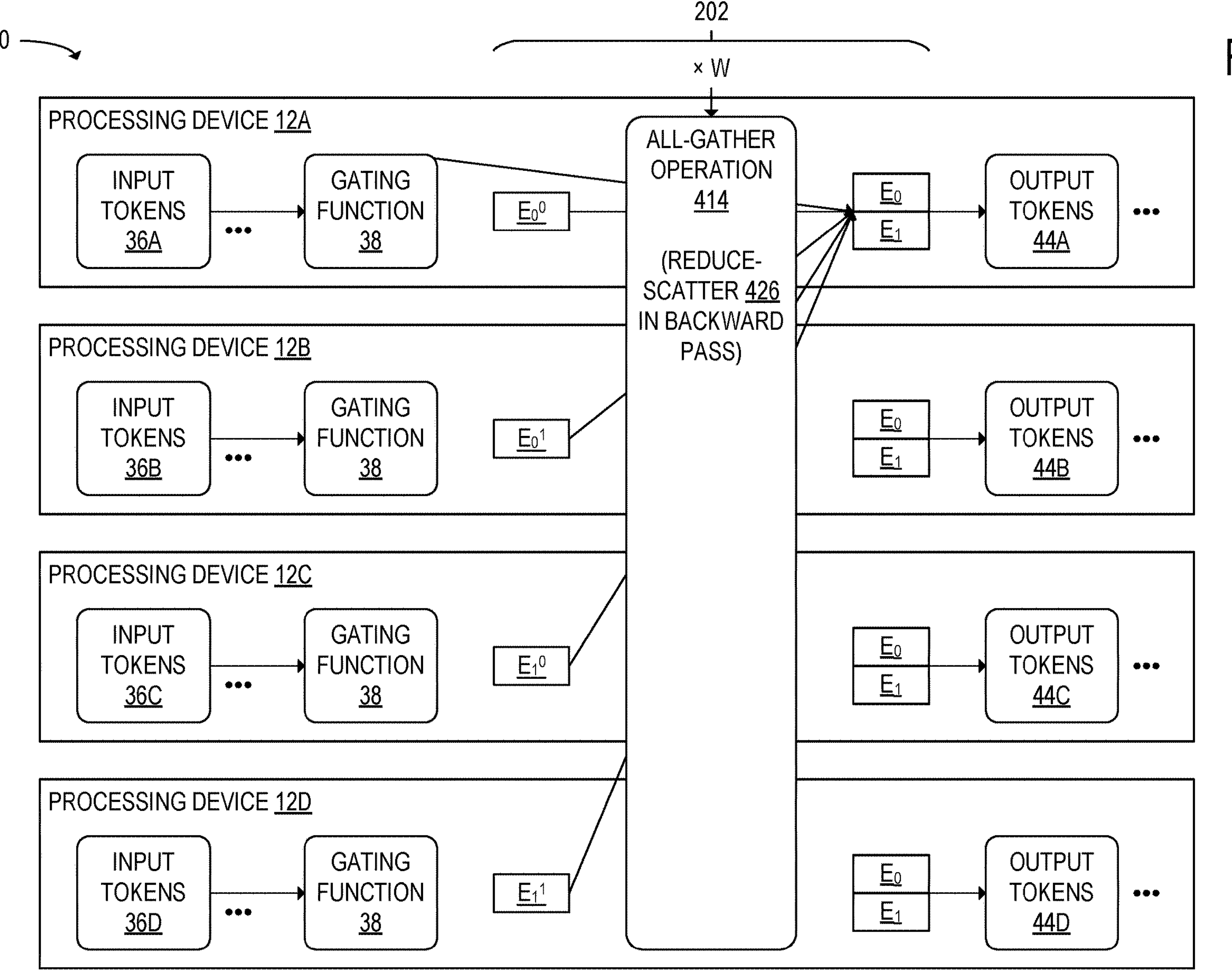
FIG. 20A
410
202
× W
PROCESSING DEVICE 12A
INPUT TOKENS 36A
GATING FUNCTION 38
$E_0^0$
ALL-GATHER OPERATION 414
(REDUCE-SCATTER 426 IN BACKWARD PASS)
$E_0$
$E_1$
OUTPUT TOKENS 44A
PROCESSING DEVICE 12B
INPUT TOKENS 36B
GATING FUNCTION 38
$E_0^1$
$E_0$
$E_1$
OUTPUT TOKENS 44B
PROCESSING DEVICE 12C
INPUT TOKENS 36C
GATING FUNCTION 38
$E_1^0$
$E_0$
$E_1$
OUTPUT TOKENS 44C
PROCESSING DEVICE 12D
INPUT TOKENS 36D
GATING FUNCTION 38
$E_1^1$
$E_0$
$E_1$
OUTPUT TOKENS 44D 418
422
422
PROCESSING DEVICE 12A
PROCESSING DEVICE 12B
PROCESSING DEVICE 12C
PROCESSING DEVICE 12D
36A
36B
36C
36D
38
38
38
38
× r
LOCAL REPEAT OP. 420
200
ALL-TO-ALL DISPATCH 412
202
× ⌊W/E⌋/r
$E_0^0$
$E_0^1$
$E_1^0$
$E_1^1$
ALL-GATHER OPERATION 414
(REDUCE-SCATTER 426 IN BACKWARD PASS)
ALL-GATHER OPERATION 414
(REDUCE-SCATTER 426 IN BACKWARD PASS)
$E_0$
$E_0$
$E_1$
$E_1$
204
ALL-TO-ALL COMBINE 416
× r
LOCAL SUM OP. 424
44A
44B
44C
44D FIRST STREAM 440A
SECOND STREAM 440B
THIRD STREAM 440C
FOURTH STREAM 440D
440
442
444
446
448
12A
12B
(E, ΔC, M)
2 × (E, ΔC/2, M)
2 × (E, ΔC/2, M)
2 × (E, ΔC/2, M)
2 × (E, ΔC/2, M)
(E, ΔC, M)
$E_0C$
$E_1C$
$E_0C_0$
$E_0C_1$
$E_1C_0$
$E_1C_1$
SPLIT
MERGE
200
202
204

460

Algorithm 1 Online Pipelining Strategy Search

```
procedure GetStrategy(capacity_factor)
  f ← capacity_factor
  if (f already in some bucket) then
    ReComputeBuckets(f)
    return GetStrategy(f)
  end if
  if (AllStrategyTried(f)) then
    return GetBestStrategy(f)
  end if
  if (AllStrategyTried(bucket)) then
    return GetBestStrategy(bucket)
  else
    return GetUntriedStrategy(bucket)
  end if
end procedure

procedure OptimizeStrategy(
capacity_factor, strategy, measured_time)
  f ← capacity_factor
  s ← strategy
  t ← measured_time
  UpdateTriedStrategy(f, s, t)
  bucket = GetBucket(f)
  UpdateTriedStrategy(bucket, s, t)
end procedure

procedure MoEStepAndOptimzeStrategy()
  f ← GetCurrentCapFactor()
  s ← GetStrategy(f)
  t ← MeasureTime(MoEStep(s))
  OptimizeStrategy(f, s, t)
end procedure
```

FIG. 23B

MIXTURE-OF-EXPERTS LAYER WITH SWITCHABLE PARALLEL MODES

BACKGROUND

From the recent fast growth of machine learning (ML) techniques driven by deep neural networks (DNNs), utilizing more DNN model parameters has been found to be one of the most straightforward approaches to improving the performance of ML algorithms. However, DNN model capacity is often limited by computing and energy costs. Such costs may be incurred as a result of the dense architecture of DNNs, in which the computing cost typically scales linearly as a function of the number of parameters.

To address these costs, DNNs may be built using a Mixture-of-Experts (MoE) approach. The MoE approach utilizes a sparse architecture that includes multiple parallel sub-models called experts, where each input is forwarded to a subset of the experts using a gating function. Unlike approaches that only use dense layers, the MoE approach may scale the model capacity up (thereby increasing model accuracy) without incurring large additional costs, since an MoE model may enroll more model parameters while leaving some of the model parameters unused in each forward pass.

SUMMARY

According to one aspect of the present disclosure, a computing system is provided, including a plurality of processing devices configured to execute a Mixture-of-Experts (MoE) layer included in an MoE model. The plurality of processing devices are configured to execute the MoE layer at least in part by, in each of a plurality of iterations, at each of the plurality of processing devices, receiving a respective plurality of input tokens. Executing the MoE layer further includes, at each of the plurality of processing devices, selecting one or more destination expert sub-models associated with the plurality of input tokens from among a plurality of expert sub-models of the MoE layer. Respective numbers k of expert sub-models selected as the one or more destination expert sub-models differ across the plurality of iterations. At each of the plurality of processing devices, executing the MoE layer further includes conveying the plurality of input tokens to the one or more destination expert sub-models. Executing the MoE layer further includes generating one or more respective expert sub-model outputs at the one or more destination expert sub-models based at least in part on the respective input tokens received at the one or more destination expert sub-models. Executing the MoE layer further includes generating an MoE layer output based at least in part on the one or more expert sub-model outputs and outputting the MoE layer output to an additional computing process.

According to another aspect of the present disclosure, a computing system is provided, including a plurality of processing devices configured to execute a Mixture-of-Experts (MoE) layer included in an MoE model. The plurality of processing devices are configured to execute the MoE layer at least in part by, during a first collective communication phase between the plurality of processing devices, splitting each of a plurality of first input tensors along a first dimension to obtain a plurality of first output tensors. Executing the MoE layer further includes processing the first output tensors at a respective a plurality of expert sub-models to obtain a plurality of second input tensors. Executing the MoE layer further includes, during a second collective communication phase between the plurality of processing devices, receiving the plurality of second input tensors from the plurality of expert sub-models and concatenating the plurality of second input tensors along the first dimension to obtain a plurality of second output tensors. Executing the MoE layer further includes outputting the second output tensors to an additional computing process as output of the MoE layer.

According to another aspect of the present disclosure, a computing system is provided, including a plurality of processing devices configured to execute a Mixture-of-Experts (MoE) layer included in an MoE model. The MoE layer includes a plurality of expert sub-models that each have a respective plurality of parameter values. The MoE layer is configured to be switchable between a data parallel mode and an expert-data-model parallel mode without conveying the respective parameter values of the expert sub-models among the plurality of processing devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 schematically shows a plurality of iterations in which input tensors are processed at respective sets of destination expert sub-models included in the MoE layer, according to the example of FIG. 1.

FIG. 11 schematically shows the computing system of FIG. 1 when the plurality of processing devices communicate with each other during a first collective communication phase and during a second collective communication phase.

FIG. 20A schematically shows the MoE layer in an example data parallel mode that is switchable with an expert-data-model parallel mode without performing parameter migration, according to the example of FIG. 1.

FIG. 23B shows pseudocode of a pipelining strategy search algorithm that may be performed at the at least one processing device when executing the pipelining degree selection module of FIG. 23A.

DETAILED DESCRIPTION

The MoE approach has recently been applied to large-scale distributed DNN models that operate across multiple processing devices. When implementing a large MoE model across multiple processing devices, efficient utilization of those processing devices is sometimes challenging. In contrast to models that use other deep learning approaches, MoE models process different inputs at different sets of parameters. Thus, a static approach routing data between the processing devices may result in inefficient training and execution of the MoE model. The workloads of the expert sub-models frequently vary between batches of inputs as a result of the selective input routing that characterizes MoE models. Thus, depending on the number of tokens per batch that are routed to a particular expert sub-model, that expert sub-model may have unused capacity. Alternatively, the available capacity of the expert sub-model may be exceeded, thereby resulting in token dropping.

In addition, the structure of MoE models may result in difficulties when parallelizing operations performed at MoE model across multiple processing devices. Since the workloads of the expert sub-models relative to each other differ between timesteps, it is typically difficult to achieve performance gains by parallelizing the computations performed at one expert sub-model across multiple processing devices. These difficulties in parallelization have typically led the developers of previous MoE models to only use small numbers of experts (e.g., 256 or fewer) in each MoE layer.

Figure 1:
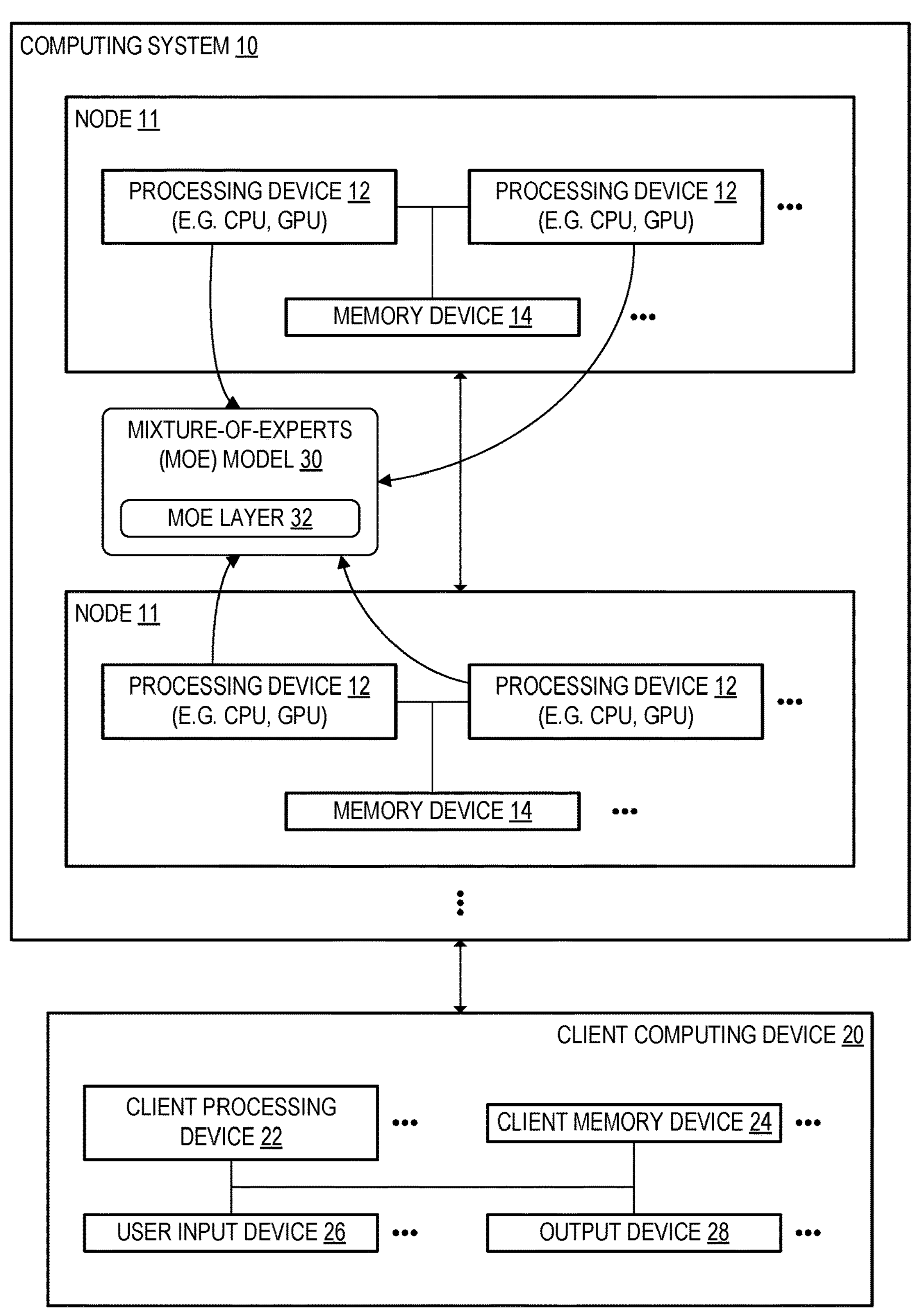
FIG. 1 schematically depicts a computing system including a plurality of processing devices at which an MoE model that includes an MoE layer is configured to be executed, according to one example embodiment.

In order to address the above challenges, the systems and methods discussed herein are provided. FIG. 1 schematically depicts a computing system 10 including a plurality of processing devices 12. As discussed in further detail below, the plurality of processing devices 12 are configured to execute an MoE layer 32 included in an MoE model 30. The plurality of processing devices 12 may, for example, include one or more central processing units (CPUs), one or more graphics processing units (GPUs), and/or one or more other hardware accelerators.

The plurality of processing devices 12 may, as shown in FIG. 1, be included in a plurality of nodes 11, which may be separate physical computing devices included in the computing system 10. In such examples, each of the nodes 11 may include two or more of the plurality of processing devices 12. Each of the nodes 11 further includes one or more memory devices 14 communicatively coupled to the processing devices 12. In addition, the plurality of nodes 11 included in the computing system 10 are communicatively coupled such that input and output data are transmitted between the processing devices 12 included in separate nodes 11.

The nodes 11 may be located in a data center and may function as server computing devices. The computing system 10 may, in such examples, be configured to communicate with a client computing device 20 over a network. The client computing device 20, as shown in FIG. 1, includes one or more client processing devices 22 and one or more client memory devices 24. In addition, the client computing device 20 includes one or more user input devices 26 and one or more output devices 28 via which a user may interact with the client processing device 22 and client memory device 24. A graphical user interface (GUI) may be provided at the client computing device 20 using the one or more user input devices 26 and the one or more output devices 28. Thus, the user of the client computing device 20 may specify inputs to, and receive outputs from, the MoE model executed at the computing system 10.

Figure 2:
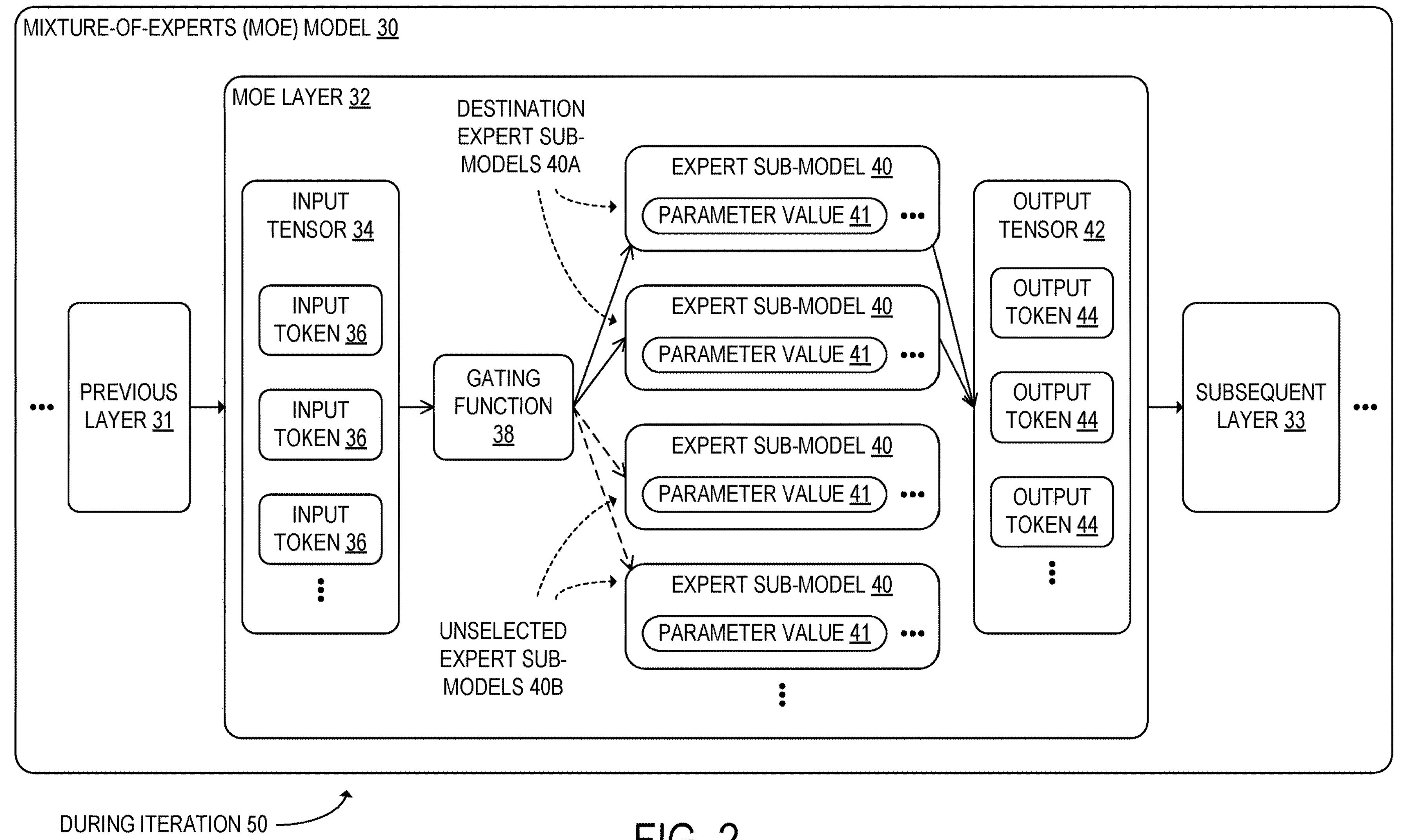
FIG. 2 schematically depicts the MoE layer of the MoE model executed at the plurality of processing devices, according to the example of FIG. 1.

FIG. 2 schematically depicts the MoE model 30 executed at the plurality of processing devices 12 included in the computing system 10. The MoE model 30 includes an MoE layer 32 at which the MoE approach to deep learning is utilized. In addition to the MoE layer 32, the MoE model may include one or more previous layers 31 and/or one or more subsequent layers 33. The MoE model 30 includes a plurality of MoE layers 32 in some examples. For example, a plurality of MoE layers 32 may alternate with a plurality of dense layers in the MoE model 30. The MoE layer 32 is shown in FIG. 2 at an iteration 50 included among a plurality of iterations 50 in which data is processed at the MoE model 30.

In each of the plurality of iterations 50, the MoE layer 32 is configured to receive a corresponding plurality of input tensors 34 that each include a respective plurality of input tokens 36. Respective input tensors 34 are received at each of the plurality of processing devices 12. As discussed in further detail below, processing of the input tokens 36 included in the input tensor 34 may be parallelized across the plurality of processing devices 12. The processing devices 12 may accordingly receive respective copies of a same input tensor 34 or different input tensors 34 of input tokens 36.

The MoE layer 32 includes a plurality of expert sub-models 40. Across different iterations 50 in which respective input tensors 34 are processed at the MoE layer 32, different expert sub-models 40 are utilized. The expert sub-models 40 each have a respective plurality of parameter values 41. The plurality of processing devices 12 are further configured to implement a gating function 38 included in the MoE layer 32 to select the one or more expert sub-models 40 that are executed. The gating function 38 may be executed at each of the plurality of processing devices 12 used to implement the MoE layer 32. At the gating function 38, the plurality of processing devices 12 select, for a current iteration 50, one or more destination expert sub-models 40A at which the input tokens 36 are configured to be processed. The plurality of expert sub-models 40 included in the MoE layer 32 may further include one or more unselected expert sub-models 40B that do not receive input tokens 36 in the current iteration 50.

Executing the MoE layer 32 further includes conveying the plurality of input tokens 36 to the one or more destination expert sub-models 40A. At the plurality of destination expert sub-models 40A, the plurality of processing devices 12 are further configured to generate a respective plurality of expert sub-model outputs based at least in part on the respective input tokens 36 received at the destination expert sub-models 40A. For example, each expert sub-model 40 may include one or more feed-forward layers at which received input tokens 36 are configured to be processed. The plurality of expert sub-model outputs are output tokens 44 included in an output tensor 42 in the example of FIG. 2. The output tokens 44 may be output to a subsequent layer 33 or may be the output of the MoE model 30.

FIG. 3 schematically shows a plurality of iterations 50 in which input tensors 34 are processed at respective sets of destination expert sub-models 40A. A first iteration 50A, a second iteration 50B, and a third iteration 50C are shown in FIG. 3. In the first iteration 50A, the second iteration 50B, and the third iteration 50C, the plurality of processing devices 12 receive a first input tensor 34A, a second input tensor 34B, and a third input tensor 34C, respectively.

The plurality of processing devices 12 are further configured to execute the gating function 38 at each of the plurality of processing devices 12 during each of the iterations 50. At the gating function 38, the plurality of processing devices 12 are further configured to select a respective number k of destination expert sub-models 40A at each iteration 50. Across the plurality of iterations 50, different respective numbers k of the expert sub-models 40 are selected as the destination expert sub-models 40A. By modifying the value of k, the plurality of processing devices 12 may adjust for changes in the workload of the MoE layer 32 at different iterations 50.

When the plurality of processing devices 12 execute the gating function 38, the plurality of processing devices 12 may compute respective gating function output vectors 52. FIG. 3 shows a first gating function output vector 52A computed at the first iteration 50A, a second gating function output vector 52B computed at the second iteration 50B, and a third gating function output vector 52C computed at the third iteration 50C. The gating function output vectors 52 may each include a plurality of routing scores 54 corresponding to the plurality of expert sub-models 40. When the plurality of processing devices 12 select the one or more destination expert sub-models 40A, the plurality of processing devices 12 may identify, as the destination expert sub-models 40A, the expert sub-models 40 corresponding to the k highest routing scores 54 included in the gating function output vector 52 of the gating function 38. Thus, the routing scores 54 output by the gating function 38 may be estimates of the suitability of different expert sub-models 40 as recipients of the input tensor 34.

As depicted in the example of FIG. 3, the number k of destination expert sub-models 40A selected at an iteration 50 may be specified via a user input 56 received at an MoE layer application-programming interface (API) 58. Via the MoE layer API 58, the user may specify changes in the value of k over the course of the plurality of iterations 50. By changing the value of k over the plurality of iterations 50, the user may modify the sparsity of the MoE layer 32 to account for changes in MoE layer workload. For example, during training of the MoE layer 32, k may be increased at later iterations 50 in order to account for increases in the workloads of forward passes over the course of the training run.

Figure 4:
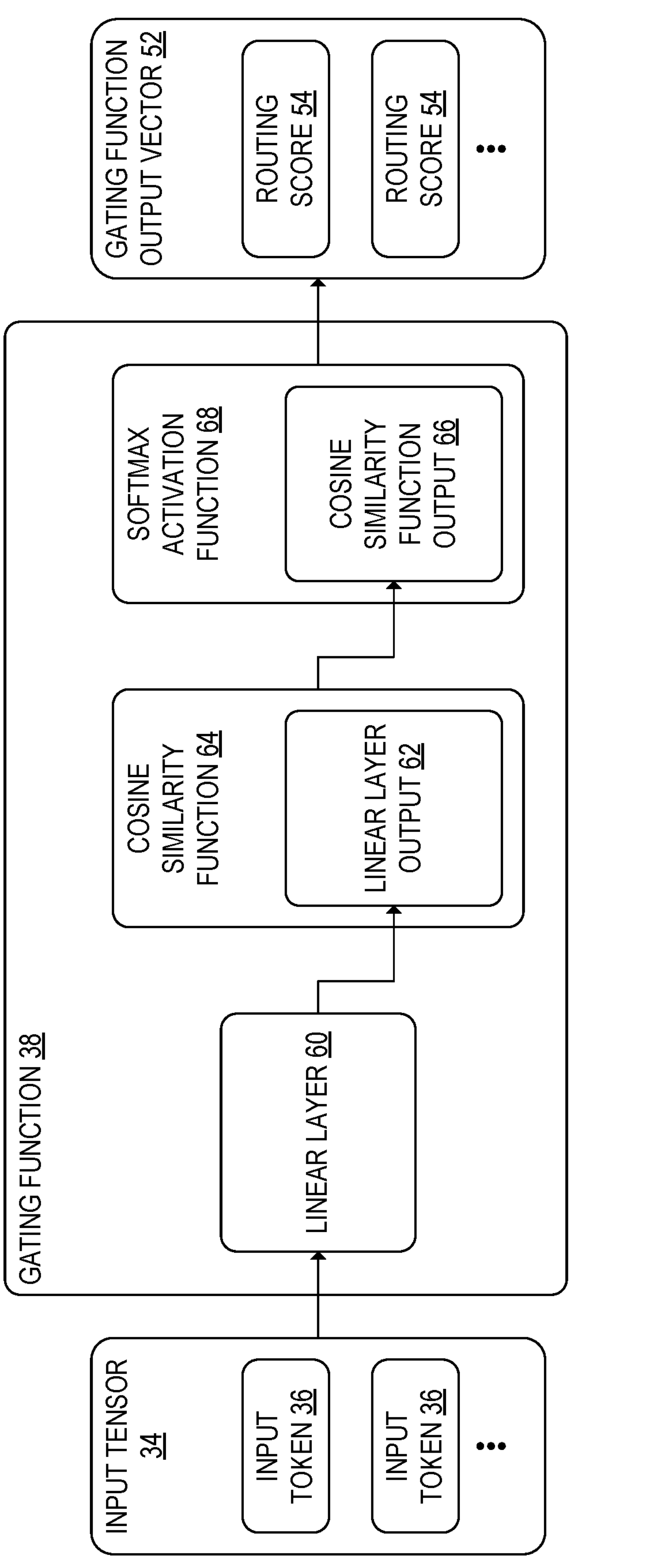
FIG. 4 schematically shows a gating function included in the MoE layer, according to the example of FIG. 1.

FIG. 4 schematically shows the gating function 38 in additional detail, according to one example. In the example of FIG. 4, the gating function 38 includes a linear layer 60 configured to receive the plurality of input tokens 36 included in the input tensor 34. In some examples, the parameters of the linear layer 60 may be synchronized across the plurality of processing devices 12 in order to provide data parallelism when evaluating the gating function 38. The gating function 38 further includes a cosine similarity function 64 configured to receive a linear layer output 62 from the linear layer 60. In addition, the gating function 38 of FIG. 4 further includes a SoftMax activation function 68 that is computed on a cosine similarity function output 66 of the cosine similarity function 64 to obtain the plurality of routing scores 54 included in the gating function output vector 52. The gating function output vector 52 may therefore be computed as follows:

$$P = \text{SoftMax}\left(\frac{Wx \cdot M}{\|Wx\| \ \|M\|\tau}\right)$$

In the above equation, $W \in \mathbb{R}^{D \times C}$ is the linear layer 60, where D is an intermediate dimension and C is the number of input tokens 36. The intermediate dimension D may, for example, be set to 256. The vector x in the above equation is an input token feature vector $x \in \mathbb{R}^{C \times 1}$. Thus, the linear layer 60 projects the input token feature vector x onto the intermediate dimension D. The matrix $M \in \mathbb{R}^{E \times D}$ is a parametric matrix in which the E columns correspond to the expert sub-models 40. $\tau$ is a learnable temperature parameter, which may, for example, be set to a value greater than or equal to 0.01. Using the above equation, the plurality of processing devices 12 may generate the gating function output vector 52 from which the top k routing scores 54 are selected to specify the one or more destination expert sub-models 40A. In comparison to gating functions that only include linear layers, the gating function 38 that includes the cosine similarity function 64 may have greater numerical stability as model size increases, without reducing the accuracy of destination expert sub-model selection.

Figure 5:
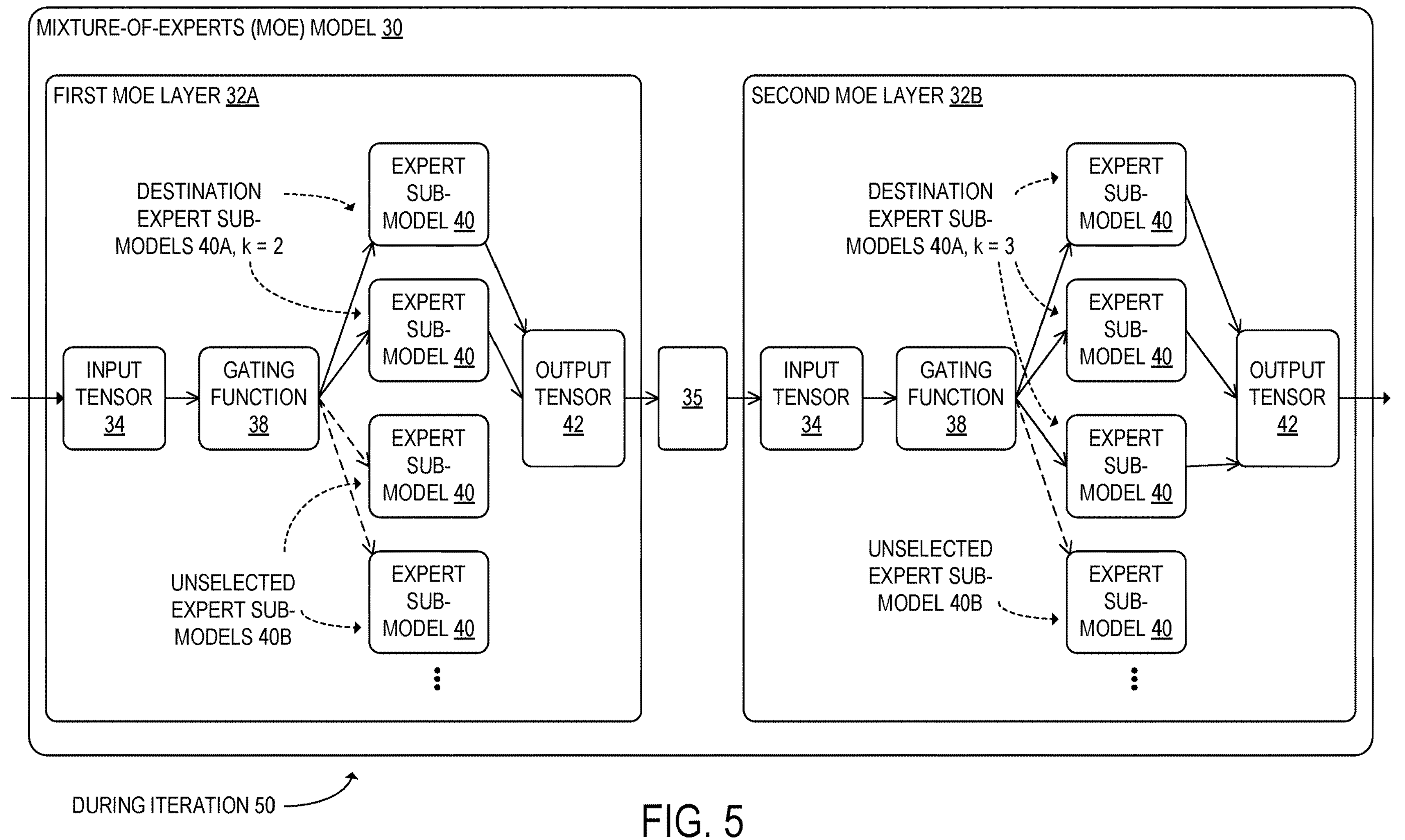
FIG. 5 schematically shows a first MoE layer and a second MoE layer included in the MoE model, according to the example of FIG. 1.

In some examples, as shown in FIG. 5, the MoE layer 32 may be included among a plurality of MoE layers 32 in the MoE model 30. A first MoE layer 32A and a second MoE layer 32B are shown in FIG. 5. In addition, FIG. 5 shows an intervening layer 35 that is configured to receive the output tensor 42 of the first MoE layer 32A and output the input tensor 34 of the second MoE layer 32B. In such examples, during an iteration 50, the numbers k of expert sub-models 40 selected as the one or more destination expert sub-models 40A may differ between the plurality of MoE layers 32. The example of FIG. 5 shows the selecting of the destination expert sub-models 40A when k=2 at the first MoE layer 32A and when k=3 at the second MoE layer 32B.

Figure 6:
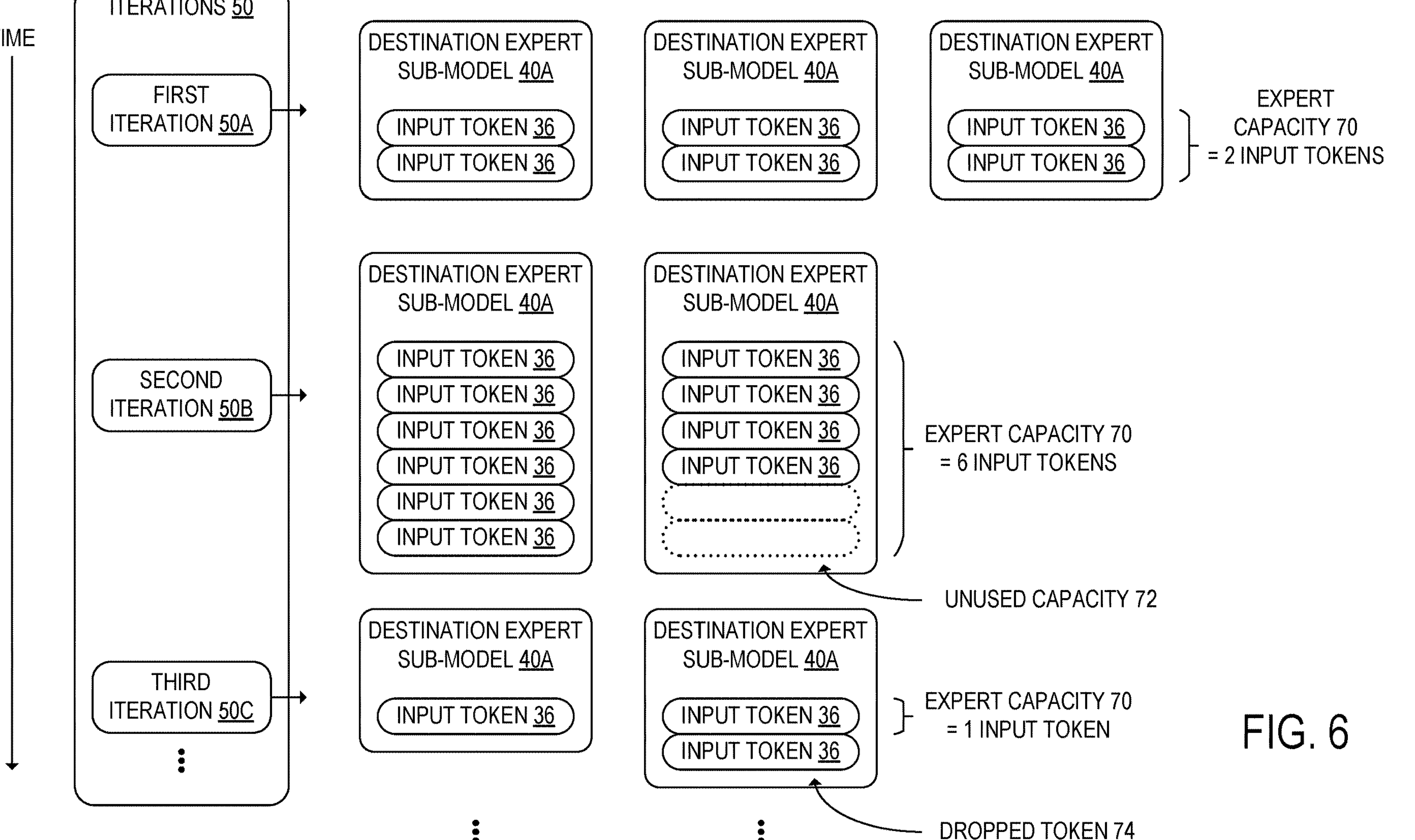
FIG. 6 schematically shows numbers of input tokens transmitted to destination expert sub-models in a plurality of iterations, according to the example of FIG. 1.

In addition to setting the number k of destination expert sub-models 40A, the plurality of processing devices 12 may be further configured to set an expert capacity 70 shared by the plurality of destination expert sub-models 40A. FIG. 6 schematically shows the numbers of input tokens 36 transmitted to the respective destination expert sub-models 40A selected in a first iteration 50A, a second iteration 50B, and a third iteration 50C. In each of the iterations 50, the plurality of processing devices 12 are further configured to set an expert capacity 70 shared by the one or more destination expert sub-models 40A. The expert capacity 70 is a maximum number of input tokens 36 configured to be processed at each of the one or more destination expert sub-models 40A during an iteration 50 of the plurality of iterations 50. In the first iteration 50A shown in FIG. 6, the expert capacity 70 is equal to two input tokens 36. In the second iteration 50B, the expert capacity 70 is equal to six input tokens 36. In the third iteration 50C, the expert capacity 70 is equal to one input token 36. Subsequently to computing the expert capacity 70, the processing device 12 at which the expert capacity 70 is computed may be further configured to transmit the value of the expert capacity 70 to the other processing devices 12 by performing an all-reduce operation. Thus, the plurality of processing devices 12 may use the same value of the expert capacity 70.

During some of the plurality of iterations 50, at least one of the destination expert sub-models 40A may receive fewer input tokens 36 than the expert capacity 70. In such examples, as shown in the second iteration 50B of FIG. 6, the at least one destination expert sub-model 40A that receives fewer input tokens 36 than the expert capacity 70 has one or more tokens worth of unused capacity 72. Additionally or alternatively, during some of the plurality of iterations 50, at least one of the destination expert sub-models 40A may receive a number of input tokens 36 greater than the expert capacity 70. In such examples, as shown in the third iteration 50C, one or more of the input tokens 36 at the at least one destination expert sub-model 40A is a dropped token 74 that is not used to compute the output tensor 42.

During training and inferencing at the MoE layer 32, there may be a tradeoff between the amount of unused capacity 72 and the number of dropped tokens 74. When the expert capacity 70 is set to a high value, the plurality of processing devices 12 may avoid token dropping at the cost of having large amounts of unused capacity 72. When the expert capacity 70 is set to a low value, the plurality of destination expert sub-models 40A may have low unused capacity 72 but high rates of token dropping.

Figure 7:
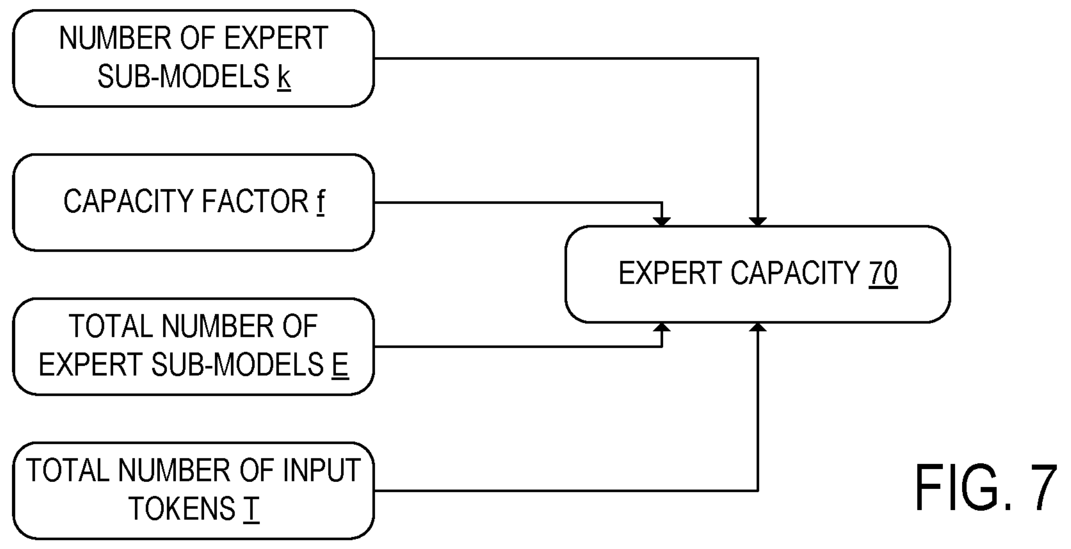
FIG. 7 schematically shows computation of an expert capacity of the MoE layer based at least in part on a capacity factor, according to the example of FIG. 1.

As shown in FIG. 7, the plurality of processing devices 12 may be further configured to compute the expert capacity 70 based at least in part on a capacity factor f of the MoE layer 32. The capacity factor f is a parameter of the gating function 38 via which the plurality of processing devices 12 may control the expert capacity 70. The expert capacity 70 may be computed as:

$$\text{ExpertCapacity} = k \cdot f \cdot \frac{T}{E}$$

where k is the number of destination expert sub-models 40A, f is the capacity factor, T is the total number of input tokens 36 per batch, and E is the total number of expert sub-models 40. The capacity factor f is a positive real number f>0.

Figure 8:
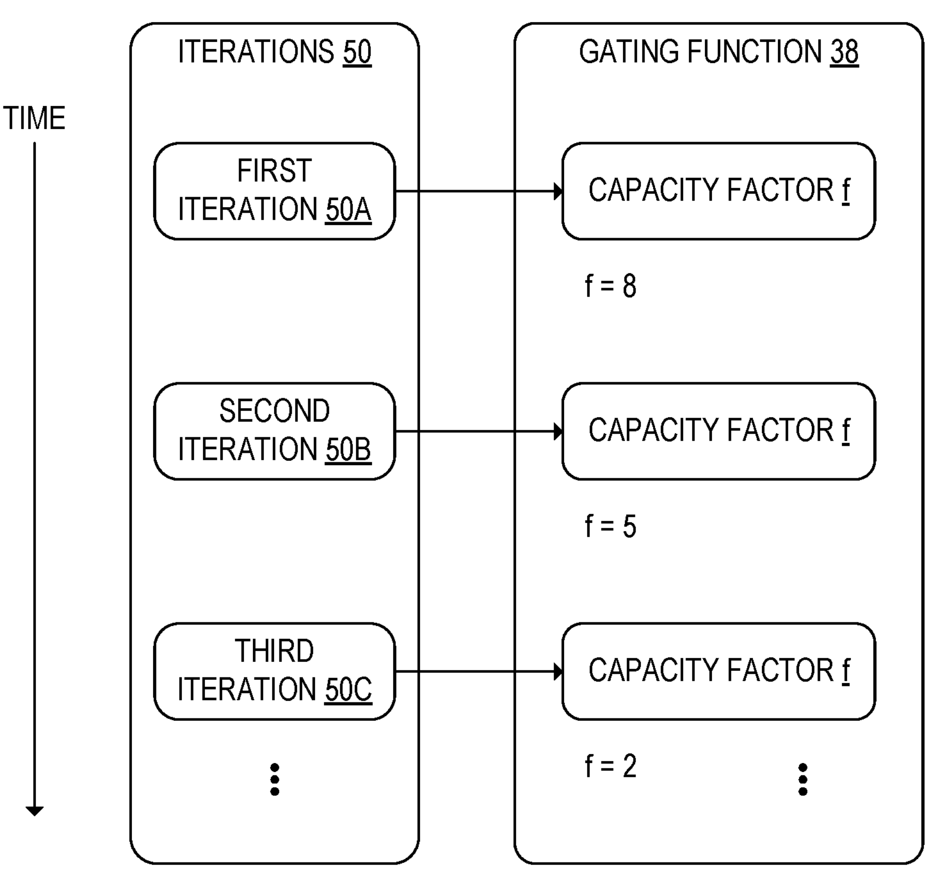
FIG. 8 schematically shows dynamic modification of the capacity factor over a plurality of iterations, according to the example of FIG. 7.

As depicted in the example of FIG. 8, the one or more processing devices 12 may dynamically modify the capacity factor f of the one or more destination expert sub-models 40A over the plurality of iterations 50. In the example of FIG. 8, the plurality of processing devices 12 set the capacity factor f to 8 in a first iteration 50A, to 5 in a second iteration 50B, and to 2 in a third iteration 50C.

Figure 9B:
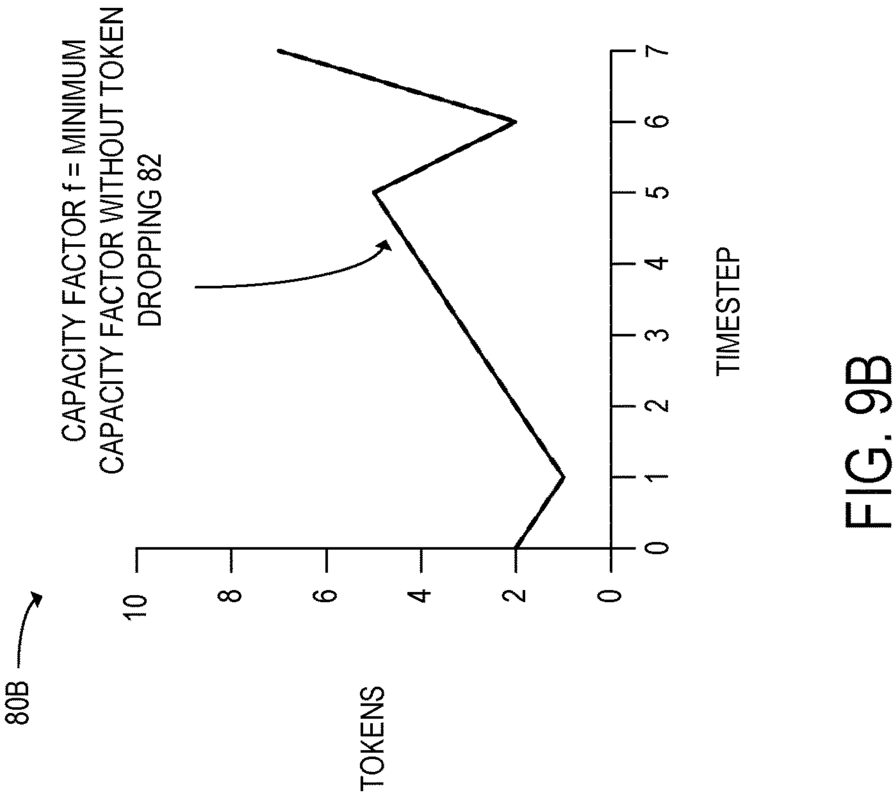
FIGS. 9A-9C show example plots of the capacity factor over a plurality of timesteps when the capacity factor is set according to different approaches, according to the example of FIG. 8.
Figure 9A:
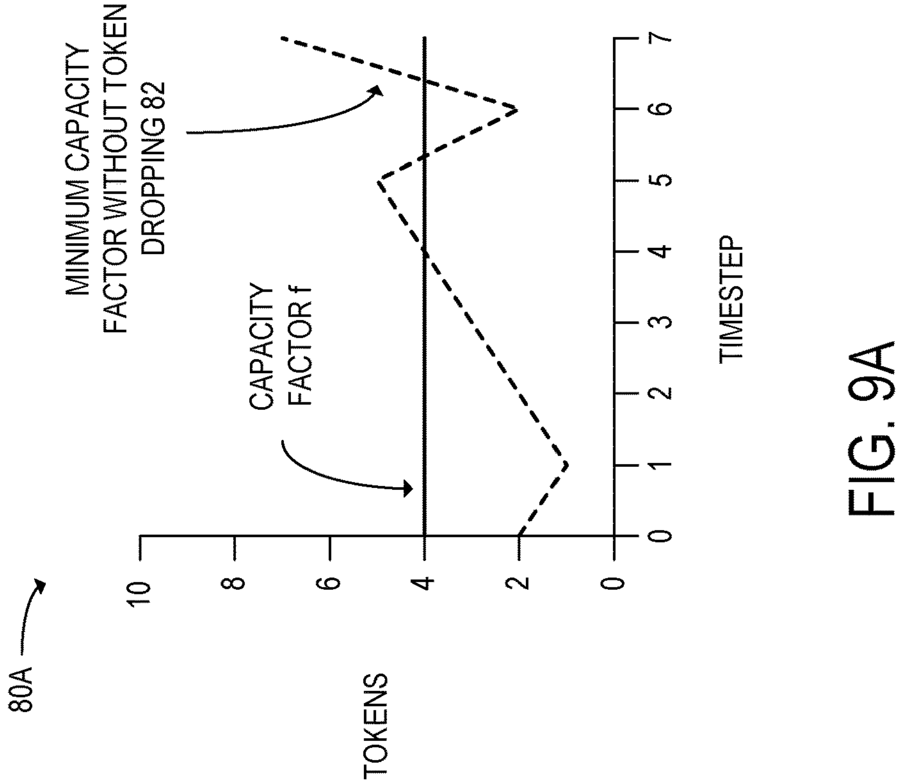
Figure 9C:
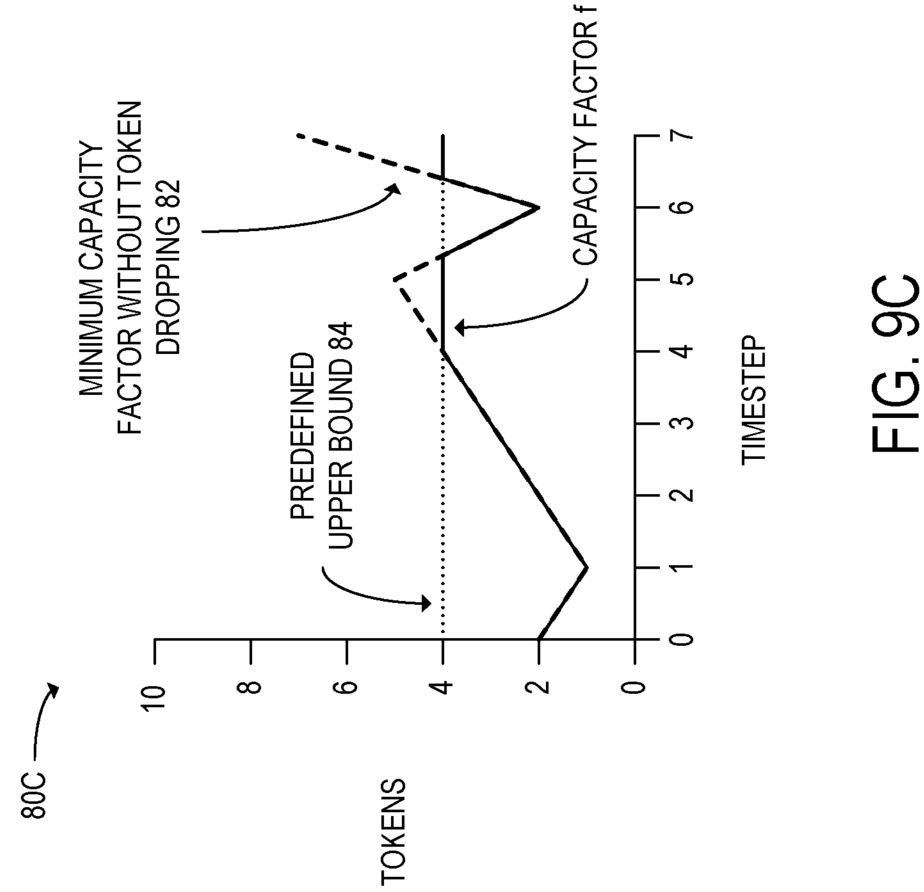

FIGS. 9A-9C show example plots of the capacity factor f over a plurality of timesteps when the capacity factor f is set according to different approaches. FIG. 9A shows a first example plot 80A in which a conventional static capacity factor approach is used. In the example of FIG. 9A, the capacity factor f has a constant value of 4 tokens across the plurality of timesteps. The first example plot 80A further shows a minimum capacity factor without token dropping 82, which varies over the course of the plurality of timesteps. As shown in FIG. 9, capacity underutilization and token dropping may both occur when the static capacity factor approach is used, and the capacity factor f is not adjusted to account for variation in the workload of the MoE layer 32.

FIG. 9B shows a second example plot 80B of the capacity factor f as a function of timestep. In the example of FIG. 9B, unlike the example of FIG. 9A, the plurality of processing devices 12 are configured to dynamically modify the capacity factor f over the plurality of iterations 50. During each of the iterations 50, according to the example of FIG. 9B, the plurality of processing devices 12 are configured to set the capacity factor f to a maximum among one or more respective numbers of the input tokens 36 respectively received at the one or more destination expert sub-models 40A during the iteration 50. The plurality of processing devices 12 thereby set the capacity factor f to the minimum capacity factor without token dropping 82. The plurality of processing devices 12 may, for example, be configured to set the capacity factor f to the minimum capacity factor without token dropping 82 in examples in which the performance of the MoE layer 32 is primarily constrained by the amount of input data, and/or examples in which the costs associated with unused capacity are small.

FIG. 9C shows a third example plot 80C in which the plurality of processing devices 12 are further configured to set a predefined upper bound 84 on the capacity factor f. In the example of FIG. 9C, when the minimum capacity factor without token dropping 82 is below the predefined upper bound 84, the capacity factor f is set to be equal to the minimum capacity factor without token dropping. Otherwise, the capacity factor f is set to be equal to the predefined upper bound 84. Accordingly, the plurality of processing devices 12 may be configured to avoid token dropping except when the workload of the MoE layer 32 is above a threshold. The predefined upper bound 84 may allow expert capacity underutilization to be reduced.

Figure 10A:
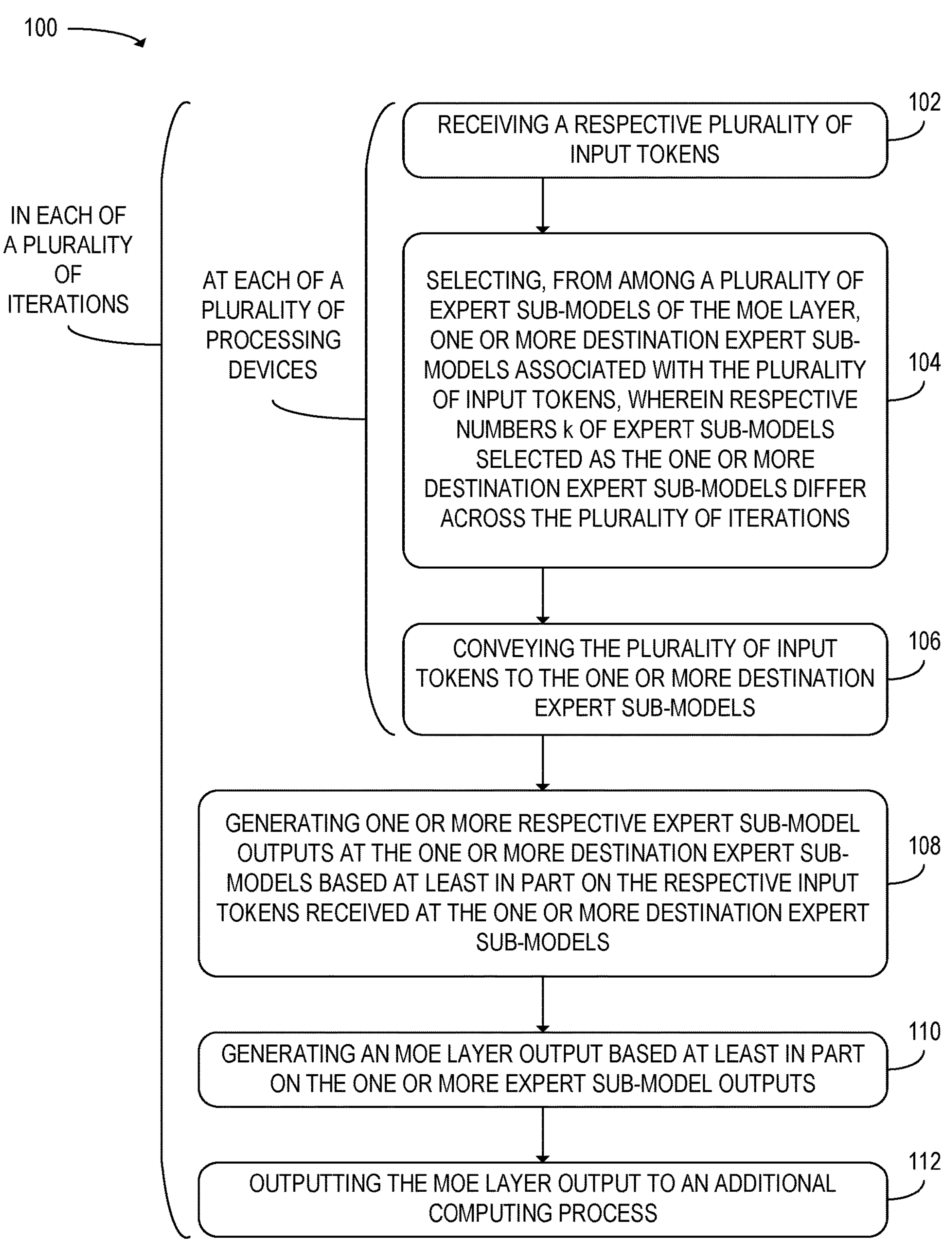
FIG. 10A shows a flowchart of an example method of executing an MoE layer included in an MoE model over a plurality of iterations, according to the example of FIG. 1.

FIG. 10A shows a flowchart of an example method 100 of executing a Mixture-of-Experts (MoE) layer included in an MoE model. The steps of the method 100 shown in FIG. 10A are configured to be performed at a computing system in each of a plurality of iterations when performing training or inferencing at the MoE layer. During each of the plurality of iterations, steps 102, 104, and 106 of the method 100 may be performed at each of a plurality of processing devices. At step 102, during each of the iterations, the method 100 includes receiving a respective plurality of input tokens. The plurality of input tokens may be arranged in an input tensor. In some examples, the plurality of input tokens may be received from a prior layer of the MoE model.

At step 104, the method 100 further includes selecting, from among a plurality of expert sub-models of the MoE layer, one or more destination expert sub-models associated with the plurality of input tokens. The respective numbers k of expert sub-models selected as the one or more destination expert sub-models differ across the plurality of iterations. The number k of destination expert sub-models at each iteration may be computed at a gate function that outputs the value of k to each of the processing devices. Thus, the number of destination expert sub-models may be dynamically varied. In some examples, the number k of destination expert sub-models may be set according to user input via an MoE layer API.

At step 106, the method 100 further includes conveying the plurality of input tokens to the one or more destination expert sub-models. A collective communication step may be performed between the plurality of processing devices when the input tokens are conveyed to the destination expert sub-models. The one or more destination expert sub-models may be executed at a subset of the plurality of processing devices or across all of the processing devices. Parallelization of the expert sub-models is discussed in further detail below.

At step 108, the method 100 further includes generating one or more respective expert sub-model outputs at the one or more destination expert sub-models based at least in part on the respective input tokens received at the one or more destination expert sub-models. Generating the expert sub-model output of an expert sub-model may include processing the input tokens at one or more feed-forward layers.

At step 110, the method 100 further includes generating an MoE layer output based at least in part on the one or more expert sub-model outputs. The processing devices may perform a collective communication step when generating the MoE layer output from the input tokens. The one or more expert sub-model outputs may, for example, take the form of output tokens included in an output tensor that is generated as the MoE layer output.

At step 112, the method 100 further includes outputting the MoE layer output to an additional computing process. In some examples, the additional computing process may be a subsequent layer of the MoE model to which the MoE layer output is transmitted. Alternatively, the MoE layer output may be a final output of the MoE model.

Figure 10B:
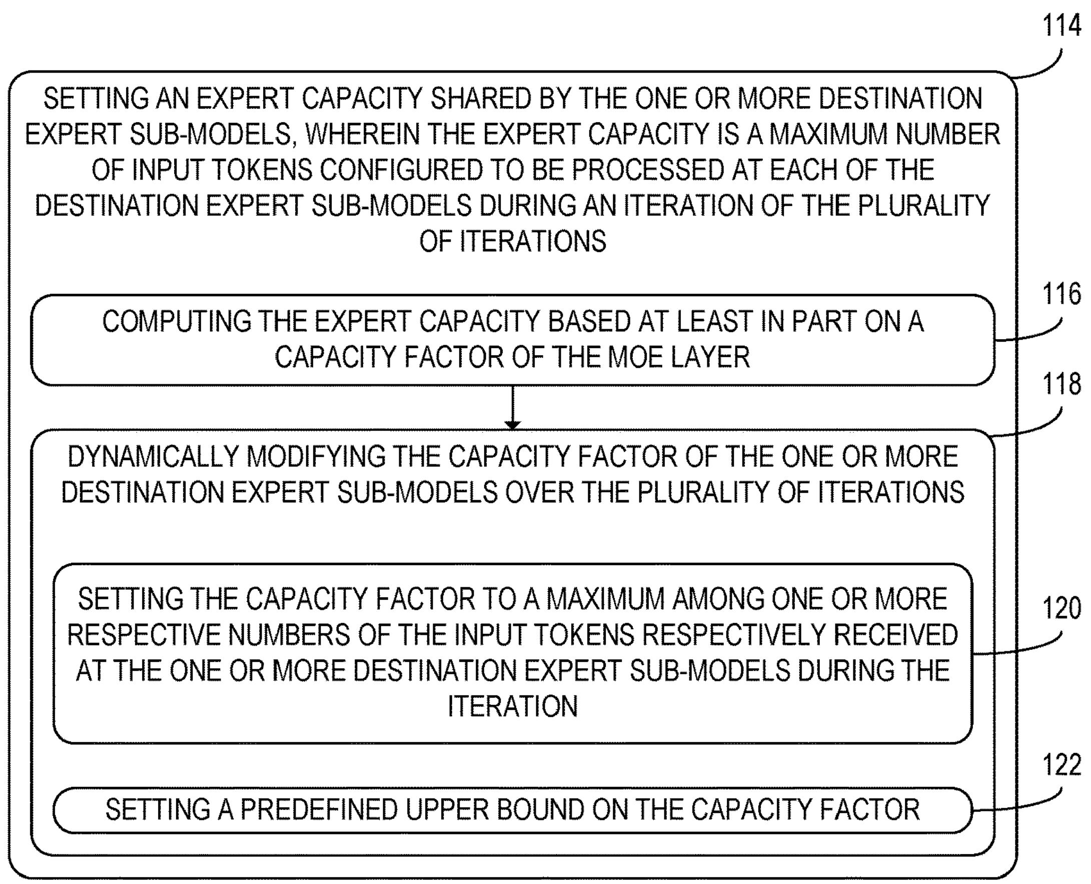
FIGS. 10B-10C show additional steps of the method of FIG. 10A that may be performed in some examples.

FIG. 10B shows additional steps of the method 100 that may be performed in some examples. At step 114, the method 100 may further include setting an expert capacity shared by the one or more destination expert sub-models. The expert capacity is a maximum number of input tokens configured to be processed at each of the destination expert sub-models during an iteration of the plurality of iterations. The expert capacity may be transmitted from a processing device to each of the other processing devices included in the plurality of processing devices, such that the plurality of processing devices each use the same value of the expert capacity when executing the destination expert sub-models.

Setting the expert capacity at step 114 may include, at step 116, computing the expert capacity based at least in part on a capacity factor of the MoE layer. In examples in which step 116 is performed, setting the expert capacity at step 114 may further include, at step 118, dynamically modifying the capacity factor of the one or more destination expert sub-models over the plurality of iterations. During each of the iterations, dynamically modifying the capacity factor may include, at step 120, setting the capacity factor to a maximum among one or more respective numbers of the input tokens respectively received at the one or more destination expert sub-models during the iteration. The capacity factor may therefore be set to a minimum value at which token dropping does not occur. In some examples, dynamically modifying the capacity factor may alternatively include, at step 122, setting a predefined upper bound on the capacity factor. In examples in which the plurality of processing devices upper-bound the capacity factor, the capacity factor may be set to the minimum value at which token dropping does not occur when that value is below the predefined upper bound.

Figure 10C:
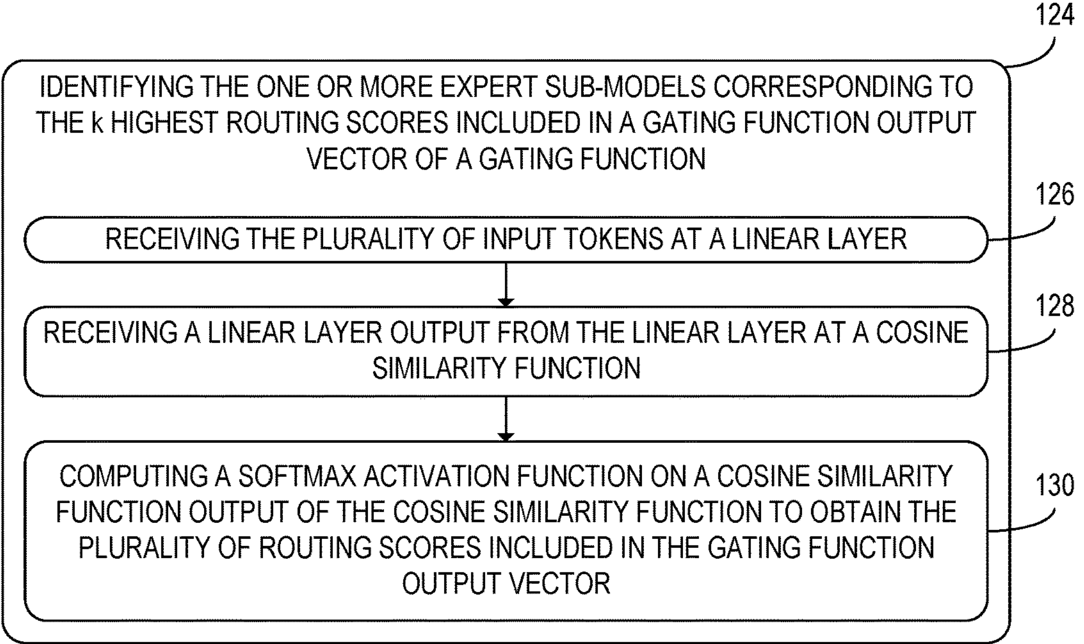

FIG. 10C shows additional steps of the method 100 that may be performed when selecting the one or more destination expert sub-models at step 104. At step 124, the method 100 may further include identifying the one or more expert sub-models corresponding to the k highest routing scores included in a gating function output vector of a gating function. The gating function may be executed at each of the processing devices.

Executing the gating function at step 124 may include, at step 126, receiving the plurality of input tokens at a linear layer. The linear layer may have a plurality of learned parameters. At step 128, step 124 may further include receiving a linear layer output from the linear layer at a cosine similarity function. The cosine similarity function may include a learned temperature parameter. At step 130, step 124 may further include computing a SoftMax activation function on a cosine similarity function output of the cosine similarity function to obtain the plurality of routing scores included in the gating function output vector. The plurality of processing devices may thereby select the plurality of routing scores from among which the top k values are selected to identify the one or more destination expert sub-models.

Using the dynamic top-k gating and dynamic expert capacity techniques discussed above, the workload of an MoE layer included in an MoE model may be adjusted across a plurality of iterations during training or inferencing. By adjusting the value of k, the processing devices may adjust the sparsity of the MoE layer. Modifying the sparsity of the MoE layer between iterations may be used to account for uneven distribution of input tokens across the expert sub-models between different batches of input tokens. Token dropping and capacity underutilization at the expert sub-models may accordingly be reduced. In addition, by modifying the expert capacity of the MoE layer over the plurality of iterations, the plurality of processing devices may further adjust for changes in the MoE layer workload. The dynamic expert capacity techniques discussed above may therefore achieve further reductions in token dropping and expert capacity underutilization.

Dynamically setting the number of destination expert sub-models and the expert capacity may also allow for greater increases in performance when switchable parallelism approaches are used, as discussed in further detail below.

The communication of input and output tokens between the plurality of processing devices 12 is now discussed in additional detail. In previous MoE models, computation at the expert sub-models is often performed inefficiently when the expert sub-models are executed across multiple processing devices. This decrease in expert sub-model performance occurs when the tensors that are input into the expert sub-models have shapes that are inefficient to process at GPUs or similar hardware accelerators. For example, when a number of GPUs used to execute an MoE layer of a conventional MoE model increases from 1 to 2048, a matrix multiplication performed at each expert sub-model may change from $A(1, \Delta E, 16384, M) \cdot W(\Delta E, M, V)$ to $B(2048, \Delta E, 8, M)$, where A, B, and W are tensors and the parentheticals indicate tensor shapes. In the above expressions for the shapes of the tensors, $\Delta E$ is the number of local expert sub-models executed at each processing device, M is a channel size of each of the expert sub-models, and V is a hidden layer size of each of the expert sub-models. Since the third dimension of the input tensor received at the expert sub-model changes from 16384 to 8 when the number of GPUs increases from 1 to 2048, the input to the expert sub-model may be processed less efficiently.

In order to address the problem of inefficient tensor layouts in existing MoE layers, the following techniques may be used to dynamically adjust tensor layouts at the MoE layer 32. FIG. 11 schematically shows the computing system 10 when the plurality of processing devices 12 communicate with each other during a first collective communication phase 200 and during a second collective communication phase 204. The plurality of processing devices 12 are configured to perform the first collective communication phase 200 subsequently to receiving the inputs of the MoE layer 32. The expert computation 202 performed at the expert sub-models 40 is performed subsequently to the first collective communication phase 200. Thus, in the first collective communication phase 200, the input tokens 36 are routed to their respective destination expert sub-models 40A. The processing devices 12 may perform an all-to-all dispatch operation when routing the input tokens 36 during the first collective communication phase 200.

The second collective communication phase 204 is performed subsequently to performing the expert computation 202 at the one or more destination expert sub-models 40A and prior to emitting the outputs of the MoE layer 32. During the second collective communication phase 204, post-processing is performed on the outputs of the expert sub-models 40 to generate the output tensor 42 of the MoE layer 32. The processing devices 12 may perform an all-to-all combine operation when routing the output tokens 44 of the expert sub-models 40 during the second collective communication phase 204.

Figure 12:
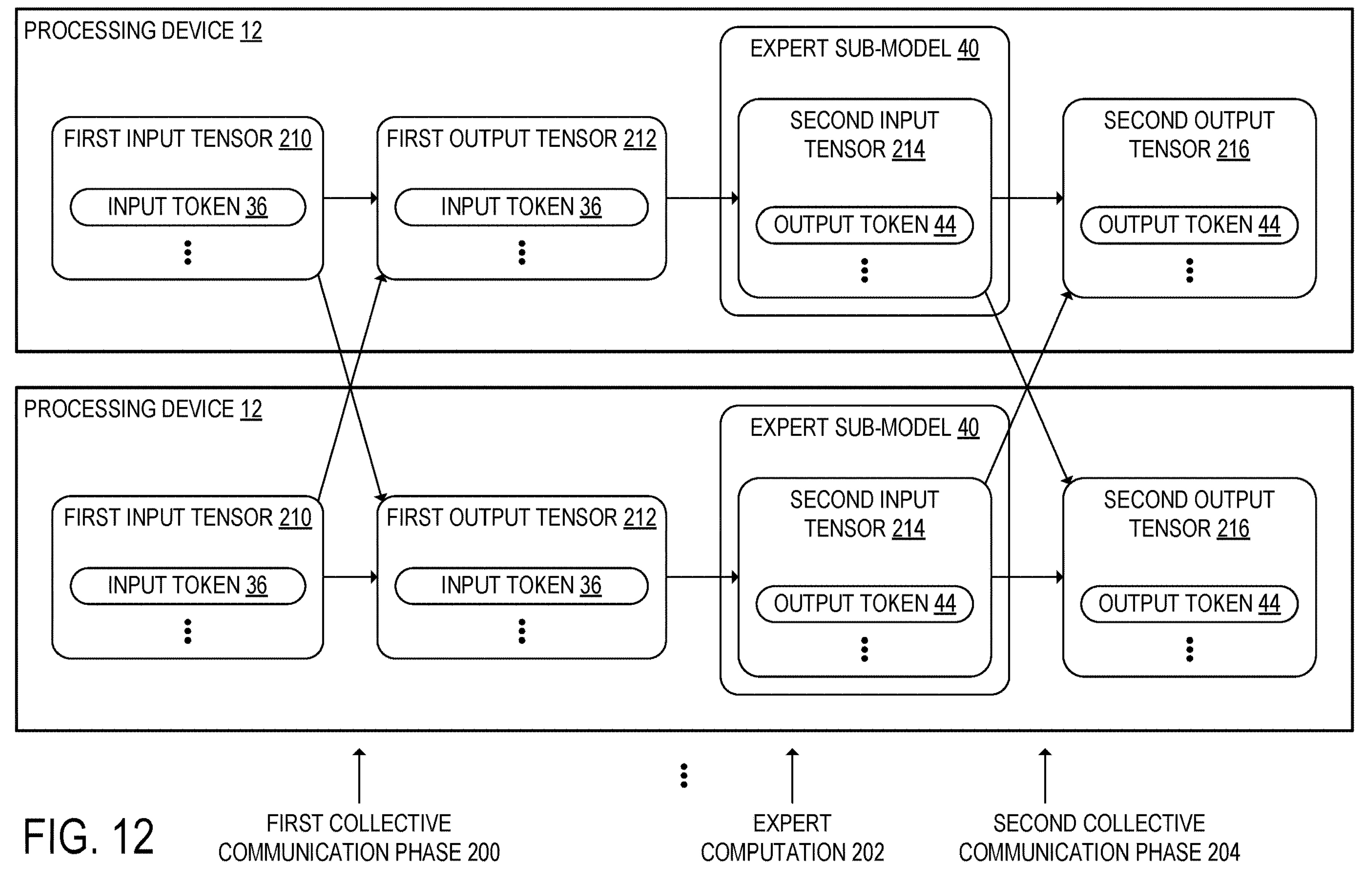
FIG. 12 schematically shows two processing devices during the first collective communication phase, expert computation, and the second collective communication phase, according to the example of FIG. 11.

FIG. 12 schematically shows two processing devices 12 during the first collective communication phase 200, the expert computation 202, and the second collective communication phase 204. As shown in FIG. 12, the plurality of processing devices 12 are configured to receive a respective plurality of first input tensors 210. The first input tensors 210 include the plurality of input tokens 36 and may be the first input tensors 34 received as inputs to the MoE layer 32.

The plurality of processing devices 12 are further configured to generate a plurality of first output tensors 212 based at least in part on the plurality of first input tensors 210 during the first collective communication phase 200. The plurality of first output tensors 212 each include a plurality of the input tokens 36 that have been rearranged into the plurality of first output tensors 212 during the first collective communication phase 200.

Figure 13:
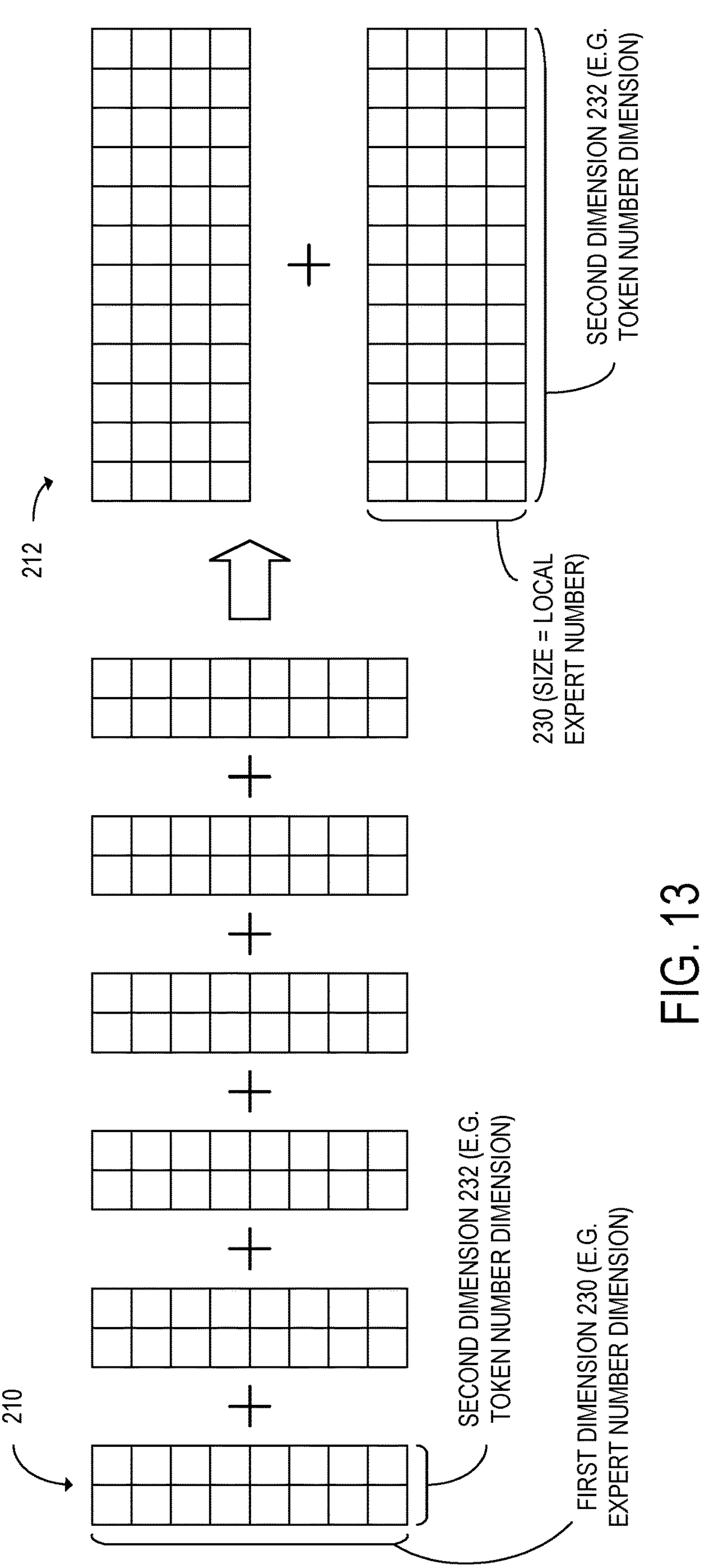
FIG. 13 schematically shows computation of first output tensors from first input tensors during the first collective communication phase, according to the example of FIG. 12.

FIG. 13 shows the computation of the first output tensors 212 from the first input tensors 210 in additional detail, according to one example. As shown in FIG. 13, the plurality of processing devices 12 are configured to split each of the first input tensors 210 along a first dimension 230. The first dimension 230 in the example of FIG. 13 is an expert number dimension of the first input tensor 210. The size of each first input tensor 210 expert number dimension is the number of expert sub-models 40 to which the input tokens 36 included in the first input tensor 210 are configured to be transmitted in the first collective communication phase 200.

In the example of FIG. 13, when the plurality of first output tensors 212 are generated, the plurality of processing devices 12 are further configured to concatenate the plurality of first input tensors 210 along a second dimension 232 when computing the plurality of first output tensors 212. The second dimension 232 may be a token number dimension that indicates a number of input tokens 36 of the first input tensor 210 that are transmitted to each destination expert sub-model 40A that receives input tokens 36 from the first input tensor 210.

Returning to FIG. 12, subsequently to the first collective communication phase 200, the plurality of processing devices 12 are further configured to process the first output tensors 212 at a respective a plurality of the expert sub-models 40 (the destination expert sub-models 40A) during the expert computation 202 to obtain a plurality of second input tensors 214. The second input tensors 214 may each include a plurality of the output tokens 44 shown in FIG. 2 as being included in the output tensor 42 of the MoE layer 32.

The plurality of processing devices 12 are further configured to receive the plurality of second input tensors 214 from the plurality of expert sub-models 40 during the second collective communication phase 204. The plurality of processing devices 12 are further configured to compute a respective plurality of second output tensors 216 based at least in part on the second input tensors 214. The second output tensors 216 may each include a respective plurality of the output tokens 44 generated at the expert sub-models 40 and may be generated by redistributing the output tokens 44 included in the second input tensors 214.

Figure 14:
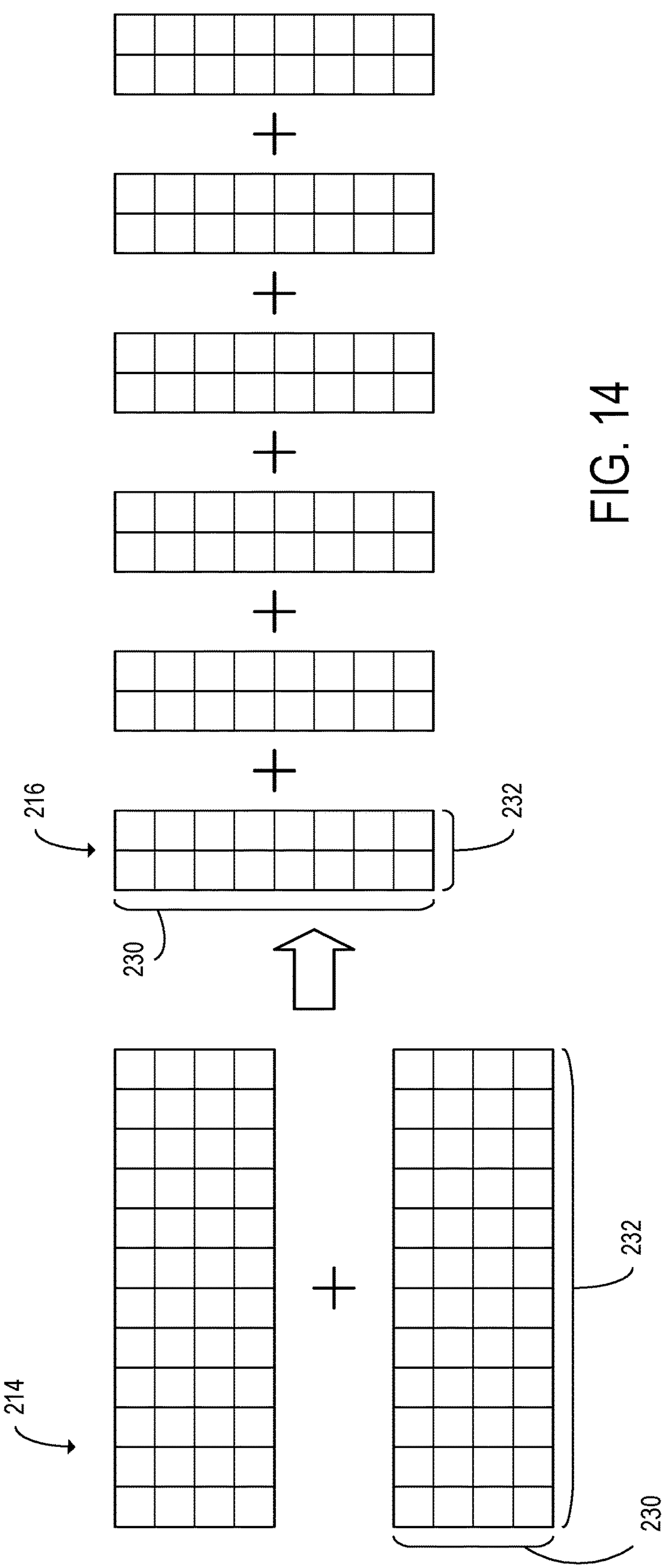
FIG. 14 schematically shows computation of second output tensors from second input tensors during the second collective communication phase, according to the example of FIG. 13.

FIG. 14 schematically shows the computation of the plurality of second output tensors 216 in additional detail, according to the example of FIG. 13. As depicted in FIG. 14, computing the plurality of second output tensors 216 includes concatenating the plurality of second input tensors 214 along the first dimension 230. In addition, the plurality of processing devices 12 are further configured to split each of the plurality of second input tensors 214 along the second dimension 232 when computing the plurality of second output tensors 216 in the example of FIG. 14. Thus, the second input tensors 214 may be concatenated along the expert number dimension and split along the token number dimension.

Figure 15:
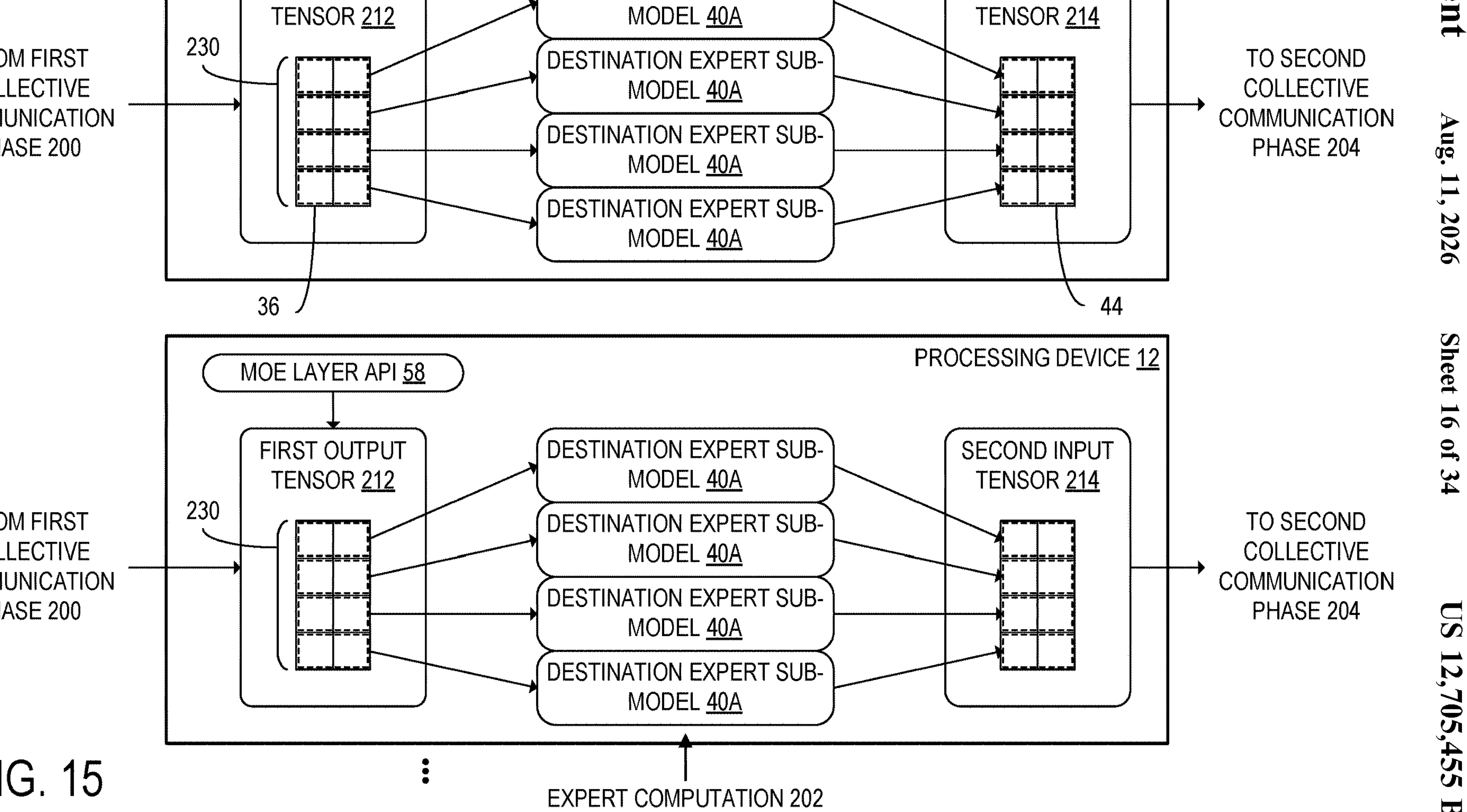
FIG. 15 schematically shows two processing devices when the expert computation is performed on the first output tensors, according to the example of FIG. 12.

FIG. 15 schematically shows two processing devices 12 of the plurality of processing devices when the expert computation 202 is performed on the first output tensors 212. In the example of FIG. 15, at each of the two processing devices 12 shown, four sets of two input tokens 36 each are transmitted to four respective destination expert sub-models 40A. As shown in the example of FIG. 15, a same local expert number of the plurality of expert sub-models 40 may be executed at each of the plurality of processing devices 12 configured to execute the expert sub-models 40. The local expert number is equal to four in the example of FIG. 15. Accordingly, the execution of the destination expert sub-models 40A may be distributed across the plurality of processing devices 12 such that the computing resources of the processing devices 12 are utilized more efficiently. In addition, the plurality of first output tensors 212 may each have a size in the expert number dimension (the first dimension 230 in the example of FIG. 15) equal to the local expert number.

FIG. 15 further shows the respective second input tensors 214 generated at the plurality of processing devices 12 during the expert computation 202. The second input tensors 214 depicted in the example of FIG. 15 each have a respective size in the expert number dimension equal to the local expert number. The second input tensors 214 also have the same sizes in the token number dimension (the second dimension 232 in the example of FIG. 15) as the first output tensors 212. Thus, a same per-processing-device token number of input tokens 36 are processed at each of the plurality of processing devices 12 configured to execute the expert sub-models 40. In other examples, the second input tensors 214 may each have some other size in the token number dimension.

In previous implementations of all-to-all dispatch operations performed when implementing an MoE layer across multiple processing devices, the all-to-all dispatch operation transforms a tensor layout from ($E$, $\Delta C$, $M$) to ($W$, $\Delta E$, $\Delta C$, $M$), where $E$ is the total number of expert sub-models, $\Delta C$ is the local number of tokens processed at each processing device within a local capacity limit, $M$ is the channel size of each of the expert sub-models, $W$ is the number of processing devices, and $\Delta E$ is the number of local expert sub-models executed at each processing device. This tensor layout transformation may produce tensors with sizes in the local token number dimension that are inefficient to process at GPUs, as discussed above.

In contrast to the tensor layouts produced in previous implementations of MoE layers across multiple processing devices, the first collective communication phase 200 discussed herein produces tensor layouts for the first output tensors 212 that are independent of the number of processing devices 12. As shown in the example of FIG. 15, the first dimension 230 and the second dimension 232 along which splitting and concatenation are respectively performed may be specified at the MoE layer API 58 as additional inputs to the first collective communication phase 200.

Rather than having layouts with dimensions given by ($W$, $\Delta E$, $\Delta C$, $M$), the plurality of first output tensors 212 may instead each have layouts given by ($\Delta E$, $C$, $M$). In the above expression for the tensor layout of a first output tensor 212, $C$ is the size of the first output tensor 212 in the token number dimension following the concatenation shown in FIG. 13. By using a layout for the first output tensor 212 that is independent of the number of processing devices 12, the MoE layer 32 may be scaled to larger numbers of processing devices 12 without reducing the efficiency of executing the expert sub-models 40.

Figure 16:
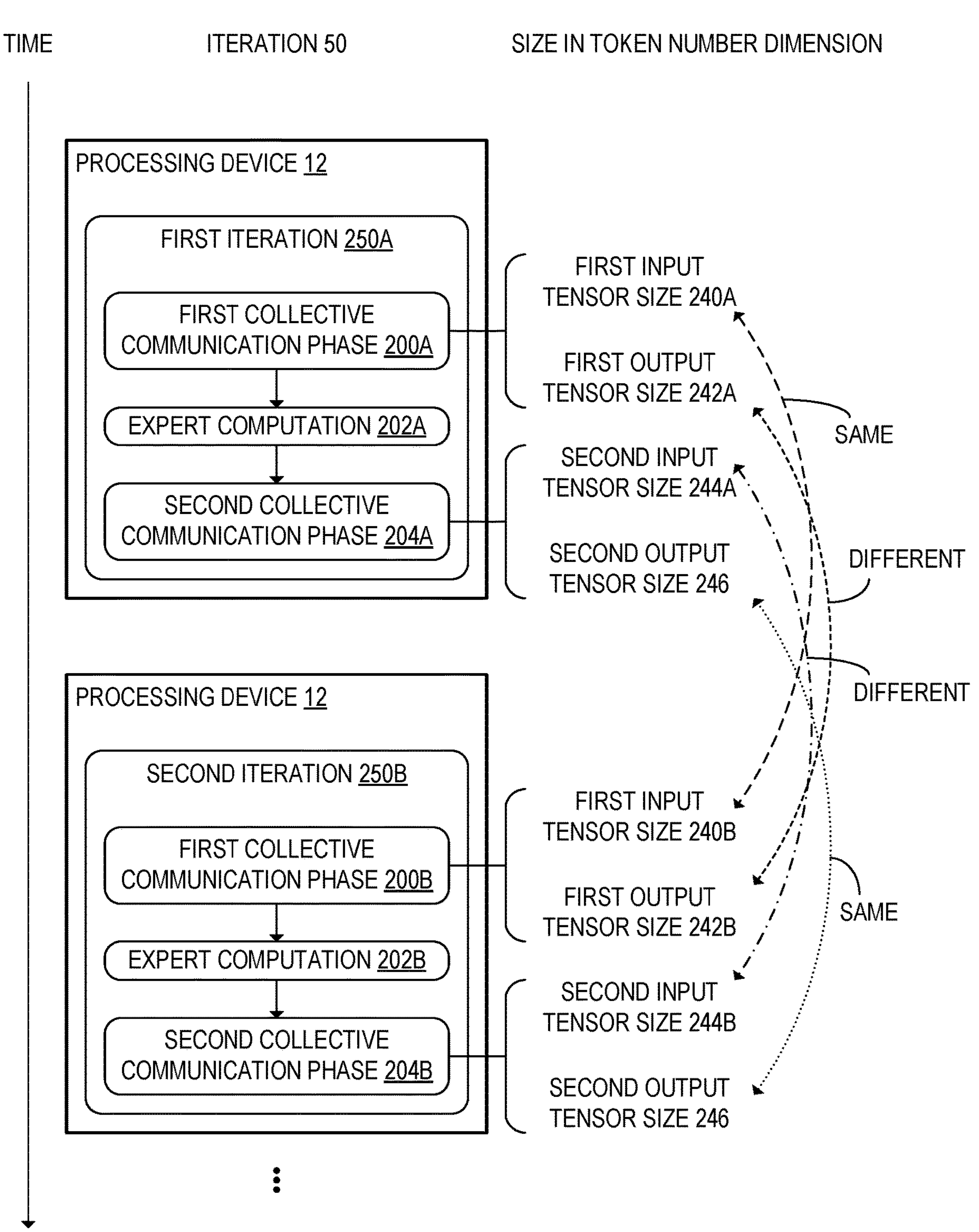
FIG. 16 schematically shows comparisons between the sizes of tensors processed at the MoE layer in a plurality of iterations, according to the example of FIG. 12.

The tensor layout given by ($\Delta E$, $C$, $M$) also allows the plurality of processing devices 12 to adjust for changes in the expert capacity 70 by dynamically modifying the size of the first output tensor 212 in the expert number dimension, as depicted in the example of FIG. 16. As shown in FIG. 16, the first collective communication phase 200 and the second collective communication phase 204 are performed in each of a plurality of iterations 50. FIG. 16 schematically shows, for a processing device 12 of the plurality of processing devices 12, a first iteration 250A including a first collective communication phase 200A, an expert computation 202A, and a second collective communication phase 204A. FIG. 16 further shows a second iteration 250B performed at the processing device 12, including a first collective communication phase 200B, an expert computation 202B, and a second collective communication phase 204B.

The respective first input tensors 210 received at the processing device 12 in the plurality of iterations 50 have same respective sizes in the second dimension 232, which is the token number dimension in the example of FIG. 16. In both the first collective communication phase 200A of the first iteration 250A and the first collective communication phase 200B of the second iteration 250B, the first input tensor 210 has a first input tensor size 240 in the token number dimension. However, the respective first output tensors 212 computed in each iteration 50 have differing sizes in the second dimension 232 across the plurality of iterations 50. The first collective communication phase 200A in the first iteration 250A and the first collective communication phase 200B in the second iteration 250B output respective first output tensors 212 that have different first output tensor sizes 242A and 242B. These differences in output tensor sizes may occur due to variability in the workloads of the expert sub-models 40. Between the first iteration 250A and the second iteration 250B shown in the example of FIG. 16, the expert capacity 70 of the expert computation 202 may be modified. Thus, during the expert computation 202B performed in the second iteration 250B, a different number of expert sub-models may be used relative to the expert computation 202A performed in the first iteration 250A. The first output tensors 212 in the first iteration 250A and the second iteration 250B may therefore differ in size along the expert number dimension.

As depicted in the example of FIG. 16, the second input tensor sizes 244A and 244B of the respective second input tensors 214 computed at the destination expert sub-models 40A differ between the first iteration 250A and the second iteration 250B. However, across the plurality of iterations 50, each of the expert sub-models 40 may have consistent input and output tensor sizes in the expert number dimension equal to a fixed tile size T. When the number of input tokens 36 sent to an expert sub-model 40 is below the expert capacity 70, as discussed above with reference to FIG. 6, the second output tensor 212 received at the expert sub-model 40 may be configured to pad the second output tensor 212 to have the fixed tile size T in the expert number dimension.

When the processing device 12 performs the second collective communication phase 204A in the first iteration 250A and the second collective communication phase 204B in the second iteration 250B, the processing device 12 may generate respective second output tensors 216 that have the same size in the token number dimension. In the example of FIG. 16, the respective second output tensors 216 generated at the processing device 12 during the first iteration 250A and the second iteration 250B both have a second output tensor size 246.

Inefficient utilization of communication bandwidth between the processing devices 12 is another challenge that may occur when implementing an MoE layer on a large number of processing devices 12. Inefficient communication may occur due to small message sizes when data is passed between the processing devices 12 during the collective communication phases. Slow communication between the processing devices 12 may be exacerbated when the workload of the expert sub-models 40 is low.

In order to allow the plurality of processing devices 12 to communicate more efficiently in the first collective communication phase 200 and the second collective communication phase 204, the data included in the first input tensors 210 and the second input tensors 214 may be rearranged. This rearrangement may allow the processing devices 12 to transmit data to each other in larger chunks, thereby increasing the bandwidth efficiency of collective communication. In addition, rearranging the first input tensors 210 and the second input tensors 214 may reduce the number of network connections between the processing devices 12 by not requiring a mesh connection between all the processing devices 12. Instead, mesh connections between the nodes 11 may be used to connect the processing devices 12. Reducing the number of network connections may reduce congestion over the network. Rearranging the first input tensors 210 and the second input tensors 214 may also allow cross-rail communication between the processing devices 12 to be avoided, which may result in higher communication efficiency.

Figure 17A:
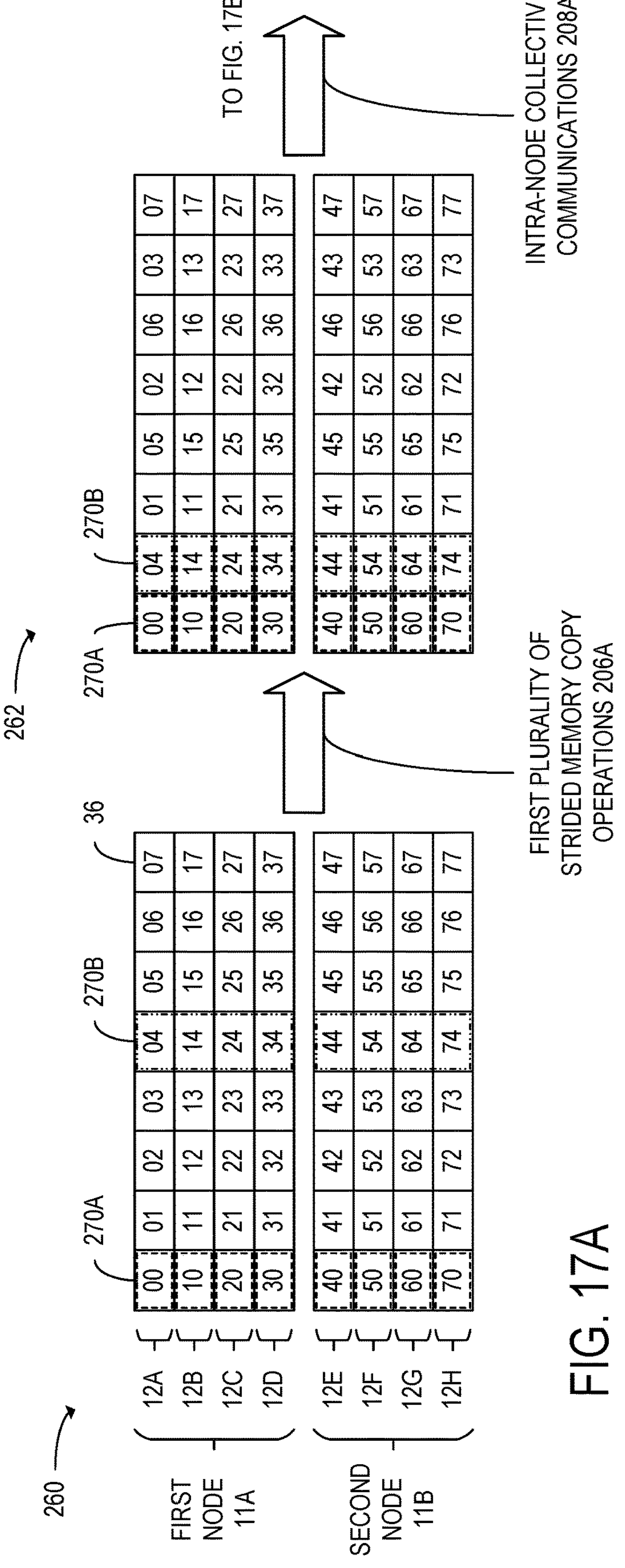
FIGS. 17A-17B schematically show reorganization of tokens at respective processing devices included in a first node and a second node of the computing system during the first collective communication phase, according to the example of FIG. 11.
Figure 17B:
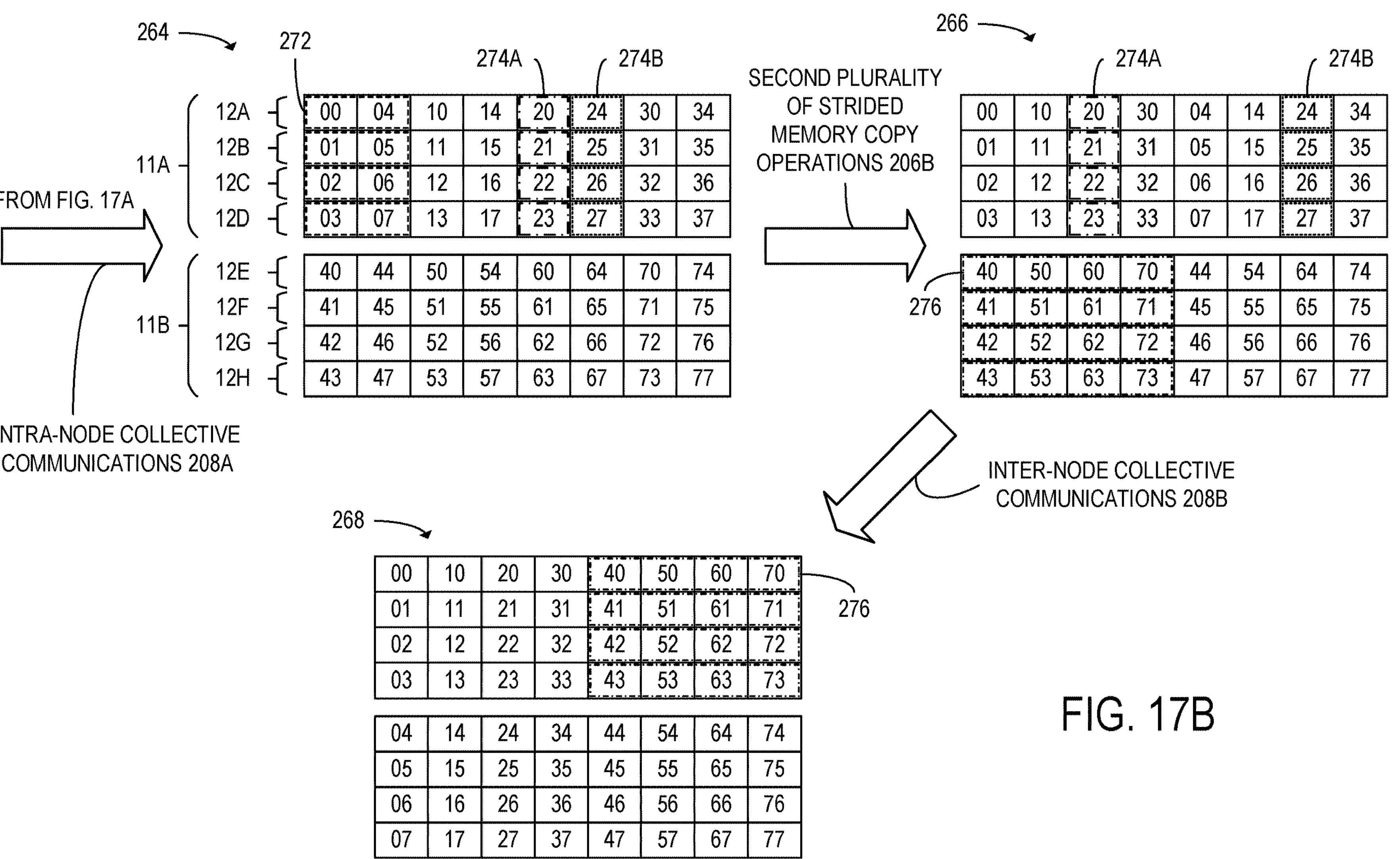

As discussed above with reference to FIG. 1, the plurality of processing devices 12 may be at least partially located in a plurality of nodes 11 that each include two or more of the plurality of processing devices 12. FIGS. 17A-17B schematically show reorganization of tokens at respective processing devices 12 included in a first node 11A and a second node 11B of the computing system 10. The first node 11A shown in the example of FIGS. 17A-17B includes processing devices 12A, 12B, 12C, and 12D. The second node 11B includes processing devices 12E, 12F, 12G, and 12H. As discussed above with reference to FIG. 1, each of the processing devices 12 in the example of FIGS. 17A-17B has an associated memory device 14. FIGS. 17A-17B show rearrangement of input tokens 36 within the memory devices 14 of the processing devices 12 via a plurality of first strided memory copy operations 206A and a plurality of second strided memory copy operations 206B. FIGS. 17A-17B further show intra-node and inter-node collective communications 208A and 208B of those input tokens 36 between the processing devices 12. The intra-node collective communications 208A and the inter-node collective communications 208B are shown as all-to-all dispatch operations in the example of FIGS. 17A-17B.

In the example of FIG. 17A, each of the processing devices 12 receives a respective input tensor 34 including eight input tokens 36 indicated with respective index numbers. The input tokens 36 received at the processing devices 12 are shown in a first layout 260 in FIG. 17A. The input tokens 36 stored at each processing devices 12 in the first layout 260 are arranged in the order of the last digits of their indices. A plurality of first memory regions 270A that store the input tokens 36 with indices ending in 0 and a plurality of second memory regions 270B that store the input tokens 36 with indices ending in 4 are shown in FIG. 17A as example columns of memory regions.

As shown in the example of FIG. 17A, the plurality of processing devices 12 are further configured to reorganize a first plurality of memory regions of the respective memory devices 14 associated with the plurality of processing devices 12. This reorganization is performed by performing a first plurality of strided memory copy operations 206A on the first plurality of memory regions at each of the processing devices 12 included in each of the plurality of nodes 11. The first strided memory copy operations 206A are performed within each of the processing devices 12A, 12B, 12C, 12D, 12E, 12F, 12G, and 12H. In the example of FIG. 17A, the memory regions are reorganized into a second layout 262 in which the first memory regions 270A are moved to be adjacent to the second memory regions 270B. Thus, in the second layout 262, the input tokens 36 with indices ending in 0 are adjacent to the input tokens 36 with indices ending in 4. Other columns of input tokens 36 depicted in FIG. 17A are also rearranged.

Subsequently to performing the first plurality of strided memory copy operations 206A, the plurality of processing devices 12 are further configured to perform a plurality of intra-node collective communications 208A between the two or more processing devices 12 included in each of the plurality of nodes 11. During the intra-node collective communications 208A, a plurality of input tokens 36 are exchanged between the processing devices 12. FIG. 17B shows a third layout 264 of the input tokens 36 following the intra-node collective communications 208A between the processing devices 12. In the third layout 264, each of the processing devices 12A, 12B, 12C, and 12D has received input tokens 36 from each of the other processing devices 12 included in the first node 11A. In addition, each of the processing devices 12E, 12F, 12G, and 12H has received input tokens 36 from each of the other processing devices 12 included in the second node. According to the example of FIG. 17B, the input tokens 36 are transmitted between the processing devices 12 in a plurality of first memory chunks 272 within which the order of the input tokens 36 is preserved. The first memory chunks 272 are input token pairs in the example of FIGS. 17A-17B.

When reorganizing the first plurality of memory regions during the first plurality of strided memory copy operations 206A, the plurality of processing devices 12 are further configured to aggregate the plurality of first memory chunks 272 that have a same destination processing device to which the first memory chunks 272 are configured to be transmitted during the intra-node collective communications 208A. The plurality of first memory chunks in the example of FIG. 17A are the portions of the memory that store the input tokens 36. By grouping together the first memory chunks 272 that are transmitted to the same processing devices 12, the plurality of processing devices 12 may accordingly increase the message size during the intra-node collective communications 208A. Thus, the plurality of processing devices 12 may utilize communication bandwidth more efficiently.

The plurality of processing devices 12 are further configured to perform a second plurality of strided memory copy operations 206B on a second plurality of memory regions subsequently to performing the intra-node collective communications 208A. FIG. 17B further shows a third layout 266 of the input tokens 36 subsequently to the second plurality of strided memory copy operations 206B. The second plurality of memory regions, as shown in the example of FIG. 17B, include a plurality of first memory regions 274A and a plurality of second memory regions 274B. The plurality of first memory regions 274A and the plurality of second memory regions 274B are organized such that cross-device columns of the second memory regions within each of the nodes 11 store respective columns of input tokens 36 with consecutive indices. The second plurality of strided memory copy operations 206B depicted in FIG. 17B move the first memory regions 274A and the second memory regions 274B such that the first memory regions 274A and the second memory regions 274B are not contiguous to each other.

The plurality of processing devices 12 are further configured to perform inter-node collective communications 208B between the plurality of nodes 11. FIG. 17B shows a fourth layout 268 of the input tokens 36 subsequently to the inter-node collective communications 208B. During the inter-node collective communications 208B, input tokens 36 are exchanged between the processing devices 12A, 12B, 12C, and 12D included in the first node 11A and the processing devices 12E, 12F, 12G, and 12H included in the second node 11B.

The input tokens 36, as shown in the example of FIG. 17B, are transmitted between the nodes 11 in a plurality of second memory chunks 276 into which the input tokens 36 are arranged during the second plurality of strided memory copy operations 206B. When reorganizing the second plurality of memory regions during the second plurality of strided memory copy operations 206B, the plurality of processing devices 12 are further configured to aggregate the plurality of second memory chunks 276. The plurality of processing devices 12 aggregate second memory chunks 276 that have a same destination processing device to which the second memory chunks 276 are configured to be transmitted during the inter-node collective communications 208B. Thus, the message sizes transmitted during the inter-node collective communications 208B are increased. Rearranging the input tokens 36 as shown in FIGS. 17A-17B and performing intra-node collective communications 208A separately from inter-node collective communications 208B may therefore result in more efficient utilization of communication bandwidth by the plurality of processing devices 12.

The first plurality of strided memory copy operations 206A, the intra-node collective communications 208A, the second plurality of strided memory copy operations 206B, and the inter-node collective communications 208B shown in FIGS. 17A-17B are configured to be performed during the first collective communication phase 200. Over the course of the transformations performed on the input tensors 34 during the first collective communication phase 200, the input tokens 36 included in each input tensor 34 are distributed among the plurality of processing devices 12 such that each processing device 12 is configured to process one respective input token 36 initially received at each of the plurality of processing devices 12. In examples in which the number of processing devices 12 differs from the size of the input tensors 34 in the token number dimension, each of the processing devices 12 may be configured to process some other number of input tokens 36 initially received at each of the plurality of processing devices 12, respectively.

A corresponding first plurality of strided memory copy operations, inter-node collective communications, second plurality of strided memory copy operations, and inter-node collective communications may also be performed in the second collective communication phase 204 in some examples. In such examples, the plurality of processing devices 12 may reorganize the output tokens 44 generated at the destination expert sub-models 40A. For example, during the second collective communication phase 204, the plurality of processing devices 12 may be configured to reverse the token reorganization performed during the first collective communication phase 200. Thus, the output tensors 42 of the MoE layer 32 may be organized in a layout that matches the first layout 260 shown in FIG. 17A. Similarly to the reorganization of the input tokens 36 during the first collective communication phase 200, reorganization of the output tokens 44 during the second collective communication phase 204 may increase the message size of the messages transmitted between the nodes 11, thereby allowing communication bandwidth to be utilized more efficiently.

Figure 18A:
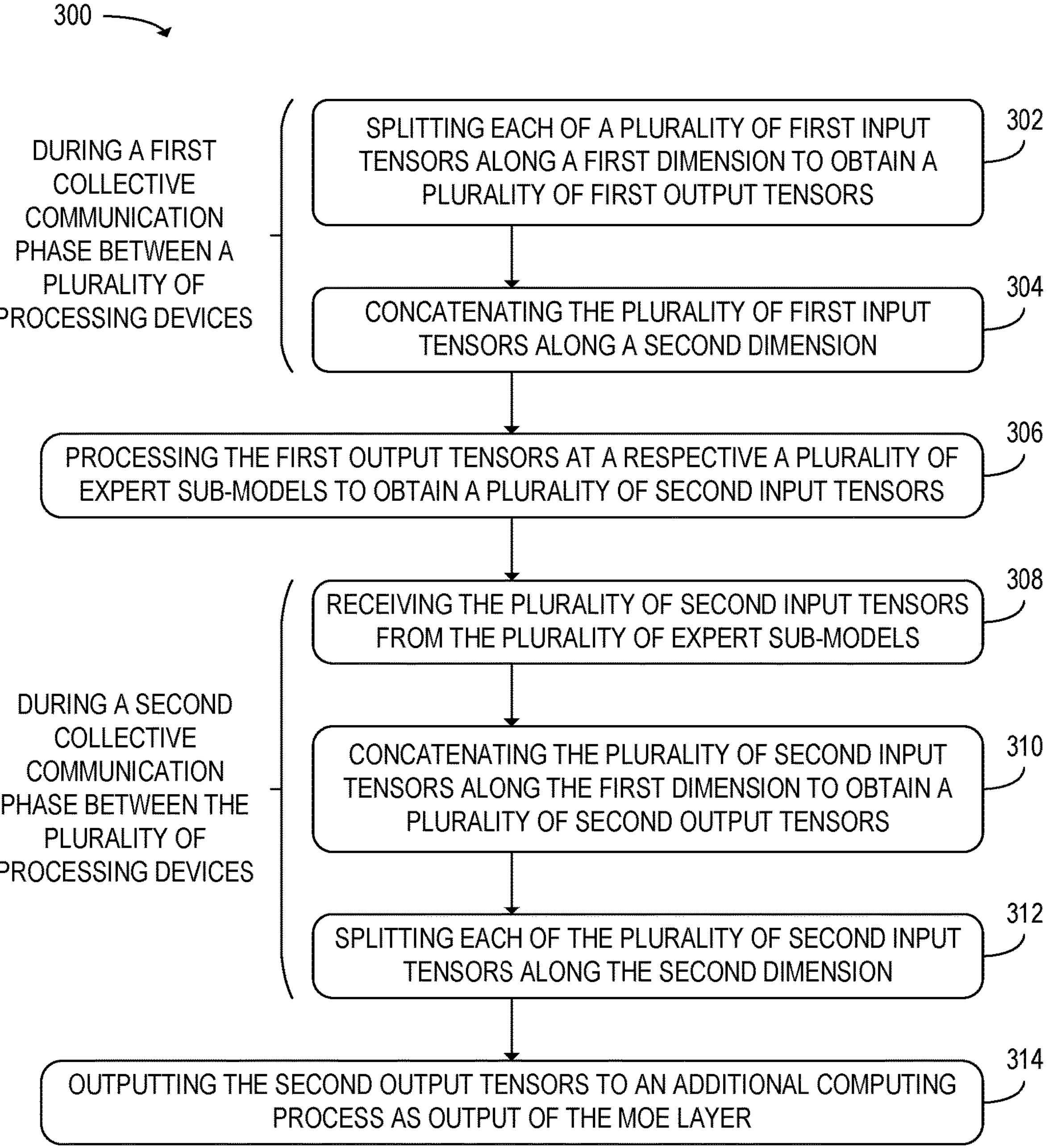
FIG. 18A shows a flowchart of an example method of executing an MoE layer included in an MoE model at a plurality of collectively communicating processing devices, according to the example of FIG. 11.

FIG. 18A shows a flowchart of a method 300 of executing an MoE layer included in an MoE model at a plurality of processing devices. In some examples, the steps of the method 300 may be performed in conjunction with the steps of the method 100 shown in FIGS. 10A-10C. A dynamic top-k gating function and/or a dynamic capacity factor may accordingly be used when the MoE layer is executed according to the method 300.

The method 300 includes steps 302 and 304, which are performed during a first collective communication phase between the plurality of processing devices. At step 302, the method 300 includes splitting each of a plurality of first input tensors along a first dimension to obtain a plurality of first output tensors. The first dimension may, for example, be an expert number dimension of the first input tensor. The first input tensors may each include a plurality of input tokens received as inputs to the MoE layer. In some examples, the first input tensors may be received from a prior layer of the MoE model. Alternatively, the first input tensors may be initial inputs to the MoE model. In addition, at step 304, the method 300 further includes concatenating the plurality of first input tensors along a second dimension when computing the plurality of first output tensors during the first collective communication phase. The second dimension may be a token number dimension.

At step 306, the method 300 further includes processing the first output tensors at a respective a plurality of expert sub-models to obtain a plurality of second input tensors. The second input tensors may each include a plurality of output tokens. The output tokens may be subsequently arranged into output tensors of the MoE layer, as discussed below.

The method 300 further includes steps 308, 310, and 312, which are performed during a second collective communication phase between the plurality of processing devices. At step 308, the method 300 further includes receiving the plurality of second input tensors from the plurality of expert sub-models. At step 310, the method 300 further includes concatenating the plurality of second input tensors along the first dimension to obtain a plurality of second output tensors. As discussed above, the first dimension may be the expert number dimension. At step 312, the method 300 further includes splitting each of the plurality of second input tensors along the second dimension when computing the plurality of second output tensors during the second collective communication phase. The second dimension may be the token number dimension.

At step 314, the method 300 further includes outputting the second output tensors to an additional computing process as output of the MoE layer. In some examples, the additional computing process may be an additional layer of the MoE model. In other examples, the second output tensors may be outputs of the MoE model as a whole.

In some examples, the first collective communication phase and the second collective communication phase are performed in each of a plurality of iterations. In such examples, respective first input tensors received in the plurality of iterations may each have a same size in the second dimension across the plurality of iterations. However, the respective first output tensors computed in each iteration have differing respective sizes in the second dimension. As discussed above, the second dimension may be the token number dimension. The first output tensors may accordingly be kept at an efficiently processable size in the token dimension as the workload of the one or more destination expert sub-models changes across the plurality of iterations.

Figure 18B:
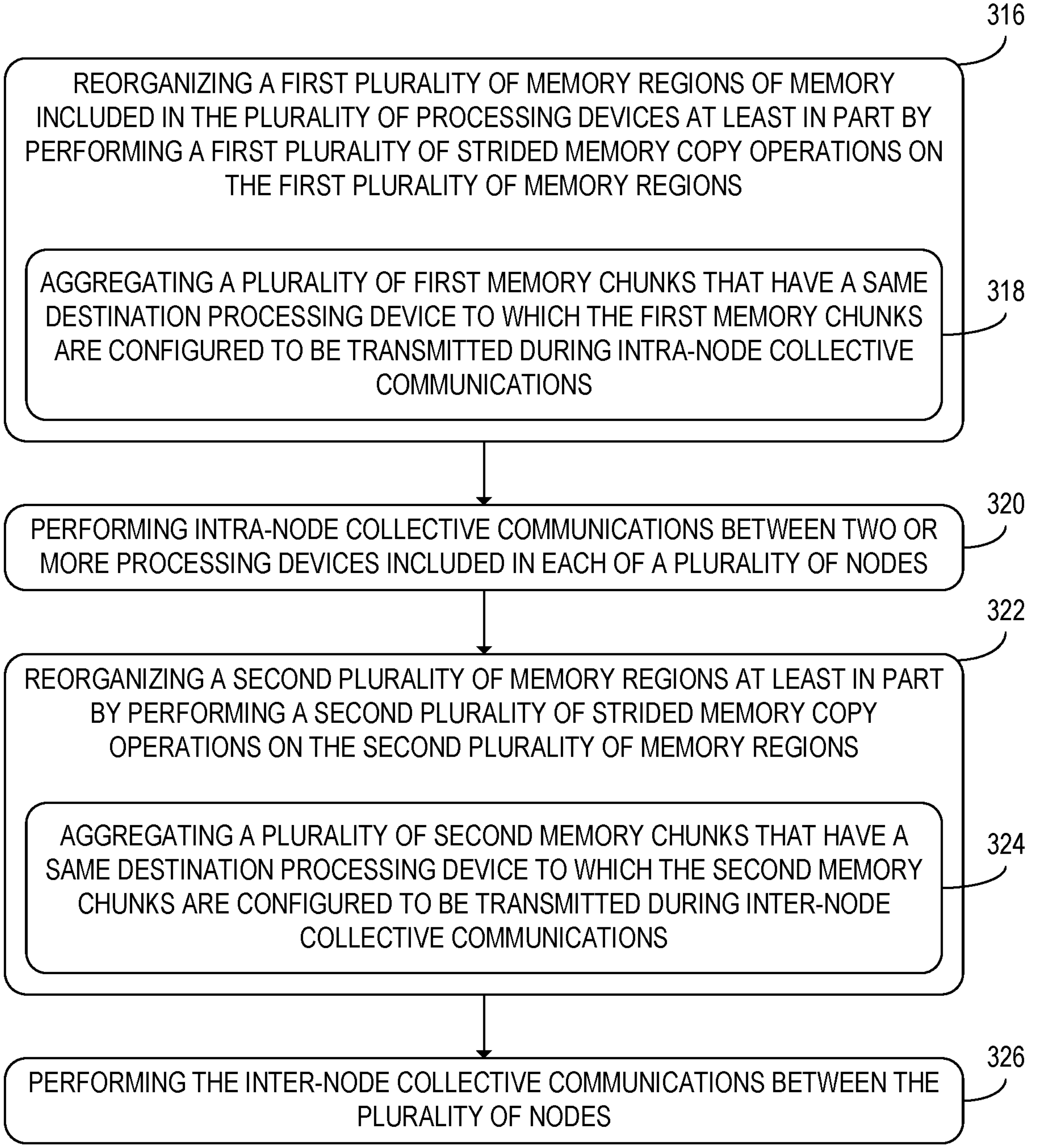
FIG. 18B shows additional steps of the method of FIG. 18A that may be performed in some examples when the plurality of processing devices are provided at least in part in a plurality of nodes.

FIG. 18B shows additional steps of the method 300 that may be performed in some examples when the plurality of processing devices are provided at least in part in a plurality of nodes that each include two or more of the plurality of processing devices. At step 316, the method 300 may further include reorganizing a first plurality of memory regions of respective memory devices associated with the plurality of processing devices. The first plurality of memory regions may correspond to respective input tokens. Reorganizing the memory regions may include performing a first plurality of strided memory copy operations on a first plurality of memory regions. In some examples, step 316 may include, at step 318, aggregating a plurality of first memory chunks that have a same destination processing device to which the first memory chunks are configured to be transmitted during the intra-node collective communications. At step 320, the method 300 may further include performing intra-node collective communications between the two or more processing devices included in each of the plurality of nodes. In examples in which the first memory chunks with the same destination processing devices are aggregated at step 316, the communication bandwidth efficiency of the intra-node collective communications may be increased due to increases in message size.

At step 322, the method 300 may further include reorganizing a second plurality of memory regions subsequently to performing the intra-node collective communications. Reorganizing the second plurality of non-contiguous memory regions may include performing a second plurality of strided memory copy operations on the second plurality of memory regions. In some examples, reorganizing the second plurality of memory regions at step 322 may further include, at step 324, aggregating a plurality of second memory chunks that have a same destination processing device to which the second memory chunks are configured to be transmitted during the inter-node collective communications. At step 326, the method 300 may further include performing the inter-node collective communications between the plurality of nodes. Reorganizing the second plurality of memory regions at step 322 and step 324 may allow larger messages to be transmitted between the nodes in the inter-node collective communications. Thus, the inter-node collective communications may utilize communication bandwidth between the nodes with increased efficiency.

Parallelization of the expert computation is discussed in additional detail. In existing MoE models that are executed on multiple processing devices, computations performed at the expert sub-models are parallelized in order to perform the expert computation more quickly. However, existing MoE models use static parallelization approaches in which the parallelization scheme does not change over the course of training or inferencing. This static parallelism may result in inefficient execution of the MoE layer when the workload of the expert sub-models varies. For example, when a particular expert sub-model of the plurality of expert sub-models receives large amounts of input relative to the other expert sub-models, existing approaches to parallelizing expert computation are typically unable to direct additional processing resources to that expert sub-model.

Some previous approaches to parallelizing expert computation at MoE models have allowed for switching between different parallelization schemes. These parallelization schemes utilize three types of parallelism: data parallelism, expert parallelism, and model parallelism. In data parallelism, respective copies of the input data to an MoE layer are processed in parallel at multiple processing devices. In expert parallelism, multiple copies of at least one expert sub-model are executed at different respective processing devices. In model parallelism, the individual expert sub-models are split into expert partitions that are distributed over the plurality of processing devices. These parallelism approaches may be combined with each other.

Figure 19A:
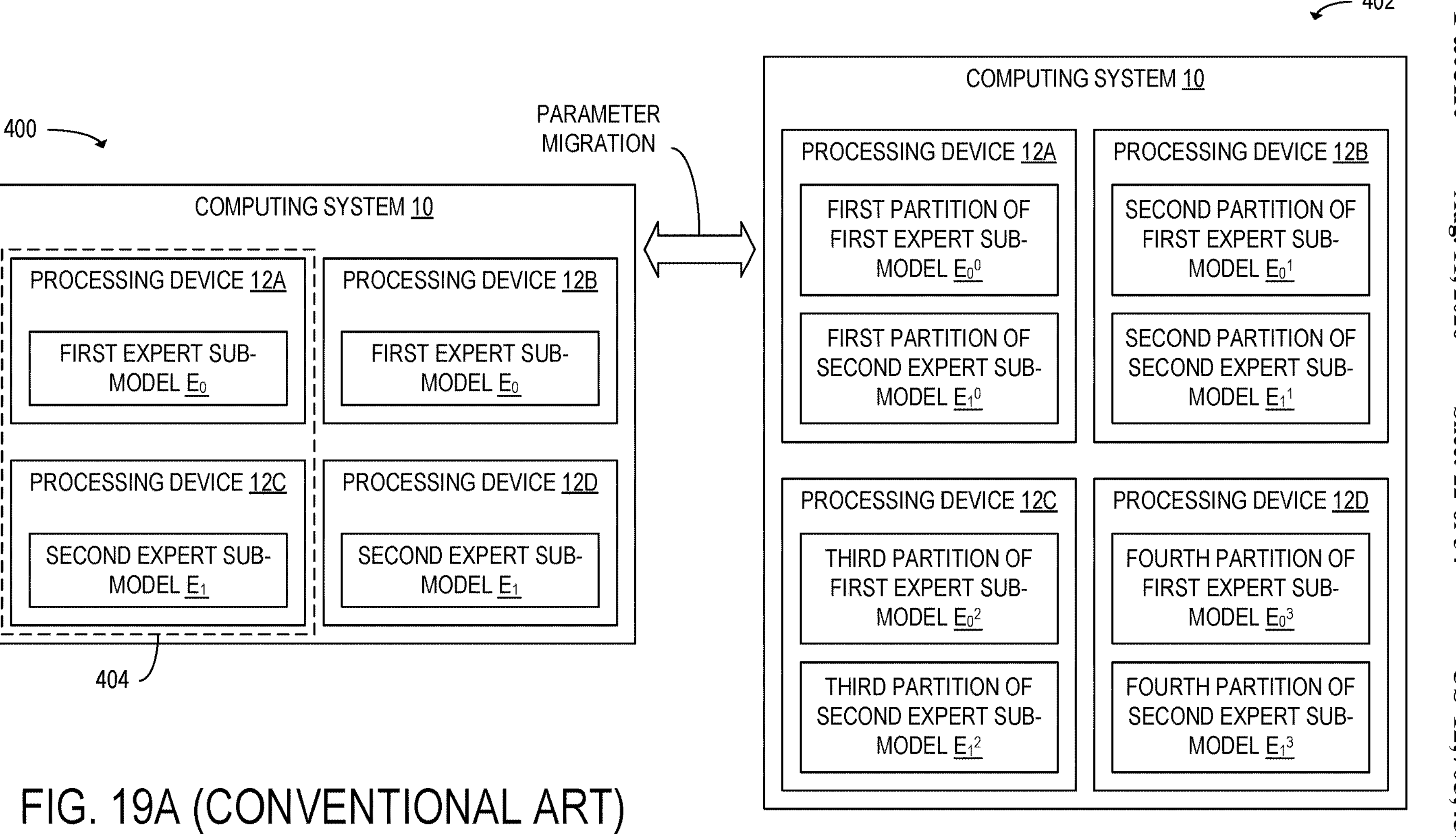
FIG. 19A schematically shows an example of a conventional approach to switching parallelism approaches between an expert-data parallel mode and a model parallel mode at an MoE layer.

In such previous approaches to parallelism at MoE layers, switching between parallelism approaches during runtime frequently incurs high overhead. FIG. 19A schematically shows an example of an existing approach to switching parallelism approaches at an MoE layer. In the example of FIG. 19A, a parameter migration approach used in some existing MoE models is shown. FIG. 19A depicts switching between an expert-data parallel mode 400 and a model parallel mode 402 via parameter migration. In the expert-data parallel mode 400, a first processing device 12A and a second processing device 12B both execute respective copies of a first expert sub-model $E_0$. In addition, a third processing device 12C and a fourth processing device 12D execute respective copies of a second expert sub-model $E_1$. The processing devices 12 shown in the expert-data parallel mode 400 form a plurality of data parallel groups 404 that each include a processing device at which the first expert sub-model $E_0$ is executed and a processing device at which the second expert sub-model $E_1$ is executed. Respective copies of an input tensor 34 may be processed at each of the data parallel groups 404.

In the model parallel mode 402, the expert sub-models are partitioned across the plurality of processing devices 12. The first processing device 12A is configured to execute a first partition of the first expert sub-model $$E_0^0$$

and a first partition of the second expert sub-model $$E_1^0.$$

The second processing device 12B is configured to execute a second partition of the first expert sub-model $$E_0^1$$

and a second partition of the second expert sub-model $$E_1^1.$$

The third processing device 12C is configured to execute a third partition of the first expert sub-model $$E_0^2$$

and a third partition of the second expert sub-model $$E_1^2.$$

The fourth processing device 12D is configured to execute a fourth partition of the first expert sub-model $$E_0^3$$

and a fourth partition of the second expert sub-model $$E_1^3.$$

Thus, the first expert sub-model $E_0$ and the second expert sub-model $E_1$ are both parallelized over the processing devices 12 in the model parallel mode 402.

When the computing system 10 switches between the expert-data parallel mode 400 and the model parallel mode 402, as shown in the example of FIG. 19A, the parameters of the first expert sub-model $E_0$ and the second expert sub-model $E_1$ are transferred between the processing devices 12. This parameter migration incurs communication overhead between the processing devices 12, thereby increasing the latency of the expert computation. Conventional switching between data parallelism and model parallelism using parameter migration, as shown in FIG. 19A, may therefore be inefficient for large MoE models.

As another drawback to conventional methods of switching forms of parallelism at an MoE layer, challenges may occur when switching between parallelism modes during training of the MoE model. Modifying the flow of input data to the processing devices and distribution of expert parameters among the processing devices may incur significant amounts of computational overhead. In addition, gradients may have to be reformatted when changing between parallelism approaches during training.

Figure 19B:
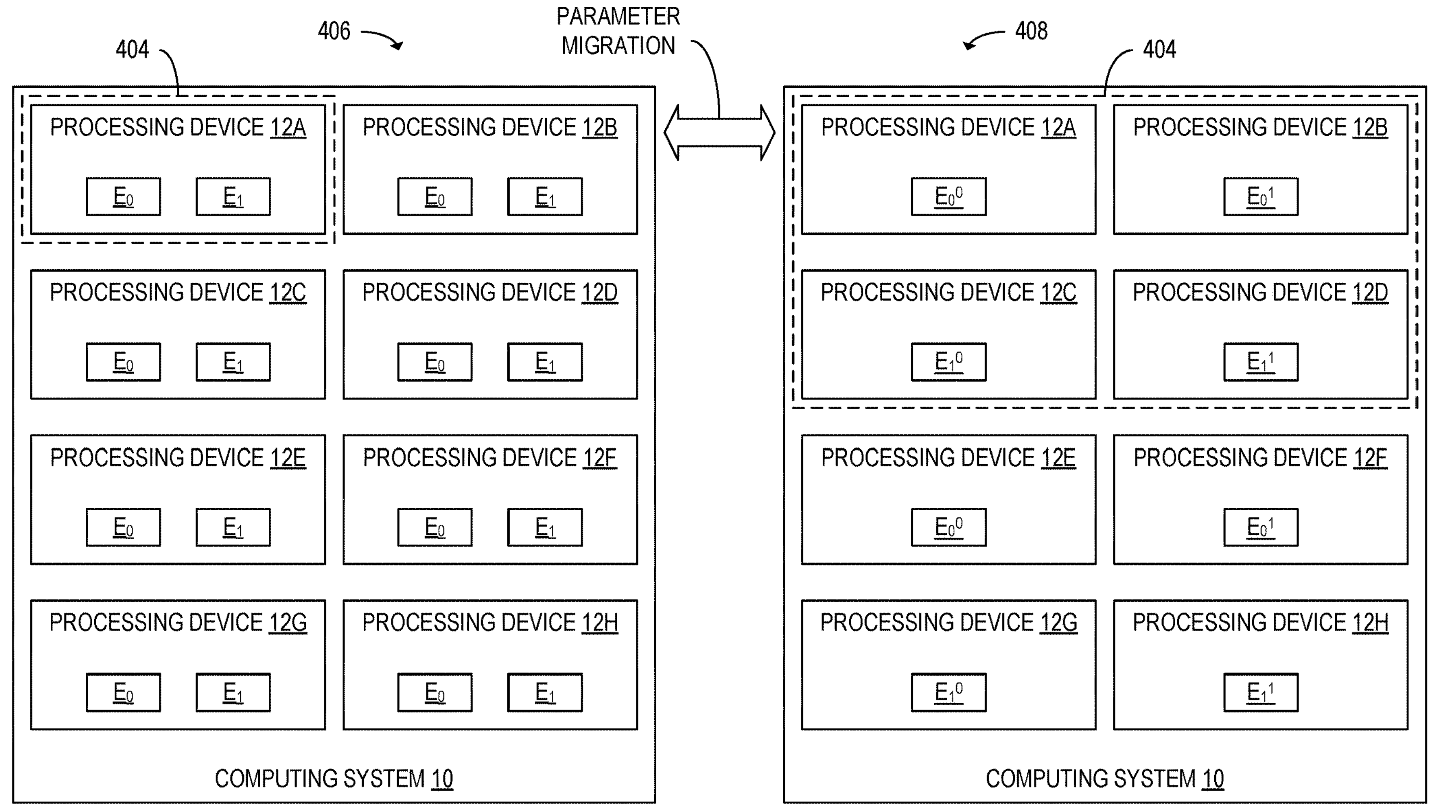
FIG. 19B schematically shows an example of a conventional approach to switching parallelism approaches between a data parallel mode and an expert-data-model parallel mode at an MoE layer.

FIG. 19B shows another example in which processing devices 12 configured to execute an MoE layer switch between a data parallel mode 406 and an expert-data-model parallel mode 408 according to a conventional approach. In the example of FIG. 19B, the computing system 10 includes a plurality of processing devices 12A, 12B, 12C, 12D, 12E, 12F, 12G, and 12H. In the data parallel mode 406, each of the processing devices 12A, 12B, 12C, 12D, 12E, 12F, 12G, and 12H includes respective copies of the first expert sub-model $E_0$ and the second expert sub-model $E_1$. Thus, each of the processing devices 12A, 12B, 12C, 12D, 12E, 12F, 12G, and 12H forms a data parallel group 404.

In the expert-data-model parallel mode 408 shown in the example of FIG. 19B, the plurality of processing devices 12A, 12B, 12C, 12D, 12E, 12F, 12G, and 12H are configured to execute respective partitions of the expert sub-models 40. The processing devices 12A and 12E are each configured to execute respective copies of the first partition of the first expert sub-model $$E_0^0,$$

the processing devices 12B and 12F are each configured to execute respective copies of the second partition of the first expert sub-model $$E_0^1,$$

the processing devices 12C and 12G are each configured to execute respective copies of the first partition of the second expert sub-model $$E_1^0,$$

and the processing devices 12D and 12H are each configured to execute respective copies of the second partition of the second expert sub-model $$E_1^1.$$

Accordingly, each of the data parallel groups 404 in the expert-data-model parallel mode 408 includes four of the processing devices 12 in the example of FIG. 19B.

The processing devices 12A, 12B, 12C, 12D, 12E, 12F, 12G, and 12H depicted in the example of FIG. 19B are configured to execute different expert sub-models 40 or partitions of expert sub-models 40 between the data parallel mode 406 and the expert-data-model parallel mode 408. Thus, the processing devices 12A, 12B, 12C, 12D, 12E, 12F, 12G, and 12H have to perform parameter migration to switch between the data parallel mode 406 and the expert-data-model parallel mode 408. Switching between the conventional data parallel mode 406 and the conventional expert-data-model parallel mode 408 accordingly results in the inefficiencies discussed above.

Figure 20B:
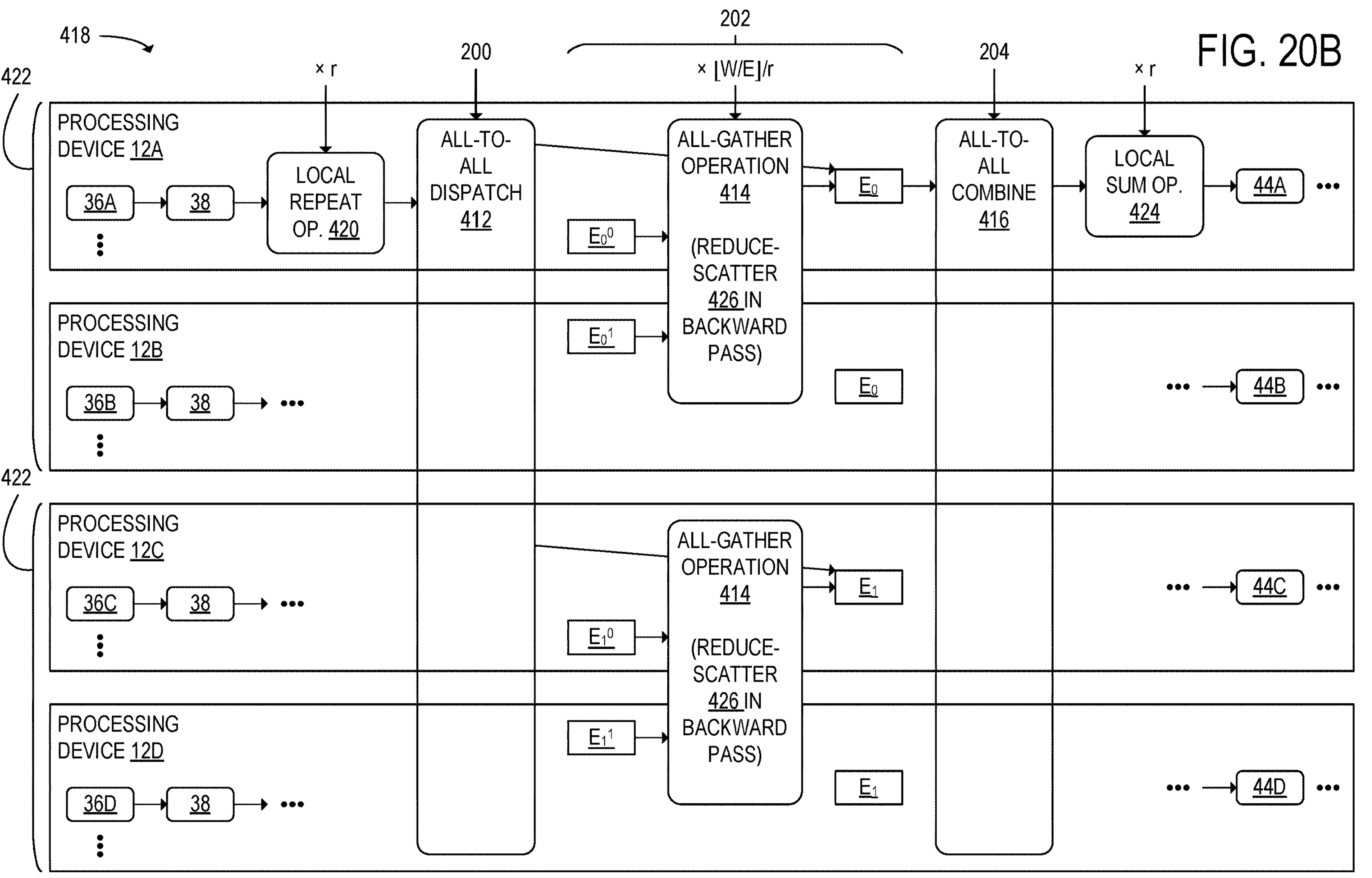
FIG. 20B schematically shows the MoE layer in an example expert-data-model parallel mode that is switchable with the data parallel mode of FIG. 20A without performing parameter migration.

In order to address the inefficiency of parameter migration discussed above, a different approach to parallelism switching is provided, as depicted schematically in the example of FIGS. 20A-20B. FIGS. 20A and 20B respectively show the MoE layer 32 when the plurality of processing devices 12 are configured in a data parallel mode 410 and an expert-data-model parallel mode 418, according to one example. However, in contrast to the examples of FIGS. 19A and 19B, the MoE layer 32 depicted in FIGS. 20A-20B is configured to be switchable between the data parallel mode 410 and the expert-data-model parallel mode 418 without conveying respective parameter values 41 of the expert sub-models 40 among the plurality of processing devices 12. The MoE layer 32 accordingly does not incur the communication overhead associated with parameter migration. In addition, the MoE layer 32 depicted in the example of FIGS. 20A-20B does not require reformatting the input tokens 36 and the gradients of the parameters.

In the data parallel mode 410 depicted in the example of FIG. 20A, the processing devices 12 are configured to receive a first plurality of input tokens 36. The first plurality of input tokens 36 in the example of FIG. 20A are the input tokens 36 received during the first iteration 50A. At the gating function 38, the processing devices 12 are further configured to select one or more first destination expert sub-models 40A based at least in part on the first plurality of input tokens 36, as discussed above. The gating function 38 may have a dynamic k value in some examples, as discussed above.

In the example of FIG. 20A, four processing devices 12A, 12B, 12C, and 12D are shown. The first plurality of input tokens 36 depicted in FIG. 20A are partitioned into respective sets of input tokens 36A, 36B, 36C, and 36D that are input into the gating function 38 at respective processing devices 12A, 12B, 12C, and 12D of the plurality of processing devices 12. Thus, the processing devices 12A, 12B, 12C, and 12D are configured to process different portions of the input tensor 34 in parallel. At the gating function 38, the plurality of processing devices are configured to compute gating function output vectors 52 as discussed above with reference to FIG. 4.

The plurality of processing devices 12 are further configured to compute a plurality of output tokens 44 based at least in part on the first plurality of input tokens 36 at a plurality of first expert sub-model partitions of the one or more first destination expert sub-models 40A. Thus, the plurality of processing devices 12 are configured to perform the expert computation 202. The computation of a set of output tokens 44A from the input tokens 36A is shown in the example of FIG. 20A. In the example of FIG. 20A, the first expert sub-model partitions include a first partition of a first expert sub-model $$E_0^0,$$

a second partition of the first expert sub-model $$E_0^1,$$

a first partition of a second expert sub-model $$E_1^0,$$

and a second partition of the second expert sub-model $$E_1^1.$$

In the expert-data-model parallel mode, ...

$$E_0^0$$

is executed at the processing device 12A, $$E_0^1$$

is executed at the processing device 12B, $$E_1^0$$

is executed at the processing device 12C, and $$E_1^1$$

is executed at the processing device 12D. In the data parallel mode 410 as shown in the example of FIG. 20A, the processing device 12A is further configured to process a copy of the input tokens 36A locally at $$E_0^0.$$

Similarly, the processing device 12B is configured to locally process a copy of the input tokens 36B at $$E_0^1,$$

the processing device 12C is configured to locally process a copy of the input tokens 36C at $$E_1^0,$$

and the processing device 12D is configured to locally process a copy of the input tokens 36D at $$E_1^1.$$

The plurality of processing devices 12 are further configured to perform an all-gather operation 414 on the plurality of output tokens 44A computed at the expert sub-model partitions $$E_0^0, E_1^0, E_1^0, \text{ and } E_1^1.$$

The all-gather operation 414 gathers the outputs of the expert sub-model partitions $$E_0^0, E_1^0, E_1^0, \text{ and } E_1^1$$

to construct the results of processing the input tokens 36A at the first expert sub-model $E_0$ and the second expert sub-model $E_1$. The all-gather operation 414 is performed on W inputs received from the expert sub-model partitions, where W is the number of processing devices 12. Similarly, full copies of the first expert sub-model $E_0$ and the second expert sub-model $E_1$ are constructed at the processing devices 12B, 12C, and 12D during the all-gather operation 414 in the example of FIG. 20A.

The plurality of processing devices 12 are further configured to output the first plurality of output tokens 44 as the first MoE layer output subsequently to performing the all-gather operation 414. Accordingly, the plurality of processing devices 12 may be configured to output an output tensor 42 that includes the output tokens 44A, 44B, 44C, and 44D respectively computed from each of the sets of input tokens 36A, 36B, 36C, and 36D.

The expert-data-model parallel mode 418 is schematically shown in the example of FIG. 20B. Similarly to the example of FIG. 20A, the schematic view of the processing devices 12 in FIG. 20B focuses on the computation of the output tokens 44A from the input tokens 36A in the interest of clarity. In the expert-data-model parallel mode 418, the plurality of processing devices 12 are configured to receive a second plurality of input tokens 36. The second plurality of input tokens 36 in the example of FIG. 20B are the input tokens 36 received during the second iteration 50B. As in the example of FIG. 20A, the input tokens 36 shown in FIG. 20B are partitioned into respective sets of input tokens 36A, 36B, 36C, and 36D that are respectively received at the processing devices 12A, 12B, 12C, and 12D.

At the gating function 38, the plurality of processing devices 12 are further configured to select one or more second destination expert sub-models 40A based at least in part on the second plurality of input tokens 36. In examples in which one expert sub-model 40 is selected as the only destination expert sub-model 40A at the second iteration 50B, the expert-data-model parallel mode 418 reduces to a data-model parallel mode.

The plurality of processing devices 12 are further configured to perform a respective plurality of local repeat operations 420 on the second plurality of input tokens 36 subsequently to executing the gating function 38. In the example of FIG. 20B, the local repeat operation 420 generates r copies of each of the input tokens 36, where r is a processing device group count. As discussed in further detail below, the processing device group count r may be a dynamically specified parameter of the MoE layer 32 in the expert-data-model parallel mode 418. In the example of FIG. 20B, respective local repeat operations 420 are performed at each of the processing devices 12A, 12B, 12C, and 12D such that respective copies of the input tokens 36A, 36B, 36C, and 36D are generated.

In the expert-data-model parallel mode 418, similarly to in the data parallel mode 410, the plurality of processing devices 12 are further configured to perform a first collective communication of respective copies of the input tokens 36 between the plurality of processing devices 12. The first collective communication in the example of FIG. 20B is an all-to-all dispatch 412 performed during the first collective communication phase 200 of FIG. 11. In the example of FIG. 20B, similarly to the example of FIG. 20A, the first collective communication transmits respective copies of each of the sets of input tokens 36A, 36B, 36C, and 36D of each of the processing devices 12.

In the expert-data-model parallel mode 418, the plurality of processing devices 12 are organized into a number of processing device groups 422 equal to the processing device group count r. The number of processing devices 12 included in each processing device group 422 is given by $\lfloor W/E \rfloor / r$ in the example of FIG. 20B, where W is the total number of processing devices 12 and E is the total number of expert sub-models 40. Within each of the plurality of processing device groups 422, the plurality of processing devices 12 are further configured to compute a respective set of output tokens 44 based at least in part on respective copies of the second plurality of input tokens 36. The output tokens 44 are computed at a respective plurality of second expert sub-model partitions of the one or more second expert destination sub-models 40A. In the example of FIGS. 20A-20B, the same destination expert sub-models 40A are selected at the first iteration 50A and the second iteration 50B. Thus, the same set of expert sub-model partitions $$E_0^0, E_1^0, E_1^0, \text{ and } E_1^1$$

are used as both the first expert sub-model partitions and the second expert sub-model partitions. In other examples in which different destination expert sub-models 40A are selected at the first and second iterations 50A and 50B, different sets of expert sub-model partitions are used. However, no parameter migration is performed between the first iteration 50A and the second iteration 50B.

Subsequently to executing the expert sub-model partitions $$E_0^0, E_1^0, E_1^0, \text{ and } E_1^1,$$

the plurality of processing devices 12 are further configured to perform respective all-gather operations 414 on each of the respective sets of output tokens 44 computed at the expert sub-model partitions $$E_0^0, E_1^0, E_1^0, \text{ and } E_1^1.$$

In the example of FIG. 20B, two all-gather operations 414 are performed. The first all-gather operation 414 is performed at the first processing device 12A and the second processing device 12B on the outputs of processing the input tokens 36A at the first and second partitions of the first expert sub-model $$E_0^0 \text{ and } E_0^1.$$

The second all-gather operation 414 is performed at the third processing device 12C and the fourth processing device 12D on the outputs of processing the input tokens 36A at the first and second partitions of the second expert sub-model $$E_1^0 \text{ and } E_1^1.$$

Using the all-gather operations 414, as shown in the example of FIG. 20B, respective copies of the first expert sub-model $E_0$ are constructed at the first and second processing devices 12A and 12B, and respective copies of the second expert sub-model $E_1$ are constructed at the third and fourth processing devices 12C and 12D. Thus, the plurality of processing devices 12 implement expert parallelism.

The plurality of processing devices 12 are further configured to perform a second collective communication of the output tokens 44 between the plurality of processing devices 12. In the example of FIG. 20B, similarly to FIG. 20A, the plurality of output tokens 44 are communicated between the processing devices 12 in an all-to-all combine 416 performed during the second collective communication phase 204. The plurality of processing devices 12 are accordingly configured to share the output tokens 44 that are generated using the copies of the destination expert sub-models 40A constructed via the all-gather operations 414.

Each of the plurality of processing devices 12 depicted in the example of FIG. 20B is further configured to perform a respective plurality of local reduce operations on the sets of output tokens 44 subsequently to the second collective communication. The local reduce operations are local sum operations 424 in the example of FIG. 20B. The number of local sum operations 424 performed at each of the processing devices 12 in the example of FIG. 20B is equal to the processing device group count r. Thus, at each of the processing devices 12, a corresponding portion of the output tensor 42 is constructed from the output tokens 44 received during the all-to-all combine 416.

The plurality of processing devices 12 are further configured to output results of the plurality of local reduce operations as the second MoE layer output. The sets of output tokens 44A, 44B, 44C, and 44D respectively generated at the processing devices 12A, 12B, 12C, and 12D are each included in the output tensor 42 generated as the second MoE layer output.

FIGS. 20A-20B show the plurality of processing devices 12 during a forward pass performed at the MoE layer 32 in training or inferencing. In a backward pass through the MoE layer 32, the all-gather operations 414 may be replaced with reduce-scatter operations 426.

Figure 21:
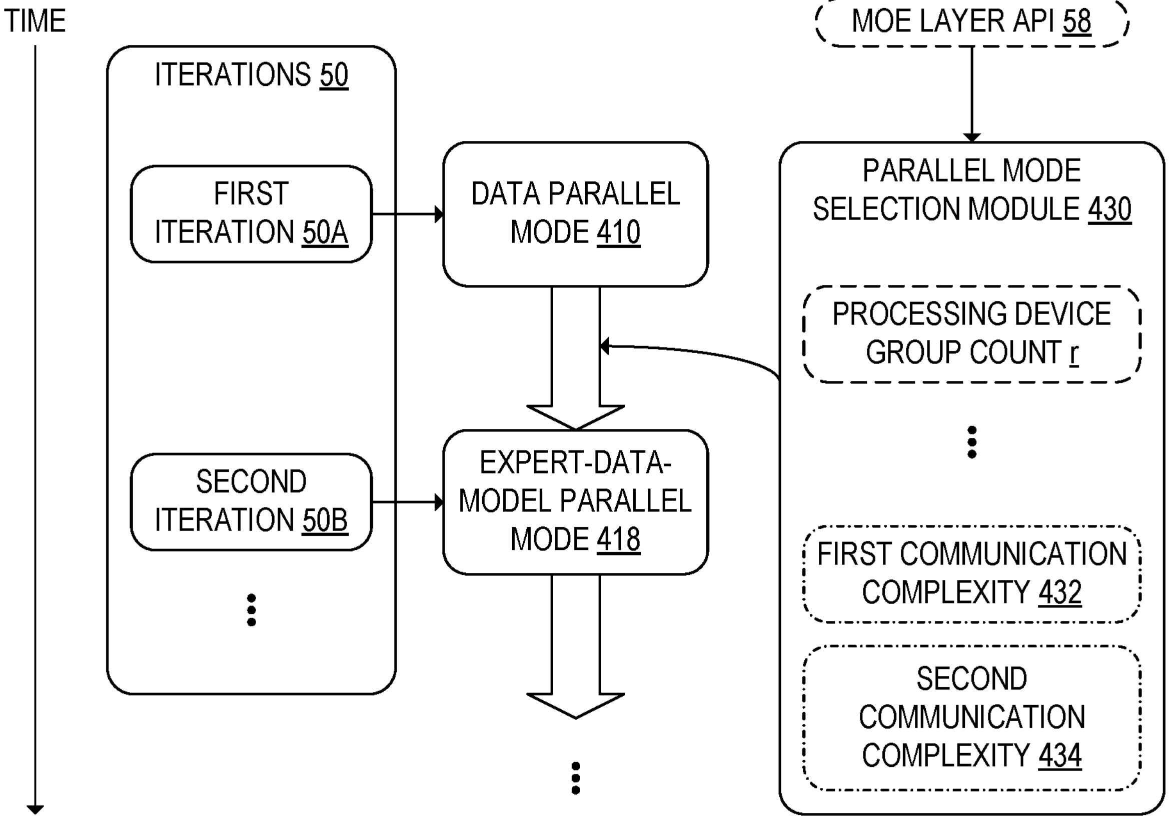
FIG. 21 schematically shows a parallel mode selection module that may be executed at one or more of the processing devices to select between the data parallel mode and the expert-data-model parallel mode, according to the example of FIGS. 20A-20B.

As depicted in the example of FIG. 21, the plurality of processing devices 12 may be configured to switch between the data parallel mode 410 and the expert-data-model parallel mode 418 between a first iteration 50A and a second iteration 50B of the plurality of iterations 50. The processing devices 12 are configured to be switchable between the data parallel mode 410 and the expert-data-model parallel mode 418 without migrating model parameters between the processing devices 12. Switching between the data parallel mode 410 and the expert-data-model parallel mode 418 may accordingly be performed with $\mathcal{O}(1)$ communication complexity.

FIG. 21 further shows a parallel mode selection module 430 that may be executed at one or more of the processing devices 12 to select between the data parallel mode 430 and the expert-data-model parallel mode 418. In some examples, the plurality of processing devices 12 are configured to receive processing device group counts r for each of a plurality of iterations 50 via the MoE layer API 58. In such examples, at each of the plurality of iterations, the processing devices 12 are configured to select between the data parallel mode 410 and the expert-data-model parallel mode 418 based at least in part on the processing device group count r of that iteration 50. Thus, the user of the MoE model 30 may specify the parallel mode, and the parallel mode may be dynamically adjustable.

The value of the processing device group count r may, in some examples, be set to an integer value in the range [0, W/E]. When the processing device group count r is set to 0, the plurality of processing devices 12 may be configured to use the data parallel mode 410.

When the processing device group count r is set to 1, the plurality of processing devices 12 may be configured to use an expert-data parallel mode. In the expert-data parallel mode, an all-gather operation 414 is performed across all the processing devices 12. The expert-data parallel mode differs from the data parallel mode 410 in that the expert-data parallel mode includes the all-to-all dispatch 412 and the all-to-all combine 416. The expert-data parallel mode functions as a special case of the expert-data-model parallel mode 418 that is degenerate in the model parallelism degree dimension.

When the processing device group count r is set to W/E, the plurality of processing devices 12 may be configured to use an expert-model parallel mode. The expert-model parallel mode functions as another special case of the expert-data-model parallel mode 418 that is degenerate in the data parallelism degree dimension. In the expert-model parallel mode, the sizes of the processing device groups 422 are equal to 1. Thus, the all-gather operations 414 are not performed in the expert-model parallel mode.

In some examples, at the parallel mode selection module 430, the plurality of processing devices 12 may be configured to compute a first communication complexity 432 of computing an MoE layer output of the MoE layer 32 via the data parallel mode 410. The plurality of processing devices 12 are further configured to compute a second communication complexity 434 of computing the MoE layer output via the expert-data-model parallel mode 418 in such examples. The plurality of processing devices 12 may be further configured to compute the MoE layer output using whichever of the data parallel mode 410 and the expert-data-model parallel mode 418 has a lower respective communication complexity.

The first communication complexity 432 may be given by $\mathcal{O}(E)$. The second communication complexity 434 may be given by $\mathcal{O}(\Delta C \cdot r + \Delta E/r)$, where $\Delta E$ is the number of local expert sub-models per processing device 12. The expression for the second communication complexity 434 becomes $\mathcal{O}(\Delta C \cdot W/E)$ when r=W/E. As discussed above, expert-data parallelism and expert-model parallelism may be described as special cases of expert-data-model parallelism. The second communication complexity 434 of the expert-data parallel mode may be given by $\mathcal{O}(\Delta C + \Delta E)$, and the second communication complexity 434 of expert-model parallelism may be given by $\mathcal{O}(\Delta C \cdot \max(1, W/E))$.

Using model parallelism, expert parallelism, or data-model parallelism at the MoE layer 32 without also using other forms of parallelism would result in a communication complexity greater than or equal to that of the data parallel mode 410 or the expert-data-model parallel mode 418. The communication complexity of model parallelism alone may be given by $\mathcal{O}(\Delta C \cdot W)$, which is greater than or equal to the communication complexity $\mathcal{O}(\Delta C \cdot \max(1, W/E))$ of expert-model parallelism. The communication complexity of expert parallelism alone may be given by $\mathcal{O}(\Delta C)$. Since $E/W \geq 1$ when only expert parallelism is used, the communication complexity of the expert-parallel mode is also greater than or equal to the communication complexity of the expert-model parallel mode. The communication complexity of data-model parallelism may be given by $\mathcal{O}(\Delta C \cdot r + E/r)$ for $1 \le r \le W$, which is greater than or equal to the second communication complexity 434 of the expert-data-model parallel mode 418. The data parallel mode 410 and the expert-data-model parallel mode 418 therefore cover the possible minima of the communication complexity.

Figure 22:
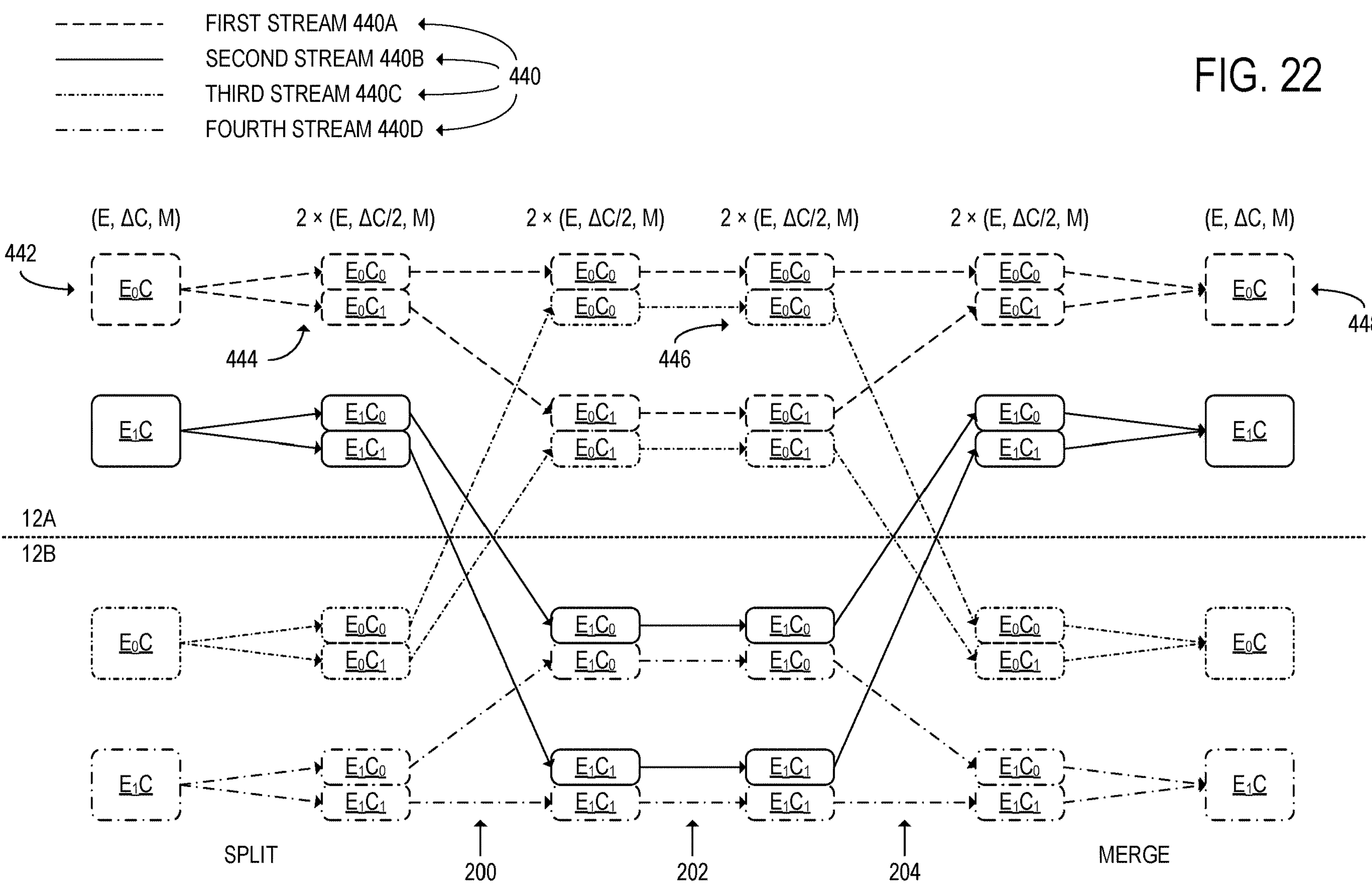
FIG. 22 schematically shows a plurality of streams into which tokens are pipelined at the plurality of processing devices when executing the MoE layer, according to the example of FIG. 1.

Turning now to FIG. 22, when computing the MoE layer output of the MoE layer 32, the plurality of processing devices 12 may be further configured to pipeline the input tokens 36 processed at the MoE layer 32 into a plurality of streams 440. The number of streams 440 into which the computations performed at the MoE layer 32 are pipelined may affect the latency of executing the MoE layer 32. However, since the workload of the expert sub-models 40 varies between iterations 50, the number of pipelining streams that results in the fastest execution of the MoE layer 32 may vary. The pipelining of tokens through the MoE layer 32, as well as the selection of a pipelining strategy for different workloads, are discussed below.

A first stream 440A, a second stream 440B, a third stream 440C, and a fourth stream 440D are shown at a first processing device 12A and a second processing device 12B in the example of FIG. 22. The plurality of streams 440 each include a respective plurality of partitioned input tensors 444 into which a plurality of input tensors 442 are divided. The plurality of input tensors 442 may be the first input tensors 210 depicted in the example of FIG. 12. In FIG. 22, the streams 440 are shown during splitting of the input tensors 442, the first collective communication phase 200, the expert computation 202, the second collective communication phase 204, and the merging of the streams 440 into output tensors 448. The output tensors 448 may be the second output tensors 216 of FIG. 12.

At the first processing device 12A depicted in the example of FIG. 22, the input tensors $E_0C$ and $E_1C$ are processed. The input tensors $E_0C$ and $E_1C$ are copies of the input tensor 442 that are configured to be processed at the first expert sub-model $E_0$ and the second expert sub-model $E_1$, respectively. The input tensor $E_0C$ is divided into partitioned input tensors $E_0C_0$ and $E_0C_1$, and the input tensor $E_1C$ is divided into partitioned input tensors $E_1C_0$ and $E_1C_1$. The input tensors 442 each have dimensions (E, ΔC, M), and the partitioned input tensors 444 each have dimensions (E, ΔC/2, M). Accordingly, the input tensors 442 are partitioned along the token number dimension. Corresponding copies of the input tensors $E_0C$ and $E_1C$ are also received and partitioned at the second processing device 12B.

During the first collective communication phase 200, some of the partitioned input tensors 444 are transmitted between the first processing device 12A and the second processing device 12B. The partitioned input tensors 444 are transmitted between the processing devices 12A and 12B such that both copies of the partitioned input tensors $E_0C_0$ and $E_0C_1$ are processed at the first processing device 12A and both copies of the input tensors $E_1C_0$ and $E_1C_1$ are processed at the second processing device 12B.

The expert computation 202 is then performed on each of the pairs of partitioned input tensors 444 to compute respective partitioned output tensors 446. The partitioned output tensors 446 computed during the expert computation 202 may be the second input tensors 214 shown in FIG. 12. In the second collective communication phase 204, the partitioned output tensors 446 are returned to the processing devices 12 from which the corresponding partitioned input tensors 444 were received during the first collective communication phase 200. The partitioned output tensors 446 are then merged into output tensors 448, which may be the second output tensors 216 of FIG. 12. The resulting output tensors 448 each have dimensions (E, ΔC, M) in the example of FIG. 22.

Figure 23A:
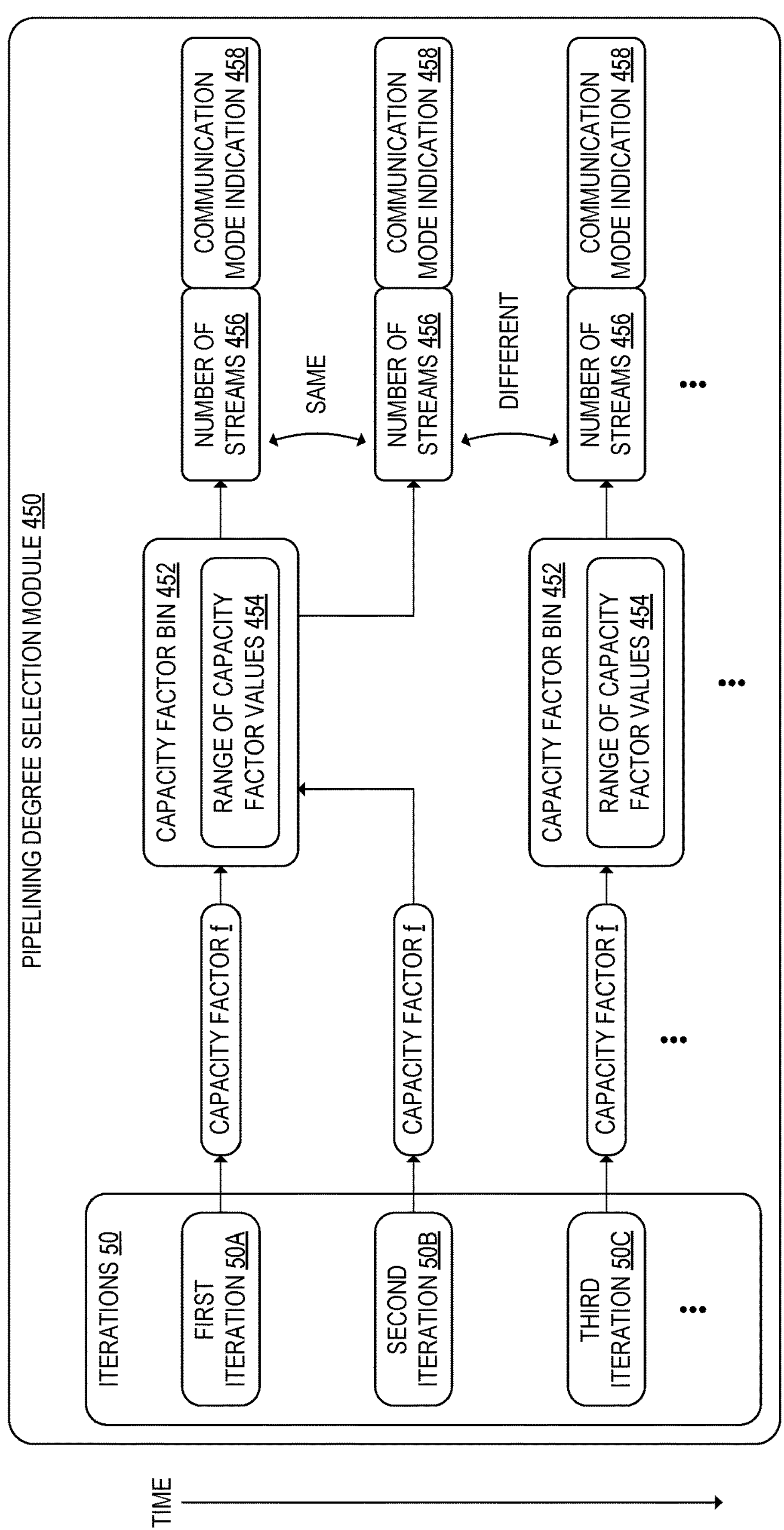
FIG. 23A schematically shows a pipelining degree selection module at which at least one of the processing devices is configured to compute a number of the plurality of streams, according to the example of FIG. 22.

FIG. 23A schematically shows a pipelining degree selection module 450 at which at least one processing device 12 of the plurality of processing devices 12 may be further configured to determine the number of streams 456 (the pipelining degree) into which the input tokens 36 are configured to be pipelined. The number of streams 456 may be selected based at least in part on the capacity factor f of the plurality of expert sub-models 40. In the example of FIG. 23A, the at least one processing device 12 is configured to compute the number of the streams 456 in each of the plurality of iterations 50. A first iteration 50A, a second iteration 50B, and a third iteration 50C are shown in FIG. 23A. Over the plurality of iterations 50, the at least one processing device 12 is configured to iteratively compute a plurality of capacity factor bins 452 that include respective ranges of capacity factor values 454. In addition, the at least one processing device 12 is configured to iteratively compute respective numbers of streams 456 associated with the plurality of capacity factor bins 452. At each of the iterations 50, the at least one processing device 12 is further configured to determine the number of streams 456 based at least in part on a capacity factor bin 452 of the plurality of capacity factor bins 452 within which the capacity factor f is located. In the example of FIG. 23A, the capacity factor f in the first iteration 50A is located in the same capacity factor bin 452 as the capacity factor f in the second iteration 50B. The capacity factor f in the third iteration 50C is located in a different capacity factor bin 452 from the capacity factors in the first iteration 50A and the second iteration 50B. A different number of streams 456 is therefore used in the third iteration 50C.

The at least one processing device 12 that executes the pipelining degree selection module 450 may be further configured to iteratively recompute the plurality of capacity factor bins 452 over the plurality of iterations 50. FIG. 23B shows pseudocode of a pipelining strategy search algorithm 460 that may be performed at the at least one processing device 12 when executing the pipelining degree selection module 450. The pipelining strategies selected by the pipelining strategy search algorithm 460 may each include a corresponding number of streams 456. In addition, each pipelining strategy may, in some examples, include a communication mode indication 458 of whether intra-node collective communications 208A and inter-node collective communications 208B are performed separately as shown in FIGS. 17A-17B.

In the pipelining strategy search algorithm 460 of FIG. 23B, the at least one processing device 12 retrieves a pipelining strategy s associated with the value of f at the current iteration 50. The at least one processing device 12 then executes the MoE layer 32 with those values of f and s, and measures a latency of the MoE layer 32 as t. The at least one processing device 12 subsequently updates a table of the capacity factor bins 452 and the corresponding pipelining strategies s based at least in part on the measured value of the latency t. In iterations in which the capacity factor bins 452 are recomputed, the at least one processing device 12 recomputes the capacity factor bins 452 by adding values of the capacity factor f to one or more existing capacity factor bins 452 until a capacity factor bin 452 exceeds a predetermined size L. When the capacity factor bin 452 exceeds the size L, the at least one processing device 12 generates an additional capacity factor bin 452 with a range of capacity factor values 454 that includes one or more of the received values of the capacity factor f. The corresponding pipelining strategy s of the additional capacity factor bin 452 is generated from the respective pipelining strategies s of the capacity factor values f included in the capacity factor bin 452.

The pipelining strategy search algorithm 460 has a computational complexity of $\mathcal{O}(1)$ when the value of f at the current iteration 50 is already stored in the table. When f is not already included in the table and the at least one processing device 12 performs a binary search over M capacity factor bins 452, the pipelining strategy search algorithm 460 has a computational complexity of $\mathcal{O}(\log(M))$. Recomputing the capacity factor bins 452 and re-sorting N previously sorted capacity factor values f has a computational complexity of $\mathcal{O}(N \log(N))$. Thus, a pipelining strategy s that results in efficient execution of the MoE layer 32 for a given value of the capacity factor f may be selected with low processing overhead.

Figure 24A:
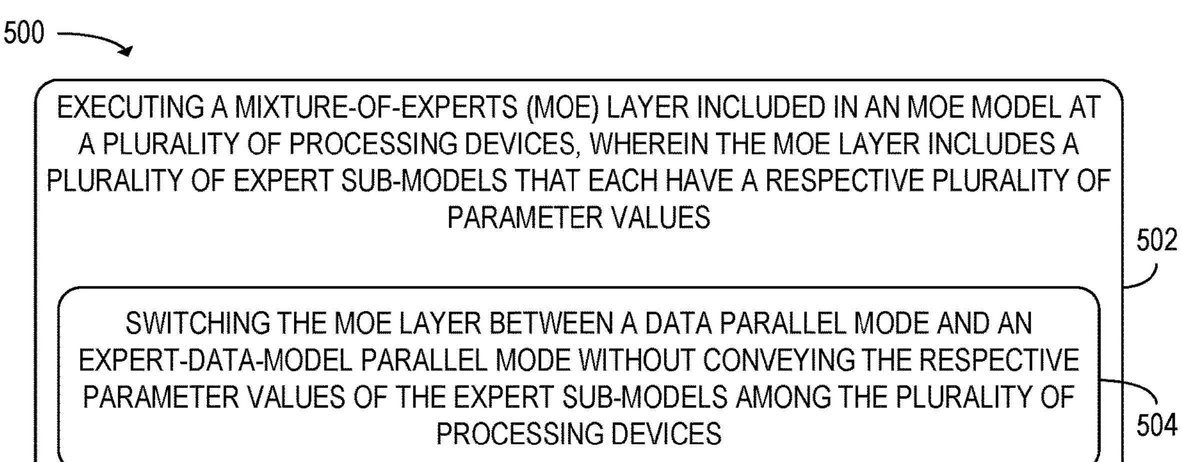
FIG. 24A shows a flowchart of an example method for use with a computing system when executing an MoE model, according to the example of FIG. 1.

FIG. 24A shows a flowchart of an example method 500 for use with a computing system when executing an MoE model, according to one example. At step 502, the method 500 includes executing an MoE layer included in the MoE model at a plurality of processing devices. The MoE layer includes a plurality of expert sub-models that each have a respective plurality of parameter values. At step 504, executing the MoE layer includes switching the MoE layer between a data parallel mode and an expert-data-model parallel mode without conveying the respective parameter values of the expert sub-models among the plurality of processing devices. The plurality of processing devices therefore avoid the communication overhead that would otherwise be incurred during parameter migration when switching between the data parallel mode and the expert-data-model parallel mode.

Figure 24B:
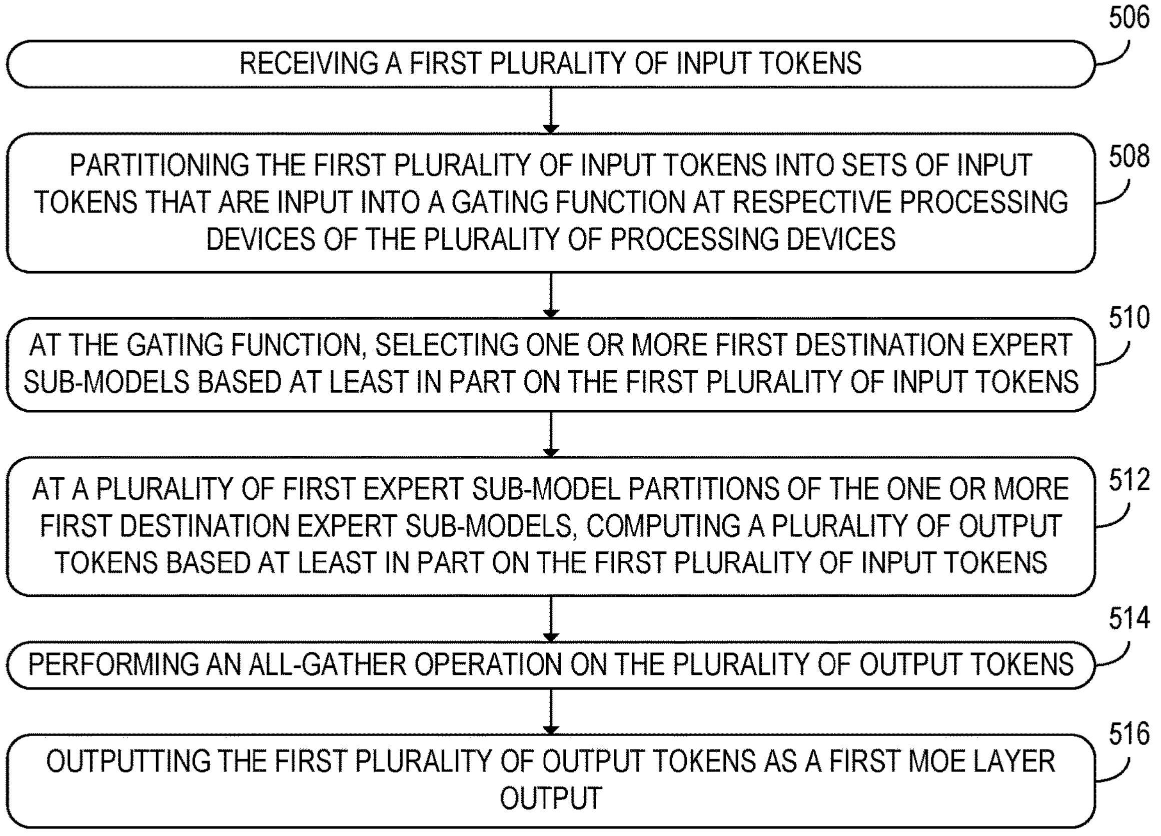
FIG. 24B shows additional steps of the method of FIG. 24A that may be performed when the MoE layer is in the data parallel mode.

The method 500 may further include the steps shown in the example of FIG. 24B, which are performed when the MoE layer is in the data parallel mode. In the example of FIG. 24B, at step 506, the method 500 further includes receiving a first plurality of input tokens. The first plurality of input tokens may be arranged in an input tensor. At step 508, the method 500 further includes partitioning the first plurality of input tokens into sets of input tokens that are input into a gating function at respective processing devices of the plurality of processing devices. Thus, the processing devices may process different portions of an input tensor in parallel. The method 500 further includes, at step 510, selecting one or more first destination expert sub-models at the gating function. The first destination expert sub-models are selected based at least in part on the first plurality of input tokens, such that different destination expert sub-models are selected for different inputs. In some examples, the gating function may be the dynamic top-k gating function discussed above.

At step 512, the method 500 further includes computing a plurality of output tokens based at least in part on the first plurality of input tokens at a plurality of first expert sub-model partitions of the one or more first destination expert sub-models. The expert sub-models are partitioned such that portions of an expert sub-model are executed at different processing devices included in the plurality of processing devices. At step 514, the method 500 further includes performing an all-gather operation on the plurality of output tokens. The all-gather operation may construct, from the outputs of the first expert sub-model partitions, the results of processing the input tokens at each of the first destination expert sub-models. During a backward pass, the all-gather operation may be replaced with a reduce-scatter operation.

At step 516, the method 500 further includes outputting the first plurality of output tokens, subsequently to performing the all-gather operation and the second collective communication, as a first MoE layer output. Thus, the plurality of processing devices may generate the output of the MoE layer in the data parallel mode.

Figure 24C:
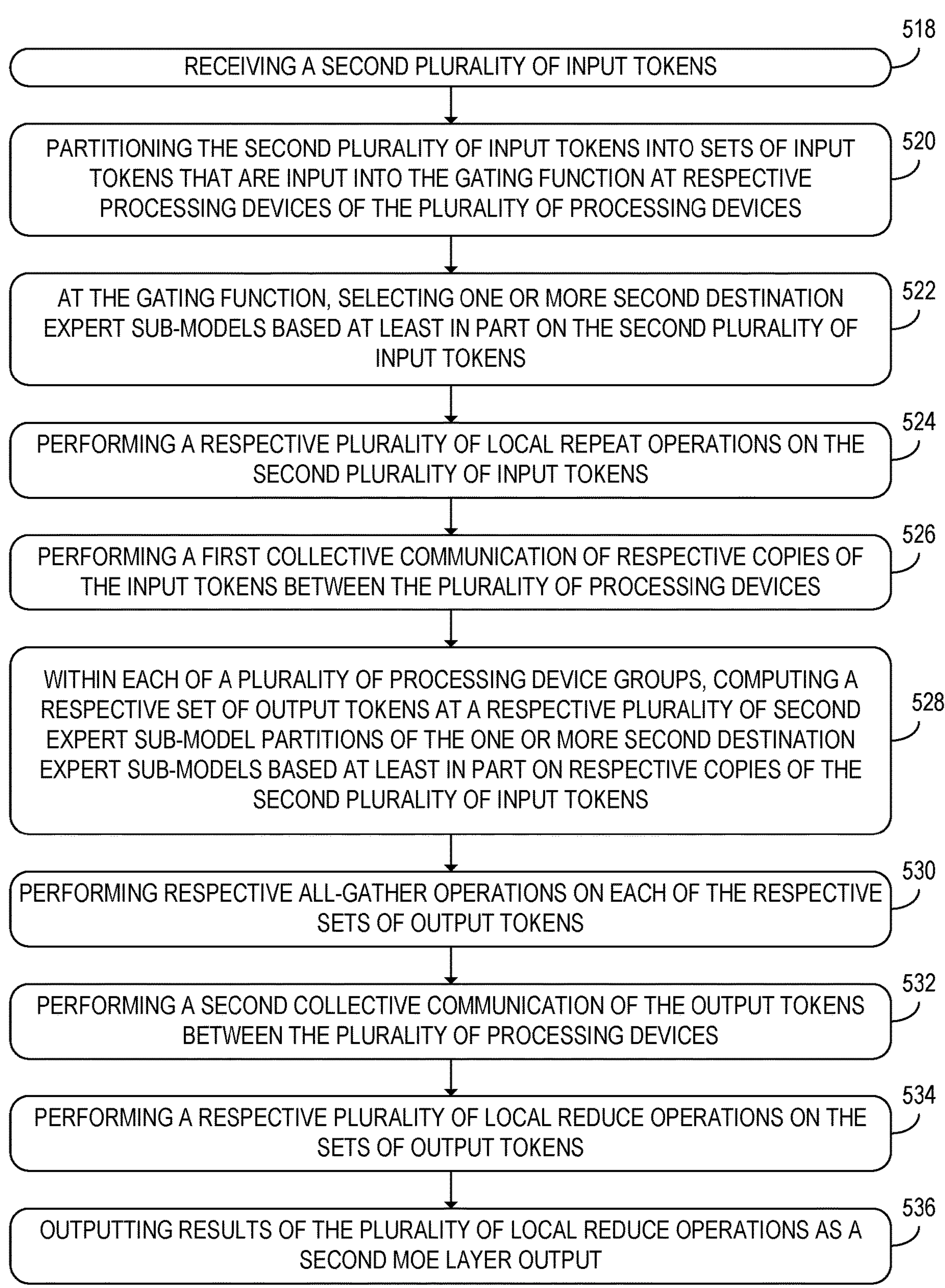
FIG. 24C shows additional steps of the method of FIG. 24A that may be performed when the MoE layer is in the expert-data-model parallel mode.

FIG. 24C shows additional steps of the method 500 that may be performed in some examples when the MoE layer is in the expert-data-model parallel mode. The steps of FIG. 24B and the steps of FIG. 24C may be performed to execute the MoE layer in the data parallel mode and the expert-data-model parallel mode in a first iteration and a second iteration, respectively. At step 518, the method 500 includes receiving a second plurality of input tokens. The second plurality of input tokens may be arranged in an input tensor.

At step 520, the method 500 further includes partitioning the second plurality of input tokens into sets of input tokens that are input into the gating function at respective processing devices of the plurality of processing devices. At the gating function, the method 500 further includes, at step 522, selecting one or more second destination expert sub-models based at least in part on the second plurality of input tokens. The set of one or more second destination expert sub-models may at least partially overlap with the set of one or more first destination expert sub-models in some examples. In other examples, all of the second destination expert sub-models may differ from the first destination expert sub-models.

At step 524, the method 500 further includes perform a respective plurality of local repeat operations on the second plurality of input tokens. The plurality of local repeat operations may be respectively performed at the plurality of processing devices. Each of the processing devices may generate r copies of the set of input tokens assigned to that processing device during the partitioning performed in step 520, where r is a processing device group count of the MoE layer. At step 526, the method 500 further includes performing a first collective communication of respective copies of the input tokens between the plurality of processing devices. The first collective communication may be an all-to-all dispatch. When the copies of the input tokens are generated at step 524, the copies are generated prior to the first collective communication such that the first collective communication shares the copies among the plurality of processing devices.

At step 528, the method 500 further includes computing a respective set of output tokens within each of a plurality of processing device groups. The sets of output tokens are each computed at a respective plurality of second expert sub-model partitions of the one or more second expert destination sub-models and are computed based at least in part on respective copies of the second plurality of input tokens. The number of processing device groups may be equal to the processing device group count r used when performing the local repeat operations. At step 530, the method 500 further includes performing respective all-gather operations on each of the respective sets of output tokens. Thus, the all-gather operations are performed within the processing device groups. Each of the all-gather operations may be replaced with a reduce-scatter operation during a backward pass performed when training the MoE layer.

At step 532, the method 500 further includes performing a second collective communication of the output tokens between the plurality of processing devices. The second collective communication may be an all-to-all combine. The method 500 further includes, at step 534, performing a respective plurality of local reduce operations on the sets of output tokens subsequently to the second collective communication. The local reduce operations may be local sum operations.

The method 500 further includes, at step 536, outputting results of the plurality of local reduce operations as a second MoE layer output. Thus, the plurality of processing devices may generate the output of the MoE layer in the expert-data-model parallel mode. The locations of the expert sub-model partitions at the processing devices are the same between the data parallel mode and the expert-data-model parallel mode, thereby allowing the processing devices to avoid parameter migration when the MoE layer switches between the data parallel mode and the expert-data-model parallel mode.

Figure 24D:
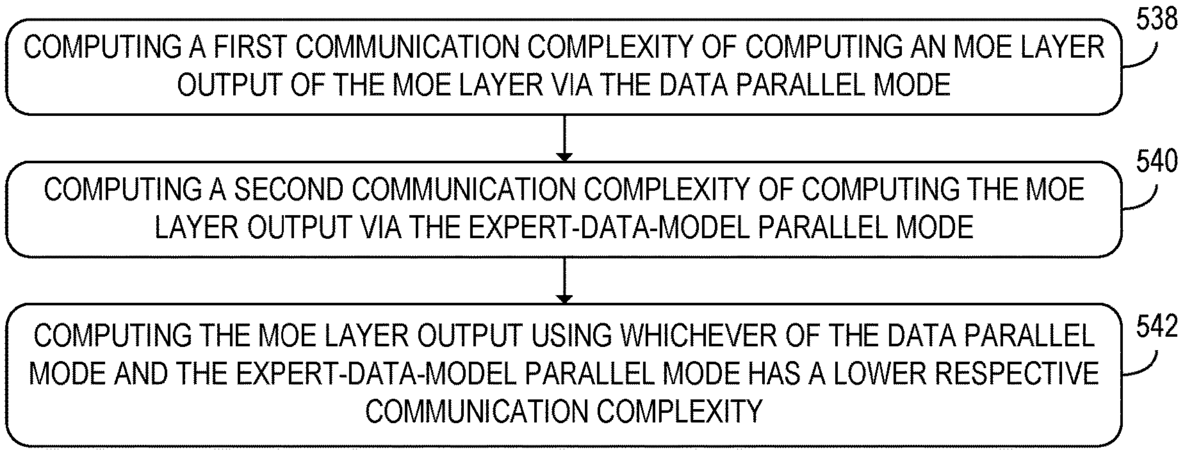
FIG. 24D shows additional steps of the method of FIG. 24A that may be performed at a parallel mode selection module executed at one or more of the plurality of processing devices.

FIG. 24D shows additional steps of the method 500 that may be performed at a parallel mode selection module executed at one or more of the plurality of processing devices, according to one example. At step 538, the method 500 further includes computing a first communication complexity of computing an MoE layer output of the MoE layer via the data parallel mode. The data parallel mode may have a communication complexity of $\mathcal{O}(E)$, where E is the total number of expert sub-models included in the MoE layer. At step 540, the method 500 further includes computing a second communication complexity of computing the MoE layer output via the expert-data-model parallel mode. The expert-data-model parallel mode may have a communication complexity of $\mathcal{O}(\Delta C \cdot r + \Delta E / r)$, where ΔE is the number of local expert sub-models per processing device and ΔC is the local number of tokens processed at each processing device. At step 542, the method 500 further includes computing the MoE layer output using whichever of the data parallel mode and the expert-data-model parallel mode has a lower respective communication complexity.

Figure 24E:
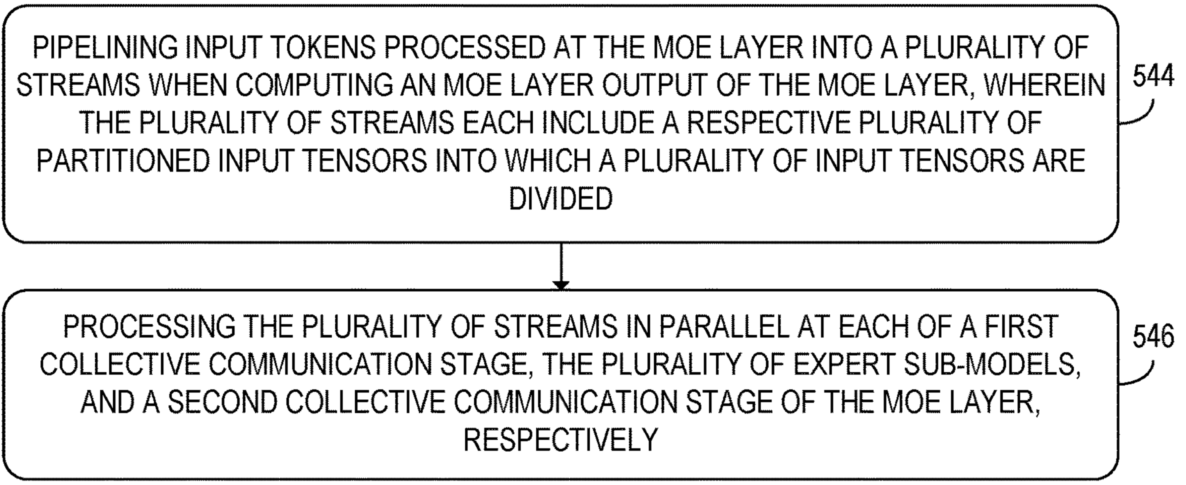
FIG. 24E shows additional steps of the method of FIG. 24A that may be performed in some examples to pipeline tokens into a plurality of streams.

FIG. 24E shows additional steps of the method 500 that may be performed in some examples. At step 544, the method 500 further includes pipelining input tokens processed at the MoE layer into a plurality of streams when computing an MoE layer output of the MoE layer. The plurality of streams each include a respective plurality of partitioned input tensors into which a plurality of input tensors are divided at step 508 or step 520. the input tensor may include the first plurality of input tokens or the second plurality of input tokens depending upon whether the MoE layer is configured in the data parallel mode or the expert-data-model parallel mode. At step 546, the method 500 further includes processing the plurality of streams in parallel at each of a first collective communication stage, the plurality of expert sub-models, and a second collective communication stage of the MoE layer, respectively.

Figure 24F:
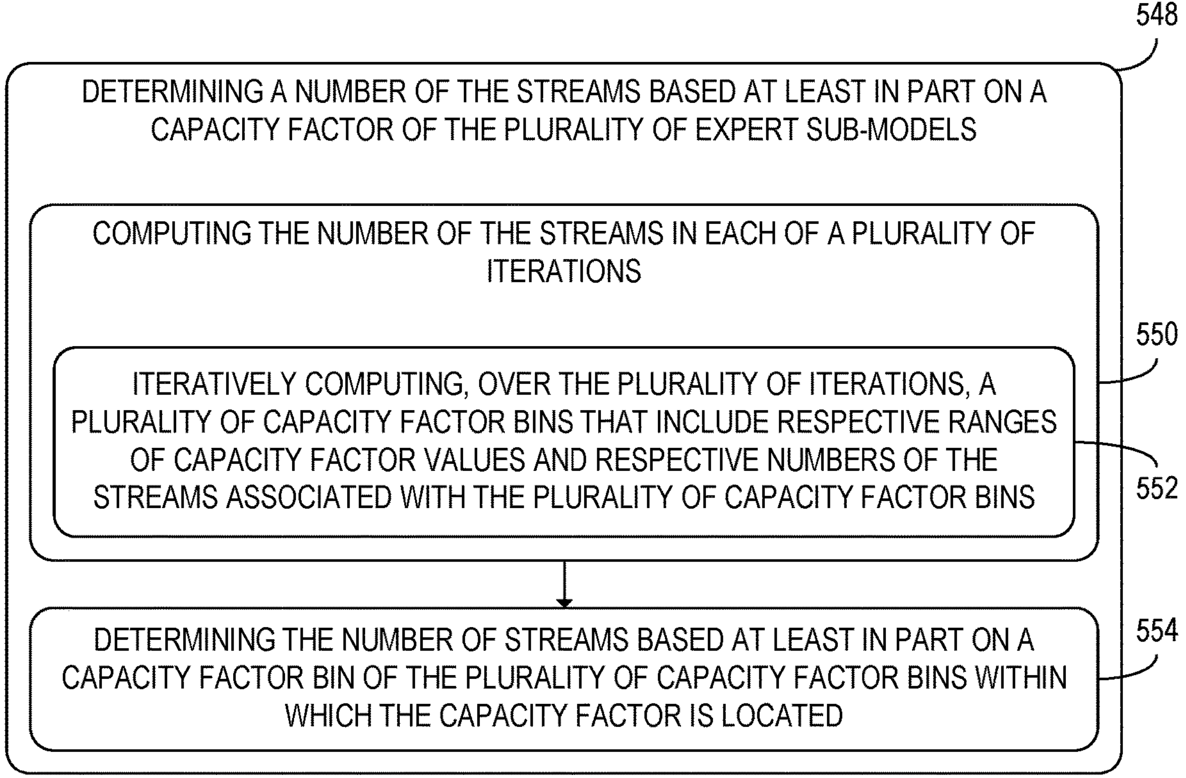
FIG. 24F shows additional steps of the method that may be performed at a pipelining degree selection module in examples in which the steps of FIG. 24E are performed.

FIG. 24F shows additional steps of the method 500 that may be performed at a pipelining degree selection module in some examples in which the steps of FIG. 24E are performed. At step 548, the method 500 further includes determining a number of the streams into which the input tokens are configured to be pipelined. The number of streams is determined based at least in part on a capacity factor of the plurality of expert sub-models. As discussed above, the capacity factor is a parameter of the gating function via which the expert capacity of the MoE layer may be controlled. Step 548 includes, at step 550, computing the number of the streams in each of the plurality of iterations in which the MoE layer is executed. Computing the number of streams at step 550 includes, at step 552, iteratively computing a plurality of capacity factor bins over the plurality of iterations. The capacity factor bins include respective ranges of capacity factor values. Respective numbers of streams associated with the plurality of capacity factor bins are also iteratively computed at step 552. In some examples, the numbers of streams associated with the capacity factor bins are determined based at least in part on previously measured latency data for the MoE layer at different capacity factor values. At step 554, the method 500 further includes determining the number of streams based at least in part on a capacity factor bin of the plurality of capacity factor bins within which the capacity factor in the current iteration is located. Accordingly, the plurality of processing devices may select a number of streams that results in low-latency execution of the MoE layer for a current value of the capacity factor.

Using the systems and methods discussed above, inefficiencies in execution of an MoE layer resulting from variability in expert workloads may be addressed. The systems and methods discussed above allow the processing devices at which the MoE layer is executed to process inputs to the MoE layer and communicate with each other in a more efficient manner. Thus, the above approaches may facilitate training and inferencing at large-scale MoE models executed on multiple processing devices.

In some embodiments, the methods and processes described herein may be tied to a computing system of one or more computing devices. In particular, such methods and processes may be implemented as a computer-application program or service, an application-programming interface (API), a library, and/or other computer-program product.

Figure 25:
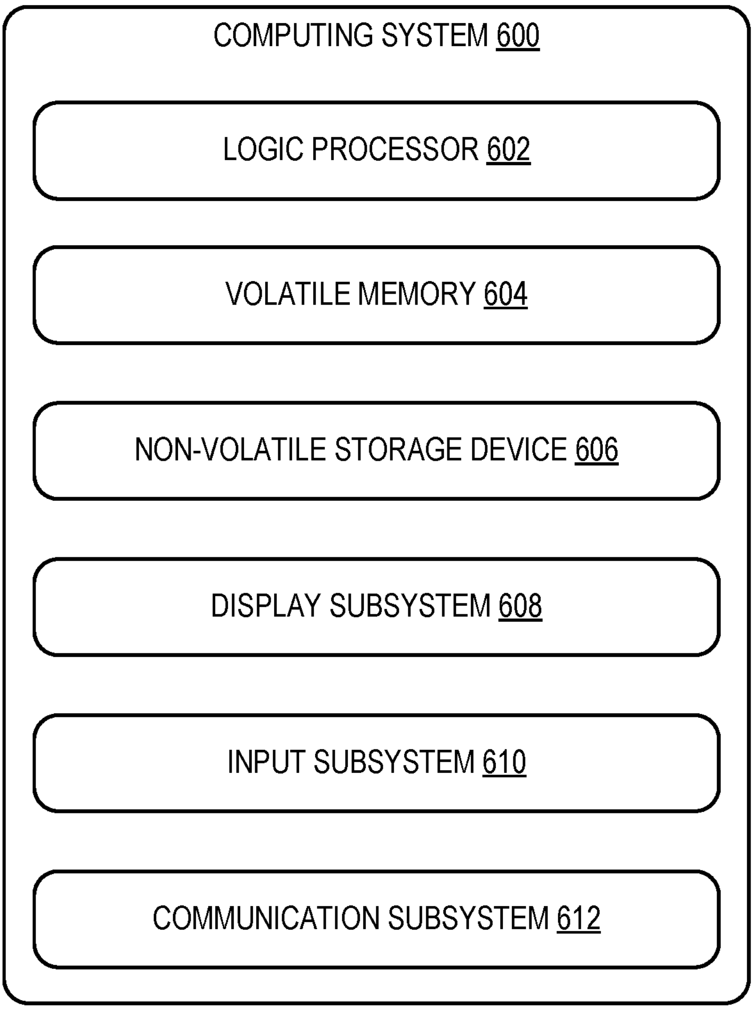
FIG. 25 schematically shows a computing system configured to enact one or more of the methods and processes described above, according to the example of FIG. 1.

FIG. 25 schematically shows a non-limiting embodiment of a computing system 600 that can enact one or more of the methods and processes described above. Computing system 600 is shown in simplified form. Computing system 600 may embody the computing system 10 described above and illustrated in FIG. 1. Components of the computing system 600 may be instantiated in one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display sub system 608, input sub system 610, communication sub system 612, and/or other components not shown in FIG. 25.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built-in. Non-volatile storage device 606 may include optical memory, semiconductor memory, and/or magnetic memory, or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

The following paragraphs discuss several aspects of the present disclosure. According to one aspect of the present disclosure, a computing system is provided, including a plurality of processing devices configured to execute a Mixture-of-Experts (MoE) layer included in an MoE model. The plurality of processing devices are configured to execute the MoE layer at least in part by, in each of a plurality of iterations, at each of the plurality of processing devices, receiving a respective plurality of input tokens. Each of the iterations further includes, at each of the plurality of processing devices, selecting one or more destination expert sub-models associated with the plurality of input tokens from among a plurality of expert sub-models of the MoE layer. Respective numbers k of expert sub-models selected as the one or more destination expert sub-models differ across the plurality of iterations. Each of the iterations further includes, at each of the plurality of processing devices, conveying the plurality of input tokens to the one or more destination expert sub-models. Each of the iterations further includes generating one or more respective expert sub-model outputs at the one or more destination expert sub-models based at least in part on the respective input tokens received at the one or more destination expert sub-models. Each of the iterations further includes generating an MoE layer output based at least in part on the one or more expert sub-model outputs. Each of the iterations further includes outputting the MoE layer output to an additional computing process. The above features may have the technical effect of adjusting the sparsity of the MoE layer over the course of execution to account for changes in the workload of the different expert sub-models.

According to this aspect, the plurality of processing devices may be further configured to set an expert capacity shared by the one or more destination expert sub-models. The expert capacity is a maximum number of input tokens configured to be processed at each of the one or more destination expert sub-models during an iteration of the plurality of iterations. The above features may have the technical effect of setting the expert capacity to reflect the workloads of the one or more destination expert sub-models.

According to this aspect, the plurality of processing devices may be further configured to compute the expert capacity based at least in part on a capacity factor of the MoE layer. The plurality of processing devices may be further configured to dynamically modify the capacity factor of the one or more destination expert sub-models over the plurality of iterations. The above features may have the technical effect of adjusting the expert capacity to account for changes in the workload of the MoE layer.

According to this aspect, the plurality of processing devices may be further configured to dynamically modify the capacity factor over the plurality of iterations at least in part by, during each of the iterations, setting the capacity factor to a maximum among one or more respective numbers of the input tokens respectively received at the one or more destination expert sub-models during the iteration. The above features may have the technical effect of avoiding token dropping at the one or more destination expert sub-models.

According to this aspect, the plurality of processing devices may be further configured to set a predefined upper bound on the capacity factor. The above features may have the technical effect of avoiding underutilization of expert capacity.

According to this aspect, the plurality of processing devices may be further configured to select the one or more destination expert sub-models at least in part by identifying the one or more expert sub-models corresponding to the k highest routing scores included in a gating function output vector of a gating function. The above features may have the technical effect of selecting the one or more destination expert sub-models in a manner that may be efficiently computed at a hardware accelerator.

According to this aspect, the gating function may include a linear layer configured to receive the plurality of input tokens. The above features may have the technical effect of allowing the one or more destination expert sub-models to be selected according to a learnable function.

According to this aspect, the gating function may further include a cosine similarity function configured to receive a linear layer output from the linear layer. The gating function may further include a SoftMax activation function that is computed on a cosine similarity function output of the cosine similarity function to obtain the plurality of routing scores included in the gating function output vector. The above features may have the technical effect of increasing numerical stability at large model sizes.

According to this aspect, wherein the number k at the iteration may be specified via a user input received at an MoE layer application-programming interface (API). The above features may have the technical effect of allowing the user to set the sparsity of the MoE layer during different phases of MoE model execution.

According to this aspect, the MoE layer may be included among a plurality of MoE layers in the MoE model. During the iteration, the numbers k of expert sub-models selected as the one or more destination expert sub-models may differ between the plurality of MoE layers. The above features may have the technical effect of using different levels of MoE layer sparsity at different layers to account for differences in workload.

According to another aspect of the present disclosure, a method of executing a Mixture-of-Experts (MoE) layer included in an MoE model is provided. The method includes, in each of a plurality of iterations, at each of a plurality of processing devices, receiving a respective plurality of input tokens. In each of the plurality of iterations, at each of the plurality of processing devices, the method further includes selecting, from among a plurality of expert sub-models of the MoE layer, one or more destination expert sub-models associated with the plurality of input tokens. Respective numbers k of expert sub-models selected as the one or more destination expert sub-models differ across the plurality of iterations. In each of the plurality of iterations, at each of the plurality of processing devices, the method further includes conveying the plurality of input tokens to the one or more destination expert sub-models. In each of the plurality of iterations, the method further includes generating one or more respective expert sub-model outputs at the one or more destination expert sub-models based at least in part on the respective input tokens received at the one or more destination expert sub-models. In each of the plurality of iterations, the method further includes generating an MoE layer output based at least in part on the one or more expert sub-model outputs. In each of the plurality of iterations, the method further includes outputting the MoE layer output to an additional computing process. The above features may have the technical effect of adjusting the sparsity of the MoE layer over the course of execution to account for changes in the workload of the different expert sub-models.

According to this aspect, the method may further include setting an expert capacity shared by the one or more destination expert sub-models. The expert capacity is a maximum number of input tokens configured to be processed at each of the destination expert sub-models during an iteration of the plurality of iterations. The above features may have the technical effect of setting the expert capacity to reflect the workloads of the one or more destination expert sub-models.

According to this aspect, the method may further include computing the expert capacity based at least in part on a capacity factor of the MoE layer. The method may further include dynamically modifying the capacity factor of the one or more destination expert sub-models over the plurality of iterations. The above features may have the technical effect of adjusting the expert capacity to account for changes in the workload of the MoE layer.

According to this aspect, the capacity factor may be dynamically modified over the plurality of iterations at least in part by, during each of the iterations, setting the capacity factor to a maximum among one or more respective numbers of the input tokens respectively received at the one or more destination expert sub-models during the iteration. The above features may have the technical effect of avoiding token dropping at the one or more destination expert sub-models.

According to this aspect, the method may further include setting a predefined upper bound on the capacity factor. The above features may have the technical effect of avoiding underutilization of expert capacity.

According to this aspect, the one or more destination expert sub-models may be selected at least in part by identifying the one or more expert sub-models corresponding to the k highest routing scores included in a gating function output vector of a gating function. The above features may have the technical effect of selecting the one or more destination expert sub-models in a manner that may be efficiently computed at a hardware accelerator.

According to this aspect, executing the gating function may include receiving the plurality of input tokens at a linear layer. Executing the gating function may further include receiving a linear layer output from the linear layer at a cosine similarity function. Executing the gating function may further include computing a SoftMax activation function on a cosine similarity function output of the cosine similarity function to obtain the plurality of routing scores included in the gating function output vector. The above features may have the technical effects of allowing the one or more destination expert sub-models to be selected according to a learnable function and increasing numerical stability at large model sizes.

According to this aspect, the number k at the iteration may be specified via a user input received at an MoE layer application-programming interface (API). The above features may have the technical effect of allowing the user to set the sparsity of the MoE layer during different phases of MoE model execution.

According to this aspect, the MoE layer may be included among a plurality of MoE layers in the MoE model. During the iteration, the numbers k of expert sub-models selected as the one or more destination expert sub-models may differ between the plurality of MoE layers. The above features may have the technical effect of using different levels of MoE layer sparsity at different layers to account for differences in workload.

According to another aspect of the present disclosure, a computing system is provided, including a plurality of processing devices configured to execute a Mixture-of-Experts (MoE) layer included in an MoE model. The plurality of processing devices are configured to execute the MoE layer at least in part by, in each of a plurality of iterations, at each of the plurality of processing devices, receiving a respective plurality of input tokens. Executing the MoE layer further includes, in each of the plurality of iterations, at each of the plurality of processing devices, setting an expert capacity of the plurality of expert sub-models. Executing the MoE layer further includes, in each of the plurality of iterations, at each of the plurality of processing devices, selecting one or more destination expert sub-models associated with the plurality of input tokens from among a plurality of expert sub-models of the MoE layer. Executing the MoE layer further includes, in each of the plurality of iterations, at each of the plurality of processing devices, conveying the plurality of input tokens to the one or more destination expert sub-models. The expert capacity of the one or more destination expert sub-models is equal to a maximum among one or more respective numbers of the input tokens respectively received at the one or more destination expert sub-models during the iteration. In each of the plurality of iterations, executing the MoE layer further includes generating one or more respective expert sub-model outputs at the one or more destination expert sub-models based at least in part on the respective input tokens received at the one or more destination expert sub-models. In each of the plurality of iterations, executing the MoE layer further includes generating an MoE layer output based at least in part on the one or more expert sub-model outputs. In each of the plurality of iterations, executing the MoE layer further includes outputting the MoE layer output to an additional computing process. The above features may have the technical effect of adjusting the sparsity of the MoE layer over the course of execution to account for changes in the workload of the different expert sub-models.

According to another aspect of the present disclosure, a computing system is provided, including a plurality of processing devices configured to execute a Mixture-of-Experts (MoE) layer included in an MoE model. The plurality of processing devices are configured to execute the MoE layer at least in part by, during a first collective communication phase between the plurality of processing devices, splitting each of a plurality of first input tensors along a first dimension to obtain a plurality of first output tensors. Executing the MoE layer further includes processing the first output tensors at a respective a plurality of expert sub-models to obtain a plurality of second input tensors. Executing the MoE layer further includes, during a second collective communication phase between the plurality of processing devices, receiving the plurality of second input tensors from the plurality of expert sub-models. Executing the MoE layer further includes, during the second collective communication phase, concatenating the plurality of second input tensors along the first dimension to obtain a plurality of second output tensors. Executing the MoE layer further includes outputting the second output tensors to an additional computing process as output of the MoE layer. The above features may have the technical effect of modifying tensor shapes to shapes that are more efficiently scalable to large numbers of processing devices.

According to this aspect, the first dimension may be an expert number dimension of the first input tensor. The above feature may have the technical effect of allowing the processing devices to dynamically adjust for changes in expert capacity by modifying tensor sizes in the expert number dimension.

According to this aspect, a same local expert number of the plurality of expert sub-models may be executed at each of the plurality of processing devices configured to execute the expert sub-models. The plurality of first output tensors may each have a size in the expert number dimension equal to the local expert number. The above features may have the technical effect of balancing the expert processing workload among the plurality of processing devices.

According to this aspect, the plurality of processing devices may be further configured to execute the MoE layer at least in part by concatenating the plurality of first input tensors along a second dimension when computing the plurality of first output tensors during the first collective communication phase. The plurality of processing devices may be further configured to execute the MoE layer at least in part by splitting each of the plurality of second input tensors along the second dimension when computing the plurality of second output tensors during the second collective communication phase. The above features may have the technical effect of modifying tensor shapes to shapes that are more efficiently scalable to large numbers of processing devices.

According to this aspect, the second dimension may be a token number dimension. The above feature may have the technical effect of allowing the processing devices to process tensors at the expert sub-models that have efficiently computable sizes in the token number dimension.

According to this aspect, a same per-processing-device token number of tokens may be processed at each of the plurality of processing devices configured to execute the expert sub-models. The plurality of first output tensors may each have a size in the token number dimension equal to the per-processing-device token number. The above features may have the technical effect of balancing the expert processing workload among the plurality of processing devices.

According to this aspect, the plurality of processing devices may be provided at least in part in a plurality of nodes that each include two or more of the plurality of processing devices. The first collective communication phase and the second collective communication phase may each include intra-node collective communications performed between the two or more processing devices included in each of the plurality of nodes and inter-node collective communications performed between the plurality of nodes. The above features may have the technical effect of decreasing the communication overhead associated with communication between the nodes during the collective communication phases.

According to this aspect, prior to the intra-node collective communications, the plurality of processing devices may be further configured to reorganize a first plurality of memory regions of respective memory devices associated with the plurality of processing devices at least in part by performing a first plurality of strided memory copy operations on the first plurality of memory regions. The above features may have the technical effect of increasing message size to allow the intra-node collective communication to be performed more efficiently.

According to this aspect, subsequently to performing the intra-node collective communications, the plurality of processing devices may be further configured to further reorganize a second plurality of memory regions at least in part by performing a second plurality of strided memory copy operations on the second plurality of memory regions. The above features may have the technical effect of increasing message size to allow the inter-node collective communication to be performed more efficiently.

According to this aspect, when reorganizing the first plurality of memory regions, the plurality of processing devices may be further configured to aggregate a plurality of first memory chunks that have a same destination processing device to which the first memory chunks are configured to be transmitted during the intra-node collective communications. When reorganizing the second plurality of memory regions, the plurality of processing devices may be further configured to aggregate a plurality of second memory chunks that have a same destination processing device to which the second memory chunks are configured to be transmitted during the inter-node collective communications. The above features may have the technical effect of decreasing the communication complexities of the intra-node and inter-node collective communications.

According to this aspect, the first collective communication phase and the second collective communication phase may be performed in each of a plurality of iterations. Respective first input tensors received in the plurality of iterations may each have a same size in the second dimension across the plurality of iterations, and the respective first output tensors computed in each iteration may have differing respective sizes in the second dimension. The above features may have the technical effect of maintaining an efficiently processable size for the first output tensors as the workloads of the expert sub-models vary across the plurality of iterations.

According to another aspect of the present disclosure, a method of executing a Mixture-of-Experts (MoE) layer included in an MoE model at a plurality of processing devices is provided. The method includes, during a first collective communication phase between the plurality of processing devices, splitting each of a plurality of first input tensors along a first dimension to obtain a plurality of first output tensors. The method further includes processing the first output tensors at a respective a plurality of expert sub-models to obtain a plurality of second input tensors. During a second collective communication phase between the plurality of processing devices, the method further includes receiving the plurality of second input tensors from the plurality of expert sub-models. During the second collective communication phase, the method further includes concatenating the plurality of second input tensors along the first dimension to obtain a plurality of second output tensors. The method further includes outputting the second output tensors to an additional computing process as output of the MoE layer. The above features may have the technical effect of modifying tensor shapes to shapes that are more efficiently scalable to large numbers of processing devices.

According to this aspect, the first dimension may be an expert number dimension of the first input tensor. The above feature may have the technical effect of allowing the processing devices to dynamically adjust for changes in expert capacity by modifying tensor sizes in the expert number dimension.

According to this aspect, the method may further include concatenating the plurality of first input tensors along a second dimension when computing the plurality of first output tensors during the first collective communication phase. The method may further include splitting each of the plurality of second input tensors along the second dimension when computing the plurality of second output tensors during the second collective communication phase. The above features may have the technical effect of modifying tensor shapes to shapes that are more efficiently scalable to large numbers of processing devices.

According to this aspect, the second dimension may be a token number dimension. The above feature may have the technical effect of allowing the processing devices to process tensors at the expert sub-models that have efficiently computable sizes in the token number dimension.

According to this aspect, the plurality of processing devices may be provided at least in part in a plurality of nodes that each include two or more of the plurality of processing devices. The first collective communication phase and the second collective communication phase may each include performing intra-node collective communications between the two or more processing devices included in each of the plurality of nodes and performing inter-node collective communications between the plurality of nodes. The above features may have the technical effect of decreasing the communication overhead associated with communication between the nodes during the collective communication phases.

According to this aspect, prior to the intra-node collective communications, the method may further include reorganizing a first plurality of memory regions of respective memory devices associated with the plurality of processing devices at least in part by performing a first plurality of strided memory copy operations on the first plurality of memory regions. Subsequently to performing the intra-node collective communications, the method may further include reorganizing a second plurality of memory regions at least in part by performing a second plurality of strided memory copy operations on the second plurality of memory regions. The above features may have the technical effect of increasing message size to allow the inter-node collective communication to be performed more efficiently.

According to this aspect, when reorganizing the first plurality of memory regions, the method may further include aggregating a plurality of first memory chunks that have a same destination processing device to which the first memory chunks are configured to be transmitted during the intra-node collective communications. When reorganizing the second plurality of memory regions, the method may further include aggregating a plurality of second memory chunks that have a same destination processing device to which the second memory chunks are configured to be transmitted during the inter-node collective communications. The above features may have the technical effect of decreasing the communication complexities of the intra-node and inter-node collective communications.

According to this aspect, the first collective communication phase and the second collective communication phase may be performed in each of a plurality of iterations. Respective first input tensors received in the plurality of iterations may each have a same size in the second dimension across the plurality of iterations. The respective first output tensors computed in each iteration may have differing respective sizes in the second dimension. The above features may have the technical effect of maintaining an efficiently processable size for the first output tensors as the workloads of the expert sub-models vary across the plurality of iterations.

According to another aspect of the present disclosure, a computing system is provided, including a plurality of processing devices configured to execute a Mixture-of-Experts (MoE) layer included in an MoE model. The plurality of processing devices are configured to execute the MoE layer at least in part by, during a first collective communication phase between the plurality of processing devices, computing a plurality of first output tensors at least in part by splitting each of the first input tensors along a first dimension. The first collective communication phase further includes concatenating the plurality of first input tensors along a second dimension. Executing the MoE layer further includes processing the first output tensors at a respective a plurality of expert sub-models to obtain a plurality of second input tensors. Executing the MoE layer further includes, during a second collective communication phase between the plurality of processing devices, receiving the plurality of second input tensors from the plurality of expert sub-models. The second collective communication phase further includes computing a plurality of second output tensors at least in part by splitting each of the plurality of second input tensors along the second dimension and concatenating the plurality of second input tensors along the first dimension. The second collective communication phase further includes outputting the second output tensors to an additional computing process as output of the MoE layer. The plurality of processing devices are provided at least in part in a plurality of nodes that each include two or more of the plurality of processing devices. The first collective communication phase and the second collective communication phase each include intra-node collective communication performed between the two or more processing devices included in each of the plurality of nodes and inter-node collective communication performed between the plurality of nodes. The above features may have the technical effect of modifying tensor shapes to shapes that are more efficiently scalable to large numbers of processing devices. In addition, the above features may have the technical effect of decreasing the communication overhead associated with communication between the nodes during the collective communication phases.

According to another aspect of the present disclosure, a computing system is provided, including a plurality of processing devices configured to execute a Mixture-of-Experts (MoE) layer included in an MoE model. The MoE layer includes a plurality of expert sub-models that each have a respective plurality of parameter values. The MoE layer is configured to be switchable between a data parallel mode and an expert-data-model parallel mode without conveying the respective parameter values of the expert sub-models among the plurality of processing devices. The above features may have the technical effect of allowing the processing devices to utilize a communication-efficient parallelism approach while avoiding the communication overhead associated with parameter migration.

According to this aspect, in the data parallel mode, the plurality of processing devices may be configured to receive a first plurality of input tokens. In the data parallel mode, at a gating function, the plurality of processing devices may be further configured to select one or more first destination expert sub-models based at least in part on the first plurality of input tokens. In the data parallel mode, at a plurality of first expert sub-model partitions of the one or more first destination expert sub-models, the plurality of processing devices may be further configured to compute a plurality of output tokens based at least in part on the first plurality of input tokens. In the data parallel mode, the plurality of processing devices may be further configured to perform an all-gather operation on the plurality of output tokens. In the data parallel mode, the plurality of processing devices may be further configured to output the first plurality of output tokens subsequently to performing the all-gather operation as a first MoE layer output. The above features may have the technical effect of executing the MoE layer in the data parallel mode.

According to this aspect, in the expert-data-model parallel mode, the plurality of processing devices may be configured to receive a second plurality of input tokens. In the expert-data-model parallel mode, at the gating function, the plurality of processing devices may be further configured to select one or more second destination expert sub-models based at least in part on the second plurality of input tokens. In the expert-data-model parallel mode, within each of a plurality of processing device groups, the plurality of processing devices may be further configured to compute a respective set of output tokens at a respective plurality of second expert sub-model partitions of the one or more second expert destination sub-models based at least in part on respective copies of the second plurality of input tokens. In the expert-data-model parallel mode, the plurality of processing devices may be further configured to perform respective all-gather operations on each of the respective sets of output tokens. In the expert-data-model parallel mode, the plurality of processing devices may be further configured to perform a respective plurality of local reduce operations on the sets of output tokens. In the expert-data-model parallel mode, the plurality of processing devices may be further configured to output results of the plurality of local reduce operations as a second MoE layer output. The above features may have the technical effect of executing the MoE layer in the expert-data-model parallel mode.

According to this aspect, the first plurality of input tokens and the second plurality of input tokens may each be partitioned into respective sets of input tokens that are input into the gating function at respective processing devices of the plurality of processing devices. The above features may have the technical effect of parallelizing execution of the gating function.

According to this aspect, via an MoE layer application-programming interface (API), the plurality of processing devices may be further configured to receive, for each of a plurality of iterations, respective processing device group counts that indicate respective numbers of processing device groups at the plurality of iterations. At each of the plurality of iterations, the plurality of processing devices may be further configured to select between the data parallel mode and the expert-data-model parallel mode based at least in part on the processing device group count of that iteration.

The above features may have the technical effect of allowing the processing devices to select the parallelism approach in a user-specified or programmatically specified manner.

According to this aspect, in the expert-data-model parallel mode, the plurality of processing devices may be further configured to perform a first collective communication of respective copies of the input tokens between the plurality of processing devices subsequently to executing the gating function. The above features may have the technical effect of parallelizing the processing of the input tokens across the plurality of processing devices.

According to this aspect, in the expert-data-model parallel mode, the plurality of processing devices may be further configured to perform a second collective communication of the output tokens between the plurality of processing devices. The above features may have the technical effect of combining the results of the parallel expert computations performed at the processing devices.

According to this aspect, in the expert-data-model parallel mode, the plurality of processing devices may be further configured to perform a respective plurality of local repeat operations on the second plurality of input tokens prior to the first collective communication. The local reduce operations may be local sum operations. The above features may have the technical effect of allowing the plurality of processing devices to process respective copies of the second plurality of input tokens in parallel.

According to this aspect, the plurality of processing devices may be further configured to compute a first communication complexity of computing an MoE layer output of the MoE layer via the data parallel mode. The plurality of processing devices may be further configured to compute a second communication complexity of computing the MoE layer output via the expert-data-model parallel mode. The plurality of processing devices may be further configured to compute the MoE layer output using whichever of the data parallel mode and the expert-data-model parallel mode has a lower respective communication complexity. The above features may have the technical effect of selecting a parallelism approach that has a low communication complexity.

According to this aspect, the plurality of processing devices may be further configured to pipeline input tokens processed at the MoE layer into a plurality of streams when computing an MoE layer output of the MoE layer. The plurality of streams may each include a respective plurality of partitioned input tensors into which a plurality of input tensors are divided. The plurality of streams may be processed in parallel at each of a first collective communication stage, the plurality of expert sub-models, and a second collective communication stage of the MoE layer, respectively. The above features may have the technical effect of reducing the latency of executing the MoE layer.

According to this aspect, the plurality of processing devices may be further configured to determine a number of the streams based at least in part on a capacity factor of the plurality of expert sub-models. The above features may have the technical effect of selecting a number of streams that has a low latency for a given value of the capacity factor.

According to this aspect, the plurality of processing devices may be configured to compute the number of the streams in each of a plurality of iterations at least in part by iteratively computing, over the plurality of iterations, a plurality of capacity factor bins that include respective ranges of capacity factor values. The plurality of processing devices may further compute, over the plurality of iterations, respective numbers of the streams associated with the plurality of capacity factor bins. Computing the number of streams may further include determining the number of streams based at least in part on a capacity factor bin of the plurality of capacity factor bins within which the capacity factor is located. The above features may have the technical effect of iteratively learning numbers of streams that result in low latency for different values of the capacity factor.

According to another aspect of the present disclosure, a method for use with a computing system is provided. The method includes executing a Mixture-of-Experts (MoE) layer included in an MoE model at a plurality of processing devices. The MoE layer includes a plurality of expert sub-models that each have a respective plurality of parameter values. Executing the MoE layer includes switching the MoE layer between a data parallel mode and an expert-data-model parallel mode without conveying the respective parameter values of the expert sub-models among the plurality of processing devices. The above features may have the technical effect of allowing the processing devices to utilize a communication-efficient parallelism approach while avoiding the communication overhead associated with parameter migration.

According to this aspect, the method further includes, in the data parallel mode, receiving a first plurality of input tokens. At a gating function, the method further includes, in the data parallel mode, selecting one or more first destination expert sub-models based at least in part on the first plurality of input tokens. At a plurality of first expert sub-model partitions of the one or more first destination expert sub-models, the method further includes, in the data parallel mode, computing a plurality of output tokens based at least in part on the first plurality of input tokens. The method further includes, in the data parallel mode, performing an all-gather operation on the plurality of output tokens. The method further includes, in the data parallel mode, outputting the first plurality of output tokens subsequently to performing the all-gather operation as a first MoE layer output. The above features may have the technical effect of executing the MoE layer in the data parallel mode.

According to this aspect, in the expert-data-model parallel mode, the method may further include receiving a second plurality of input tokens. In the expert-data-model parallel mode, at the gating function, the method may further include selecting one or more second destination expert sub-models based at least in part on the second plurality of input tokens. In the expert-data-model parallel mode, within each of a plurality of processing device groups, the method may further include computing a respective set of output tokens at a respective plurality of second expert sub-model partitions of the one or more second destination expert sub-models based at least in part on respective copies of the second plurality of input tokens. In the expert-data-model parallel mode, the method may further include performing respective all-gather operations on each of the respective sets of output tokens. In the expert-data-model parallel mode, the method may further include performing a respective plurality of local reduce operations on the sets of output tokens. In the expert-data-model parallel mode, the method may further include outputting results of the plurality of local reduce operations as a second MoE layer output. The above features may have the technical effect of executing the MoE layer in the expert-data-model parallel mode.

According to this aspect, the method may further include partitioning each of the first plurality of input tokens and the second plurality of input tokens into respective sets of input tokens that are input into the gating function at respective processing devices of the plurality of processing devices.

The above features may have the technical effect of parallelizing execution of the gating function.

According to this aspect, the method may further include, in the expert-data-model parallel mode, performing a first collective communication of respective copies of the input tokens between the plurality of processing devices subsequently to executing the gating function. In the expert-data-model parallel mode, the method may further include performing a second collective communication of the output tokens between the plurality of processing devices. The above features may have the technical effects of parallelizing the processing of the input tokens across the plurality of processing devices and combining the results of the parallel expert computations performed at the processing devices.

According to this aspect, the method may further include computing a first communication complexity of computing an MoE layer output of the MoE layer via the data parallel mode. The method may further include computing a second communication complexity of computing the MoE layer output via the expert-data-model parallel mode. The method may further include computing the MoE layer output using whichever of the data parallel mode and the expert-data-model parallel mode has a lower respective communication complexity. The above features may have the technical effect of selecting a parallelism approach that has a low communication complexity.

According to this aspect, the method may further include pipelining input tokens processed at the MoE layer into a plurality of streams when computing an MoE layer output of the MoE layer. The plurality of streams may each include a respective plurality of partitioned input tensors into which a plurality of input tensors are divided. The method may further include processing the plurality of streams in parallel at each of a first collective communication stage, the plurality of expert sub-models, and a second collective communication stage of the MoE layer, respectively. The above features may have the technical effect of reducing the latency of executing the MoE layer.

According to another aspect of the present disclosure, a computing system is provided, including a plurality of processing devices configured to execute a Mixture-of-Experts (MoE) layer included in an MoE model. The MoE layer is configured to be switchable between a first parallel mode and a second parallel mode, in which a first MoE layer output and a second MoE layer output are respectively computed in a first iteration and a second iteration of a plurality of iterations. In the first parallel mode, the plurality of processing devices are configured to receive a first plurality of input tokens. In the first parallel mode, the plurality of processing devices are further configured to select, at a gating function, one or more first destination expert sub-models based at least in part on the first plurality of input tokens. In the first parallel mode, at a plurality of first expert sub-model partitions of the one or more first destination expert sub-models, the plurality of processing devices are further configured to compute a plurality of output tokens based at least in part on the first plurality of input tokens. In the first parallel mode, the plurality of processing devices are further configured to perform an all-gather operation on the plurality of output tokens. In the first parallel mode, the plurality of processing devices are further configured to output the first plurality of output tokens subsequently to performing the all-gather operation as the first MoE layer output. In the second parallel mode, the plurality of processing devices are configured to receive a second plurality of input tokens. In the second parallel mode, the plurality of processing devices are further configured to select, at the gating function, one or more second destination expert sub-models based at least in part on the second plurality of input tokens. In the second parallel mode, within each of a plurality of processing device groups, the plurality of processing devices are further configured to compute a respective set of output tokens at a respective plurality of second expert sub-model partitions of the one or more second destination expert sub-models based at least in part on respective copies of the second plurality of input tokens. In the second parallel mode, the plurality of processing devices are further configured to perform respective all-gather operations on each of the respective sets of output tokens. In the second parallel mode, the plurality of processing devices are further configured to perform a respective plurality of local reduce operations on the sets of output tokens. In the second parallel mode, the plurality of processing devices are further configured to output results of the plurality of local reduce operations as the second MoE layer output. The above features may have the technical effect of allowing the processing devices to utilize a communication-efficient parallelism approach while avoiding the communication overhead associated with parameter migration.

"And/or" as used herein is defined as the inclusive or v, as specified by the following truth table:

| A | B | A $\vee$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:

a plurality of processing devices configured to execute a Mixture-of-Experts (MoE) layer included in an MoE model, wherein:

the MoE layer includes a plurality of expert sub-models that each have a respective plurality of parameter values; and the MoE layer is configured to be switchable between a data parallel mode and an expert-data-model parallel mode without conveying the respective parameter values of the expert sub-models among the plurality of processing devices, wherein:

in the data parallel mode, the plurality of processing devices are configured to:

receive a first plurality of input tokens;

at a gating function, select one or more first destination expert sub-models based at least in part on the first plurality of input tokens;

at a plurality of first expert sub-model partitions of the one or more first destination expert sub-models, compute a plurality of output tokens based at least in part on the first plurality of input tokens;

perform an all-gather operation on the plurality of output tokens; and output the plurality of output tokens subsequently to performing the all-gather operation as a first MoE layer output; and in the expert-data-model parallel mode, the plurality of processing devices are configured to:

receive a second plurality of input tokens;

at the gating function, select one or more second destination expert sub-models based at least in part on the second plurality of input tokens;

within each of a plurality of processing device groups, compute a respective set of output tokens at a respective plurality of second expert sub-model partitions of the one or more second destination expert sub-models based at least in part on respective copies of the second plurality of input tokens;

perform respective all-gather operations on each of the respective sets of output tokens;

perform a respective plurality of local reduce operations on the sets of output tokens; and output results of the plurality of local reduce operations as a second MoE layer output.

2. The computing system of claim 1, wherein the first plurality of input tokens and the second plurality of input tokens are each partitioned into respective sets of input tokens that are input into the gating function at respective processing devices of the plurality of processing devices.

3. The computing system of claim 1, wherein the plurality of processing devices are further configured to:

via an MoE layer application-programming interface (API), receive, for each of a plurality of iterations, respective processing device group counts that indicate respective numbers of processing device groups at the plurality of iterations; and at each of the plurality of iterations, select between the data parallel mode and the expert-data-model parallel mode based at least in part on the processing device group count of that iteration.

4. The computing system of claim 1, wherein, in the expert-data-model parallel mode, the plurality of processing devices are further configured to perform a first collective communication of the respective copies of the second plurality of input tokens between the plurality of processing devices subsequently to executing the gating function.

5. The computing system of claim 4, wherein, in the expert-data-model parallel mode, the plurality of processing devices are further configured to perform a second collective communication of the sets of output tokens between the plurality of processing devices.

6. The computing system of claim 4, wherein, in the expert-data-model parallel mode:

the plurality of processing devices are further configured to perform a respective plurality of local repeat operations on the second plurality of input tokens prior to the first collective communication; and the local reduce operations are local sum operations.

7. The computing system of claim 1, wherein the plurality of processing devices are further configured to:

compute a first communication complexity of computing an MoE layer output of the MoE layer via the data parallel mode;

compute a second communication complexity of computing the MoE layer output via the expert-data-model parallel mode; and compute the MoE layer output using whichever of the data parallel mode and the expert-data-model parallel mode has a lower respective communication complexity.

8. The computing system of claim 1, wherein:

the plurality of processing devices are further configured to pipeline input tokens processed at the MoE layer into a plurality of streams when computing an MoE layer output of the MoE layer;

the plurality of streams each include a respective plurality of partitioned input tensors into which a plurality of input tensors are divided; and the plurality of streams are processed in parallel at each of a first collective communication stage, the plurality of expert sub-models, and a second collective communication stage of the MoE layer, respectively.

9. The computing system of claim 8, wherein the plurality of processing devices are further configured to determine a number of the streams based at least in part on a capacity factor of the plurality of expert sub-models.

10. The computing system of claim 9, wherein the plurality of processing devices are configured to compute the number of the streams in each of a plurality of iterations at least in part by:

iteratively computing, over the plurality of iterations:

a plurality of capacity factor bins that include respective ranges of capacity factor values; and respective numbers of the streams associated with the plurality of capacity factor bins; and determining the number of streams based at least in part on a capacity factor bin of the plurality of capacity factor bins within which the capacity factor is located.

11. A method for use with a computing system, the method comprising:

executing a Mixture-of-Experts (MoE) layer included in an MoE model at a plurality of processing devices, wherein:

the MoE layer includes a plurality of expert sub-models that each have a respective plurality of parameter values; and executing the MoE layer includes switching the MoE layer between a data parallel mode and an expert-data-model parallel mode without conveying the respective parameter values of the expert sub-models among the plurality of processing devices, wherein:

in the data parallel mode, executing the MoE layer includes:

receiving a first plurality of input tokens;

at a gating function, selecting one or more first destination expert sub-models based at least in part on the first plurality of input tokens;

at a plurality of first expert sub-model partitions of the one or more first destination expert sub-models, computing a plurality of output tokens based at least in part on the first plurality of input tokens;

performing an all-gather operation on the plurality of output tokens; and outputting the plurality of output tokens subsequently to performing the all-gather operation as a first MoE layer output; and in the expert-data-model parallel mode, executing the MoE layer includes:

receiving a second plurality of input tokens;

at the gating function, selecting one or more second destination expert sub-models based at least in part on the second plurality of input tokens;

within each of a plurality of processing device groups, computing a respective set of output tokens at a respective plurality of second expert sub-model partitions of the one or more second expert destination sub-models based at least in part on respective copies of the second plurality of input tokens;

performing respective all-gather operations on each of the respective sets of output tokens;

performing a respective plurality of local reduce operations on the sets of output tokens; and outputting results of the plurality of local reduce operations as a second MoE layer output.

12. The method of claim 11, further comprising partitioning each of the first plurality of input tokens and the second plurality of input tokens into respective sets of input tokens that are input into the gating function at respective processing devices of the plurality of processing devices.

13. The method of claim 11, further comprising, in the expert-data-model parallel mode:

performing a first collective communication of the respective copies of the second plurality of input tokens between the plurality of processing devices subsequently to executing the gating function; and performing a second collective communication of the sets of output tokens between the plurality of processing devices.

14. The method of claim 11, further comprising:

computing a first communication complexity of computing an MoE layer output of the MoE layer via the data parallel mode;

computing a second communication complexity of computing the MoE layer output via the expert-data-model parallel mode; and computing the MoE layer output using whichever of the data parallel mode and the expert-data-model parallel mode has a lower respective communication complexity.

15. The method of claim 11, further comprising:

pipelining input tokens processed at the MoE layer into a plurality of streams when computing an MoE layer output of the MoE layer, wherein the plurality of streams each include a respective plurality of partitioned input tensors into which a plurality of input tensors are divided; and processing the plurality of streams in parallel at each of a first collective communication stage, the plurality of expert sub-models, and a second collective communication stage of the MoE layer, respectively.

16. A computing system comprising:

a plurality of processing devices configured to execute a Mixture-of-Experts (MoE) layer included in an MoE model, wherein:

the MoE layer is configured to be switchable between a first parallel mode and a second parallel mode, in which a first MoE layer output and a second MoE layer output are respectively computed in a first iteration and a second iteration of a plurality of iterations;

in the first parallel mode, the plurality of processing devices are configured to:

receive a first plurality of input tokens;

at a gating function, select one or more first destination expert sub-models based at least in part on the first plurality of input tokens;

at a plurality of first expert sub-model partitions of the one or more first destination expert sub-models, compute a plurality of output tokens based at least in part on the first plurality of input tokens;

perform an all-gather operation on the plurality of output tokens; and output the plurality of output tokens subsequently to performing the all-gather operation as the first MoE layer output; and in the second parallel mode, the plurality of processing devices are configured to:

receive a second plurality of input tokens;

at the gating function, select one or more second destination expert sub-models based at least in part on the second plurality of input tokens;

within each of a plurality of processing device groups, compute a respective set of output tokens at a respective plurality of second expert sub-model partitions of the one or more second destination expert sub-models based at least in part on respective copies of the second plurality of input tokens;

perform respective all-gather operations on each of the respective sets of output tokens;

perform a respective plurality of local reduce operations on the sets of output tokens; and output results of the plurality of local reduce operations as the second MoE layer output.

* * * * *